US010394691B1

(12) United States Patent
Cole et al.

(10) Patent No.: US 10,394,691 B1
(45) Date of Patent: Aug. 27, 2019

(54) RESOLUTION OF DATA FLOW ERRORS USING THE LINEAGE OF DETECTED ERROR CONDITIONS

(71) Applicant: Tableau Software, Inc., Seattle, WA (US)

(72) Inventors: Richard Lee Cole, Los Gatos, CA (US); Heidi Lap Mun Lam, Mountain View, CA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 15/726,294

(22) Filed: Oct. 5, 2017

(51) Int. Cl.

| | |
|---|---|
| ***G06F 11/36*** | (2006.01) |
| ***G06T 11/20*** | (2006.01) |
| ***G06F 17/18*** | (2006.01) |
| ***G06F 3/048*** | (2013.01) |
| ***G06F 9/451*** | (2018.01) |

(52) U.S. Cl.
CPC .......... *G06F 11/3636* (2013.01); *G06F 3/048* (2013.01); *G06F 9/453* (2018.02); *G06F 11/3612* (2013.01); *G06F 11/3616* (2013.01); *G06F 17/18* (2013.01); *G06T 11/206* (2013.01)

(58) Field of Classification Search
CPC ............. G06F 11/3636; G06F 11/3612; G06F 11/3616; G06F 11/206; G06F 9/453; G06F 3/048; G06F 17/18
USPC .......................................................... 717/128
See application file for complete search history.

(56) References Cited

U.S. PATENT DOCUMENTS 4,357,673 A * 11/1982 Willis ...................... G01D 1/14 356/319
4,458,323 A * 7/1984 Willis ...................... G01D 1/14 356/319
6,778,873 B1 * 8/2004 Wang ................ G05B 19/4184 700/109

(Continued)

OTHER PUBLICATIONS

Logothetis et al, "Scalable Lineage Capture for Debugging DISC Analytics", [Online], 2013, pp. 1-15, [Retrieved from internet on May 7, 2019], <http://delivery.acm.org/10.1145/2530000/2523619/a17-logothetis.pdf> (Year: 2013).*

(Continued)

*Primary Examiner* — Ziaul A Chowdhury
*Assistant Examiner* — Zengpu Wei
(74) *Attorney, Agent, or Firm* — Morgan, Lewis & Bockius LLP

(57) ABSTRACT

A method enables users to resolve errors in a data flow. The method displays a user interface (UI) that includes a flow diagram having a plurality of nodes, receives user specification of a validation rule for a first node of the plurality of nodes in the flow diagram, and determines that an intermediate data set violates the validation rule. In response to determining that the first intermediate data set violates the validation rule, the method identifies errors corresponding to rows in the intermediate data set, and displays an error resolution UI that provides information about the errors. The error resolution UI includes a natural language summary region providing a synopsis of the errors, an error profile region graphically depicting the errors, a data flow trace region providing lineage of the errors in the flow, and a data region displaying data for a subset of columns from the intermediate data set.

20 Claims, 60 Drawing Sheets

(56) References Cited

U.S. PATENT DOCUMENTS

| | | | | |
|---|---|---|---|---|
| 7,793,160 | B1 * | 9/2010 | McClure | G06F 11/3636 714/37 |
| 2003/0220928 | A1 | 11/2003 | Durand et al. | |
| 2005/0010877 | A1 * | 1/2005 | Udler | G06F 9/451 715/826 |
| 2006/0143534 | A1 * | 6/2006 | Dall | G06F 11/3636 714/38.11 |
| 2006/0247912 | A1 * | 11/2006 | Suzuki | G06F 11/3616 704/1 |
| 2007/0150581 | A1 * | 6/2007 | Banerjee | H04L 41/22 709/224 |
| 2007/0198312 | A1 * | 8/2007 | Bagchi | G06Q 10/06 705/7.41 |
| 2008/0059563 | A1 | 3/2008 | Backmann et al. | |
| 2008/0155440 | A1 | 6/2008 | Trevor et al. | |
| 2008/0281801 | A1 | 11/2008 | Larson et al. | |
| 2011/0302551 | A1 * | 12/2011 | Hummel, Jr. | G06Q 10/06 717/105 |
| 2012/0151453 | A1 * | 6/2012 | Finking | G06F 11/3612 717/130 |
| 2012/0226742 | A1 * | 9/2012 | Momchilov | G06F 3/1454 709/203 |
| 2013/0042154 | A1 * | 2/2013 | Agarwal | G06F 11/3612 714/38.14 |
| 2013/0080197 | A1 * | 3/2013 | Kung | G06Q 10/10 705/7.11 |
| 2013/0283106 | A1 * | 10/2013 | King | G06F 11/327 714/49 |
| 2015/0106456 | A1 * | 4/2015 | van Hoek | H04W 4/12 709/206 |
| 2015/0324437 | A1 * | 11/2015 | Jiang | G06F 17/246 707/602 |
| 2015/0378863 | A1 * | 12/2015 | Balachandran | G06F 11/3476 717/130 |
| 2015/0378869 | A1 * | 12/2015 | Balachandran | G06F 11/3624 714/38.1 |
| 2016/0070430 | A1 | 3/2016 | Kim et al. | |
| 2016/0070451 | A1 | 3/2016 | Kim et al. | |
| 2016/0364434 | A1 * | 12/2016 | Spitz | G06F 17/30371 |
| 2017/0005674 | A1 * | 1/2017 | Hussain | H03M 13/2975 |
| 2017/0116396 | A1 | 4/2017 | Gu et al. | |
| 2017/0315516 | A1 * | 11/2017 | Kozionov | G01H 1/003 |
| 2019/0004929 | A1 * | 1/2019 | Fastabend | G06F 11/3636 |

OTHER PUBLICATIONS

Ishio et al, "A Lightweight Visualization of Interprocedural Data-Flow Paths for Source Code Reading", [Online], 2012, pp. 37-46, [Retrieved from internet on May 7, 2019], <https://ieeexplore.ieee.org/stamp/stamp.jsp?tp=&arnumber=6240506> (Year: 2012).*

Yip et al, "Improving Application Security with Data Flow Assertions", [Online], 2009, pp. 1-18, [Retrieved from internet on May 7, 2019], <http://www.sigops.org/s/conferences/sosp/2009/papers/yip-sosp09.pdf> (Year: 2009).*

Tableau Software, Inc., International Search Report and Written Opinion, PCT/US2017/060232, dated Jan. 18, 2018, 10 pgs.

Tibco, "Tibco ActiveMatrix BusinessWorks™ Process Design Software Release 5.13," Aug. 31, 2015, retrieved from the Internet: URL:https://docs.tibco.com/pub/activematrix_businessworks/5.13.0/doc/pdf/tib_bw_process_design_guide.pdf, 107 pgs.

Bae, J., Understanding Indirect Casual Relationships in Node-Link Graphs, Eurographics Conference on Visualization (Euro Vis) Jun. 2017, vol. 36, No. 3, 12 pgs.

Kim, Notice of Allowance, U.S. Appl. No. 15/701,381, dated Nov. 9, 2018, 6 pgs.

Ghani, S., Perception of Animated Node-Link Diagrams Graphs, Eurographics Conference on Visualization, (Euro Vis) Jun. 2012, vol. 31, No. 3, 11 pgs.

* cited by examiner

| Concept/Abstraction | Always Relevant | Always relevant, but content changes based on node | Relevant based on Node |
|---|---|---|---|
| Flow Diagram | XXXXXX | | |
| Profile Pane | | XXXXXX | |
| Data Pane | | XXXXXX | |
| Node Specific Panes | | | XXXXXX |
| Data Source Palette/Chooser | XXXXXX | | |
| Operations "Palette" | XXXXXX | | |
| Other Flow "Palette" | XXXXXX | | |
| Node Internals | | XXXXXX | |
| Project Model | XXXXXX | | |
| Operations Status | XXXXXX | | |

Figure 3C

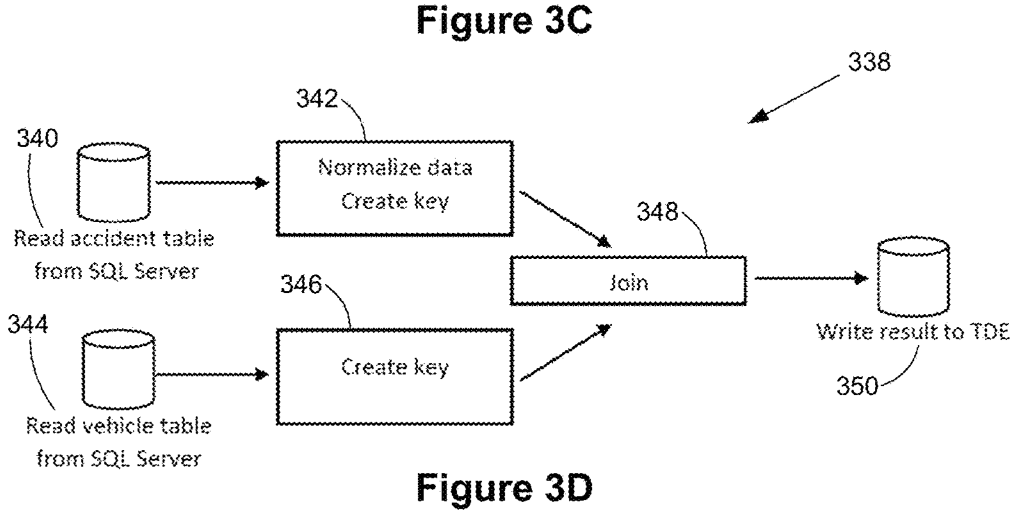

Figure 3D

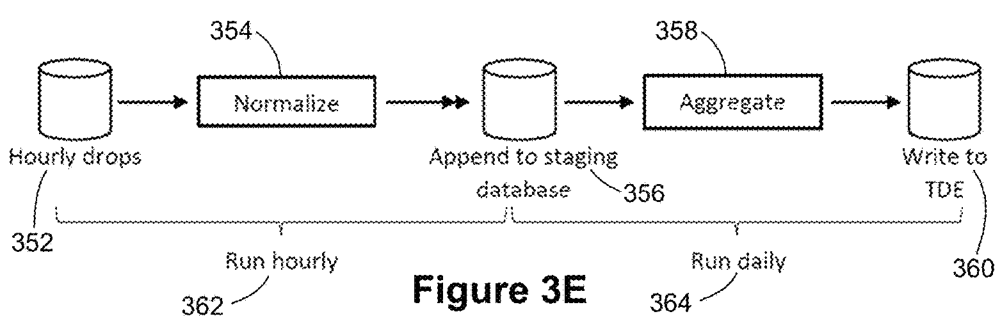

Figure 3E

```
01> Level,Date and Time,Source,Event ID,Task Category
02> Information,11/4/2015 11:12:41 AM,Service Control Manager,7036,None,The Microsoft
    Software Shadow Copy Provider service entered the running state.
03> Information,11/4/2015 10:37:07 AM,Service Control Manager,7045,None,"A service was
    installed in the system.
04>
05> Service Name:  Sophos Web Intelligence Update
06> Service File Name:  ""C:\ProgramData\Sophos\Web Intelligence\swi_update_64.exe""
07> Service Type:  user mode service
08> Service Start Type:  auto start
09> Service Account:  LocalSystem"
10> Information,11/4/2015 10:31:43 AM,Service Control Manager,7036,None,The Microsoft
    Software Shadow Copy Provider service entered the stopped state.
11> Information,11/4/2015 10:28:43 AM,Service Control Manager,7036,None,The Volume Shadow
    Copy service entered the stopped state.
12> ...
```

Figure 5A

SAS Name: ROAD_FNC

Attribute Codes

*1975-1980*

This data element is included in the format, but is not initialized. Do not use it.

*1981-1986*

1 Principal Arterial -- Interstate
2 Principal Arterial -- Other Urban Freeways and Expressways
3 Principal Arterial -- Other
4 Minor Arterial
5 Urban Collector
6 Major Rural Collector
7 Minor Rural Collector
8 Local Road or Street
9 Unknown

*1987-Later*

*RURAL*

01 Principal Arterial -- Interstate
02 Principal Arterial -- Other
03 Minor Arterial
04 Major Collector
05 Minor Collector
06 Local Road or Street
09 Unknown

*URBAN*

11 Principal Arterial -- Interstate
12 Principal Arterial -- Other Freeways or Expressways
13 Other Principal Arterial
14 Minor Arterial
15 Collector
16 Local Road or Street
19 Unknown 99 Unknown

Figure 5B

Operations

- Join (various types with various predicates)
- Union
- Custom SQL
- Unpivot (aka pivot)
- Rename field
- Filter
- Project scalar calculations
- Restrict columns
- Aggregate
- Sampling
- Data Type
- Split
- Date Parse
- Coalesce
- Table Calculations
- Merge fields
- Data quality visualizations
- Bin
- Replace values
- Pivot
- Remove Blank Rows
- Fuzzy Join
- Geocoding Tables as Data
- Materialize Geocoding
- Address Geocoding
- Potter's Wheel text cleanup
- Call out to external procedure (R, Python, etc.)
- Fill Down

Figure 6A

Inputs

- Row-level connectors
- Excel Data Interpreter
- Data source as input
- JSON Import
- Type in your own table
- PDF Import
- Sheet as input table
- HTML Import
- XML Import
- Cubes

Figure 6B

Outputs

- TDE (Tableau Data Extract)
- CSV
- Replace/Append Data Source
- Output to ODBC
- Update Data Source
- High-performance output to common stores

Figure 6C

Type Environments

Figure 8C

| Property | Description |
|---|---|
| Open | Whether looking up a field that is not listed should be considered an error, or resolved as a potential field that could be any type. |
| Types | A map going from fieldname to a type. |
| NotPresent | A set of field names that we know are not present (even if the type is closed). |
| AssumedTypes | All the types that were added while processing Type Environments because they were referenced, rather than because they were explicitly added by an operation. |
| Previous | A pointer to the Type Environment that was used to create this one. |

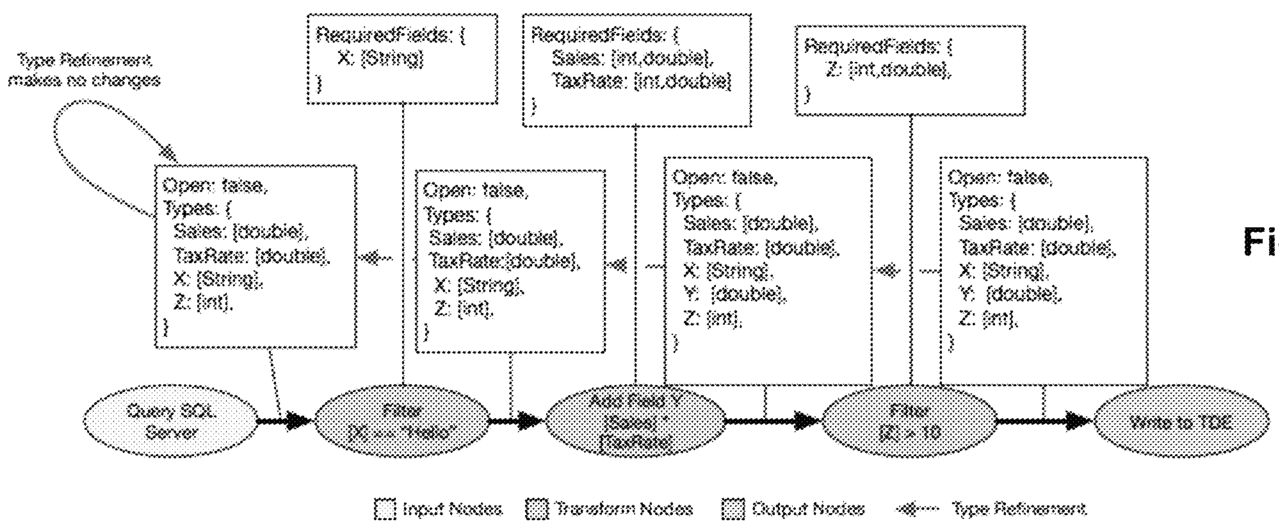

Figure 8D

| Name | Is Open | Multi Inputs | Input Type | Resulting Type |
|---|---|---|---|---|
| Filter (All filter types) | True | False | * All fields used in expression | * Start with input type<br><br>* Narrow any field types based on the expression used to filter. |
| Add Column | True | False | * All fields used in expression<br><br>NOTE: Currently, we will NOT require that the field being created does not exist. We will simply have a new one override the initial one. | * Start with input type<br><br>* Add the new field, or update the existing one.<br><br>* Narrow any field types based on the expression used to create the field. |
| Join | True | True | * All fields that are joined upon | * Merge the input tables. This will collapse joined columns with the same name and will rename any columns that conflict name-wise based on the rules listed below.<br><br>* Narrow the types for the joined fields (if possible) |
| Aggregate | False | False | * All fields being aggregated<br>* All fields being grouped on | * Start with all fields being grouped on<br><br>* Add all aggregated fields<br><br>* Mark type as "Closed" |
| Union | True | True | | * Union of all the post-mapped columns coming in. |

Figure 8J-1

| Name | Is Open | Multi Inputs | Input Type | Resulting Type |
|---|---|---|---|---|
| Tableau Pivot | True | False | * Fields getting unpivoted | * Start with Input Type<br><br>* Remove columns getting unpivotted from the type, and mark as "not present"<br><br>* Add the new unpivoted col<br><br>* Add the unpivot result col |
| Tableau Unpivot | True | False | * Field to pivot<br>* Any fields used in pivot calc | * Start with input type<br><br>* Remove field to pivot from the type, and mark as "not present"<br><br>* Add pivot values as fields |
| Rename Field | True | False | * Contains the field that will be re-named<br><br>* Does NOT contain the field that it will be renamed to | * Starts with the input type<br><br>* Remove the field being renamed from the type, and mark as "not present"<br><br>* Add a field for the new name, with the same type as the original field. |
| Remove Column | True | False | * Contains the field to be removed | * Starts with the input type<br><br>* Removes the field from the type, and mark as "not present" |

Figure 8J-2

| Name | Is Open | Multi Inputs | Input Type | Resulting Type |
|---|---|---|---|---|
| Restrict Columns | False | False | | * Starts with the input type<br><br>* Removes all the columns that are NOT on the list to include.<br><br>* Mark type as "Closed" |
| Convert Column | True | False | * Contains the field to be converted | * Start with the input type<br><br>* Change the type of the selected column to the new type |
| Coalesce | True | False | * Contains the field to be coalesced and any of the other fields referenced in the coalesce. | * Start with the input type<br><br>* Add new coalesce column with the resulting type |
| Merge Columns | True | False | * Contains the columns that will be merged | * Start with the input type<br><br>* Add a new field that concatenates the merge fields<br><br>* Remove the merged fields from the type and mark as "not present" |
| Split Column | True | False | * Contains the column that will be split<br><br>* Does NOT contain the resulting columns from the split | * Start with the input type<br><br>* Add the new fields from the split, as the appropriate types. |
| Map Values | True | False | * Contains the column that will be mapped | * Same as the input type |
| Input Operations | False | False | | * Create field for every field in the input<br><br>* Mark type as "Closed" |

Figure 8J-3

RESOLUTION OF DATA FLOW ERRORS USING THE LINEAGE OF DETECTED ERROR CONDITIONS

RELATED APPLICATIONS

This application is related to U.S. patent application Ser. No. 15/701,381, filed Sep. 11, 2017, entitled "Optimizing Execution of Data Transformation Flows," and U.S. patent application Ser. No. 15/345,391, filed Nov. 7, 2016, entitled "User Interface to Prepare and Curate Data for Subsequent Analysis," each of which is incorporated by reference herein in its entirety.

TECHNICAL FIELD

The disclosed implementations relate generally preparing and curating data, and more specifically to handling errors encountered in the preparation and curation of data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. In many cases, it is difficult to build data visualizations using raw data sources. For example, there may be errors in the raw data, there may be missing data, the data may be structured poorly, or data may be encoded in a non-standard way. Because of this, data analysts commonly use data preparation tools (e.g., an ETL tool), to transform raw data from one or more data sources into a format that is more useful for reporting and building data visualizations. These tools generally build a data flow that specifies how to transform the data one step at a time.

While executing a data flow, errors can be detected. These errors can occur because of problems in the raw data, and errors can be introduced by the data flow itself (e.g., specifying a join improperly). Although some tools may be able to identify error conditions, the tools rarely provide enough useful information for a user to understand the error and resolve the root cause. This is particularly problematic when dealing with large and/or complex data sets, or for a data flow that is complex. For example, an error condition may be detected many steps after the root error actually occurred.

SUMMARY

Accordingly, there is a need for systems and methods of detecting errors in a data flow and providing a lineage of the detected errors according to the data flow. When an error condition is detected at a particular node in a data flow, the lineage allows a user to visually trace the error (or multiple errors) back through the nodes in the data flow to help identify the original cause of the error. Moreover, displaying an error resolution user interface with information about the detected errors improves a user's ability to understand the cause of the error. Such methods and systems can also provide a user with a process to repair the error.

In accordance with some implementations, a method is performed at a computer having a display, one or more processors, and memory storing one or more programs configured for execution by the one or more processors. The method displays a user interface that includes a flow diagram having a plurality of nodes, each node specifying a respective operation and having a respective intermediate data set. A user specifies a validation rule for a first node of the plurality of nodes in the flow diagram. The validation rule specifies a condition that applies to a first intermediate data set corresponding to the first node. The method determines that the first intermediate data set violates the validation rule. In response, the method (i) identifies one or more errors corresponding to one or more rows of data in the first intermediate data set and (ii) displays an error resolution user interface, which provides information about the one or more errors. The error resolution user interface includes (i) a natural language summary region, which provides a synopsis of the one or more errors. The synopsis specifies the number of errors identified, the error types, and the number of errors for each of the one or more error types. The error resolution user interface also includes (ii) an error profile region graphically depicting the one or more errors, including, for each error type, a respective visual mark that depicts the respective number of errors for the respective error type. The error resolution user interface also includes (iii) a data flow trace region, which provides the lineage of the one or more errors according to the flow diagram. The lineage includes (1) a visual representation of at least a subset of the plurality of nodes, (2) a visual representation for each respective operation associated with each of the plurality of nodes, (3) a graphic depiction of errors, if any, at each represented node, and (4) a data region displaying data for a subset of columns from the first intermediate data set.

In some implementations, the natural language summary region is linked to the error profile region, the data flow trace region, and the data region. In response to detecting a user input in the natural language summary region, the method updates the display of the error profile region, the data flow trace region, and the data region according to the detected user input. This includes emphasizing the portions of the error profile region, the data flow trace region, and the data region that correspond to the detected user input. In some implementations, detecting the user input includes detecting a selection on an affordance of the synopsis provided in the natural language summary region.

In some implementations, the method further includes, after identifying the one or more errors: determining a proposed solution for at least some of the one or more errors. The proposed solution is based, at least in part, on data values in the first intermediate data set. The method prompts the user to execute the determined proposed solution.

In some implementations, the method further includes receiving a user input in the data flow trace region. The user input selects a respective error of the one or more errors. In response to receiving the user input, the method updates the data flow trace region to provide a lineage of the respective error, including an updated graphic depiction for the respective error at each represented node. In some implementations, the method further includes, in response to receiving the user input, updating the data region to display data for a subset of columns from the first intermediate data set corresponding to the lineage of the respective error.

In some implementations, each respective column in the subset of columns includes: (i) an error population region displaying an error population of the respective column, and (ii) a non-error population region displaying a non-error population of the respective column. In some implementations, the error population region and the non-error population region are displayed in a graph in the data region. The graph illustrates differing values between the error population and the non-error population, common values between the error population and the non-error population, and null values in the error population. In some implementations, the graph emphasizes a portion of the error population in a respective column in the subset of columns, the emphasized portion indicating that the respective column has a highest concentration of the one or more errors.

In some implementations, the validation rule for the first node is part of a set of validation rules for the plurality of nodes. In some implementations, the validation rule is a first validation rule and a second validation rule in the set applies to a second node in the plurality of nodes. In some implementations, a third validation rule in the set applies to each node in the plurality of nodes. It should be noted that the first validation rule may apply to multiple nodes in the plurality of nodes, depending on user selection.

In some implementations, each node specifies a respective operation to (i) retrieve data from a respective data source, (ii) transform data, or (iii) create a respective output data set.

In some implementations, the synopsis further includes a ranking of the one or more errors, including a top ranked error.

In some implementations, the error profile region displays a Pareto chart in which each bar corresponds to a distinct error type. In some implementations, a first error type included in the Pareto chart is a quantitative error and a second error type included in the Pareto chart is a qualitative error. Alternatively, in some implementations, the error profile region displays a pie chart (or some other chart) in which each section of the pie chart corresponds to a distinct error type. A size of each bar in the Pareto chart (or a size of the segment in the pie chart) corresponds to the number of errors for the distinct error type.

In accordance with some implementations, a computer system includes one or more processors/cores, memory, and one or more programs. The one or more programs are stored in the memory and configured to be executed by the one or more processors/cores. The one or more programs include instructions for performing the operations of the method described above, or any of the methods described below. In accordance with some implementations, a computer-readable storage medium stores instructions for the one or more programs. When executed by one or more processors/cores of a computer system, these instructions cause the computer system to perform the operations of the method described above, or any of the methods described below.

In accordance with some implementations, the above method described above is executed at an electronic device with a display. For example, the electronic device can be a smart phone, a tablet, a notebook computer, or a desktop computer.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIG. 3C describes some features of the user interfaces shown in FIGS. 3A and 3B.

FIG. 3D illustrates a sample flow diagram in accordance with some implementations.

FIG. 3E illustrates a pair of flows that work together but run at different frequencies, in accordance with some implementations.

FIG. 5A illustrates a portion of a log file in accordance with some implementations.

FIG. 5B illustrates a portion of a lookup table in accordance with some implementations.

FIGS. 6A-6C illustrate some operations, inputs, and output for a flow, in accordance with some implementations.

FIG. 8C illustrates properties of a type environment in accordance with some implementations.

FIG. 8D illustrates simple type checking based on a flow with all data types known, in accordance with some implementations.

FIGS. 8J-1, 8J-2, and 8J-3 indicate the properties for many of the most commonly used operators, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
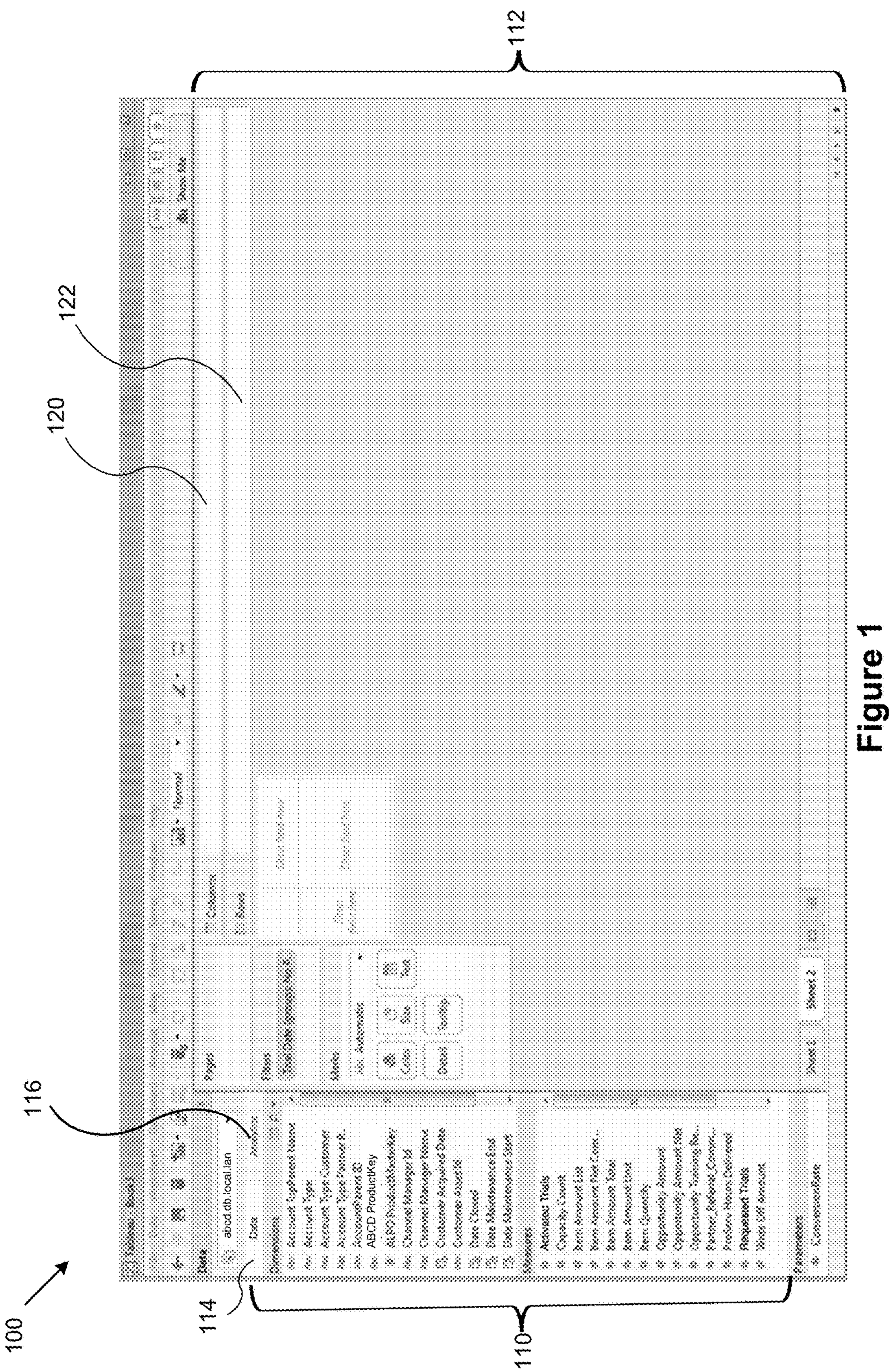
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
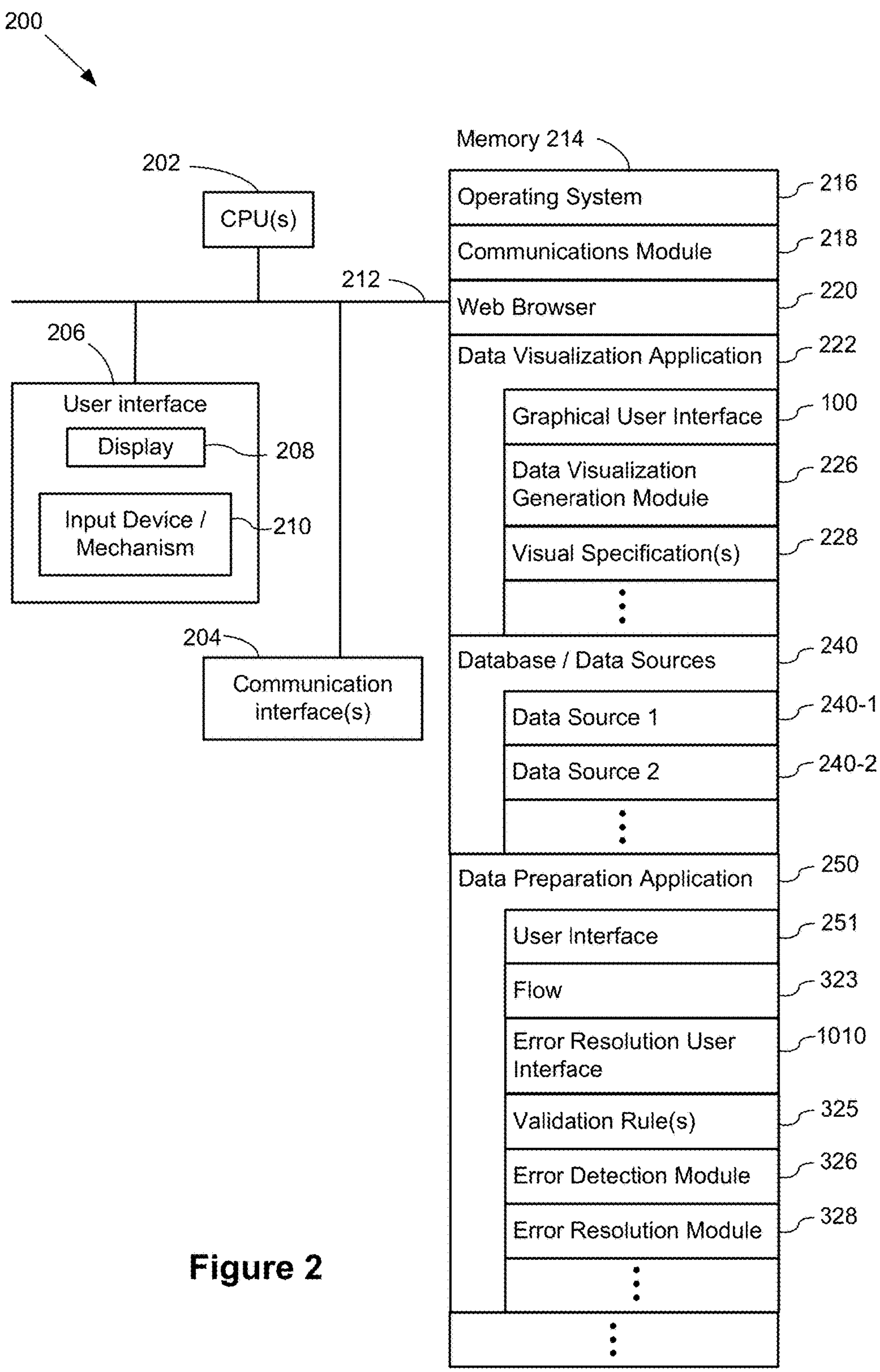
FIG. 2 is a block diagram of a computing device according to some implementations.

FIG. 2 is a block diagram illustrating a computing device 200 that can display the graphical user interface 100 in accordance with some implementations. The computing device can also be used by a data preparation ("data prep") application 250. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, includes a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML, files, or flat files, or stored in a relational database.

In some instances, the computing device 200 stores a data preparation application 250, which can be used to analyze and massage data for subsequent analysis (e.g., by a data visualization application 222). FIG. 3B illustrates one example of a user interface 251 used by a data prep application 250. The data prep application 250 enables users to build flows 323, as described in more detail below. FIG.

10B illustrates an error resolution user interface 1010 used by the data prep application 250. The error resolution user interface 1010 enables a user to understand the lineage of errors found during flow execution, as discussed below with reference to FIGS. 10A and 10B and the method 1200. In some implementations, the data prep application 250 includes both the user interface 251 and the error resolution user interface 1010 (e.g., a user may access the error resolution user interface 1010 by interacting with the flows 323 displayed in the user interface 251). Alternatively, in some implementations, a first data prep application corresponds to the user interface 251 and a second data preparation application corresponds to the error resolution user interface 1010.

In some implementations, the data prep application 250 includes additional modules used for generating the error resolution user interface 1010. For example, the data prep application 250 may include an error detection module 326 that is used for identifying data flow errors. The data prep application 250 may also include an error resolution module 328 (which in some implementations includes a natural language generation module) that is used for creating a synopsis of the errors identified by the error detection module. The data prep application 250 may include additional modules that are used for generating the error resolution user interface 1010 (e.g., similar to the data visualization generation module 226).

In some implementations, the data prep application 250 includes one or more validation rules 325 (or a set of validation rules) that are used by the error detection module to identify errors in a flow. In some implementations, a user can apply a specific validation rule 325 (or multiple validation rules) to a node (or nodes) within the flow diagram. Moreover, in some implementations, the data prep application 250 includes pre-loaded validation rules that apply by default to all nodes in the flow diagram.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
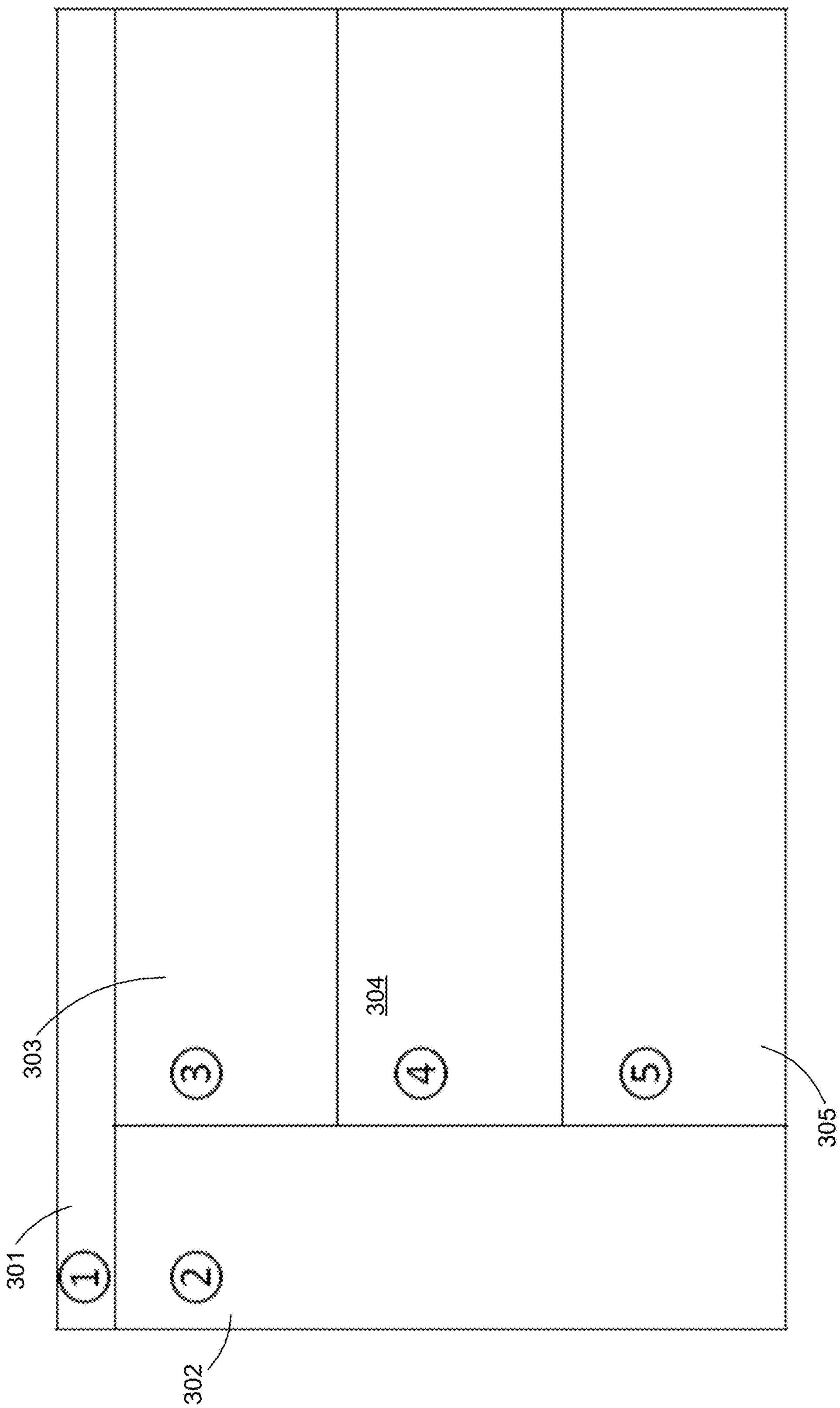
FIGS. 3A and 3B illustrate user interfaces for a data preparation application in accordance with some implementations.
Figure 3B:
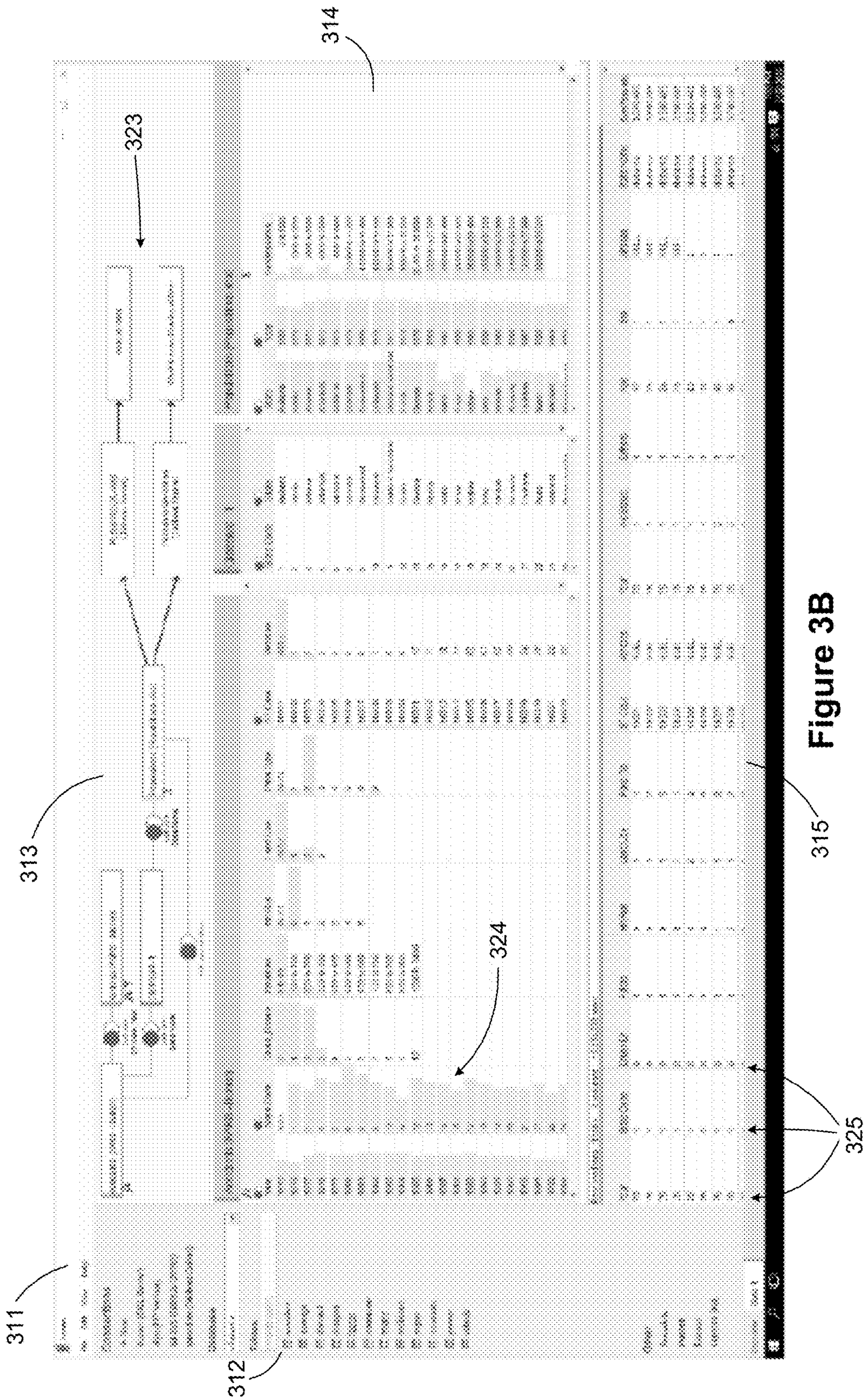

FIGS. 3A and 3B illustrate a user interface for preparing data in accordance with some implementations. In these implementations, there are at least five regions, which have distinct functionality. FIG. 3A shows this conceptually as a menu bar region 301, a left-hand pane 302, a flow pane 303, profile pane 304, and a data pane 305. In some implementations, the profile pane 304 is also referred to as the schema pane. In some implementations, the functionality of the "left-hand pane" 302 is in an alternate location, such as below the menu pane 301 or below the data pane 305.

This interface provides a user with multiple streamlined, coordinated views that help the user to see and understand what they need to do. This novel user interface presents users with multiple views of their flow and their data to help them not only take actions, but also discover what actions they need to take. The flow diagram in the flow pane 303 combines and summarizes actions, making the flow more readable, and is coordinated with views of actual data in the profile pane 304 and the data pane 305. The data pane 305 provides representative samples of data at every point in the logical flow, and the profile pane provides histograms of the domains of the data.

In some implementations, the Menu Bar 301 has a File menu with options to create new data flow specifications, save data flow specifications, and load previously created data flow specifications. In some instances, a flow specification is referred to as a flow. A flow specification describes how to manipulate input data from one or more data sources to create a target data set. The target data sets are typically used in subsequent data analysis using a data visualization application.

In some implementations, the Left-Hand Pane 302 includes a list of recent data source connections as well as a button to connect to a new data source.

In some implementations, the Flow Pane 303 includes a visual representation (flow diagram or flow) of the flow specification. In some implementations, the flow is a node/link diagram showing the data sources, the operations that are performed, and target outputs of the flow.

Some implementations provide flexible execution of a flow by treating portions of flow as declarative queries. That is, rather than having a user specify every computational detail, a user specifies the objective (e.g., input and output). The process that executes the flow optimizes plans to choose execution strategies that improve performance. Implementations also allow users to selectively inhibit this behavior to control execution.

In some implementations, the Profile Pane 304 displays the schema and relevant statistics and/or visualizations for the nodes selected in the Flow Pane 303. Some implementations support selection of multiple nodes simultaneously, but other implementations support selection of only a single node at a time.

In some implementations, the Data Pane 305 displays row-level data for the selected nodes in the Flow Pane 303.

In some implementations, a user creates a new flow using a "File→New Flow" option in the Menu Bar. Users can also add data sources to a flow. In some instances, a data source is a relational database. In some instances, one or more data sources are file-based, such as CSV files or spreadsheet files. In some implementations, a user adds a file-based source to the flow using a file connection affordance in the left-hand pane 302. This opens a file dialog that prompts the user to choose a file. In some implementations, the left hand pane 302 also includes a database connection affordance, which enables a user to connect to a database (e.g., an SQL database).

When a user selects a node (e.g., a table) in the Flow Pane 303, the schema for the node is displayed in the Profile Pane 304. In some implementations, the profile pane 304 includes statistics or visualizations, such as distributions of data values for the fields (e.g., as histograms or pie charts). In implementations that enable selection of multiple nodes in the flow pane 303, schemas for each of the selected nodes are displayed in the profile pane 304.

In addition, when a node is selected in the Flow Pane 303, the data for the node is displayed in the Data Pane 305. The data pane 305 typically displays the data as rows and columns.

Implementations make it easy to edit the flow using the flow pane 303, the profile pane 304, or the data pane 305. For example, some implementations enable a right click operation on a node/table in any of these three panes and add a new column based on a scalar calculation over existing columns in that table. For example, the scalar operation could be a mathematical operation to compute the sum of three numeric columns, a string operation to concatenate string data from two columns that are character strings, or a conversion operation to convert a character string column into a date column (when a date has been encoded as a character string in the data source). In some implementations, a right-click menu (accessed from a table/node in the Flow Pane 303, the Profile Pane 304, or the Data Pane 305) provides an option to "Create calculated field . . . " Selecting this option brings up a dialog to create a calculation. In some implementations, the calculations are limited to scalar computations (e.g., excluding aggregations, custom Level of Detail calculations, and table calculations). When a new column is created, the user interface adds a calculated node in the Flow Pane 303, connects the new node to its antecedent, and selects this new node. In some implementations, as the number of nodes in the flow diagram gets large, the flow pane 303 adds scroll boxes. In some implementations, nodes in the flow diagram can be grouped together and labeled, which is displayed hierarchically (e.g., showing a high-level flow initially, with drill down to see the details of selected nodes).

A user can also remove a column by interacting with the Flow Pane 303, the Profile Pane 304, or the Data Pane 305 (e.g., by right clicking on the column and choosing the "Remove Column" option. Removing a column results in adding a node to the Flow Pane 303, connecting the new node appropriately, and selecting the new node.

In the Flow Pane 303, a user can select a node and choose "Output As" to create a new output dataset. In some implementations, this is performed with a right click. This brings up a file dialog that lets the user select a target file name and directory (or a database and table name). Doing this adds a new node to the Flow Pane 303, but does not actually create the target datasets. In some implementations, a target dataset has two components, including a first file (a Tableau Data Extract or TDE) that contains the data, and a corresponding index or pointer entry (a Tableau Data Source or TDS) that points to the data file.

The actual output data files are created when the flow is run. In some implementations, a user runs a flow by choosing "File→Run Flow" from the Menu Bar 301. Note that a single flow can produce multiple output data files. In some implementations, the flow diagram provides visual feedback as it runs.

In some implementations, the Menu Bar 301 includes an option on the "File" menu to "Save" or "Save As," which enables a user to save the flow. In some implementations, a flow is saved as a ".loom" file. This file contains everything needed to recreate the flow on load. When a flow is saved, it can be reloaded later using a menu option to "Load" in the "File" menu. This brings up a file picker dialog to let the user load a previous flow.

FIG. 3B illustrates a user interface for data preparation, showing the user interface elements in each of the panes. The menu bar 311 includes one or more menus, such as a File menu and an Edit menu. Although the edit menu is available, more changes to the flow are performed by interacting with the flow pane 313, the profile pane 314, or the data pane 315.

In some implementations, the left-hand pane 312 includes a data source palette/selector, which includes affordances for locating and connecting to data. The set of connectors includes extract-only connectors, including cubes. Implementations can issue custom SQL expressions to any data source that supports it.

The left-hand pane 312 also includes an operations palette, which displays operations that can be placed into the flow. This includes arbitrary joins (of arbitrary type and with various predicates), union, pivot, rename and restrict column, projection of scalar calculations, filter, aggregation, data type conversion, data parse, coalesce, merge, split, aggregation, value replacement, and sampling. Some implementations also support operators to create sets (e.g., partition the data values for a data field into sets), binning (e.g., grouping numeric data values for a data field into a set of ranges), and table calculations (e.g., calculate data values (e.g., percent of total) for each row that depend not only on the data values in the row, but also other data values in the table).

The left-hand pane 312 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 313 displays a visual representation (e.g., node/link flow diagram) 323 for the current flow. The Flow Pane 313 provides an overview of the flow, which serves to document the process. In many existing products, a flow is overly complex, which hinders comprehension. Disclosed implementations facilitate understanding by coalescing nodes, keeping the overall flow simpler and more concise. As noted above, as the number of nodes increases, implementations typically add scroll boxes. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 313 shows just the nodes within the super node, and the flow pane 313 has a heading that identifies what portion of the flow is being display. Implementations typically enable multiple hierarchical levels. A complex flow is likely to include several levels of node nesting.

As described above, the profile pane 314 includes schema information about the data at the currently selected node (or nodes) in the flow pane 313. As illustrated here, the schema information provides statistical information about the data, such as a histogram 324 of the data distribution for each of the fields. A user can interact directly with the profile pane to modify the flow 323 (e.g., by selecting a data field for filtering the rows of data based on values of that data field). The profile pane 314 also provides users with relevant data about the currently selected node (or nodes) and visualizations that guide a user's work. For example, histograms 324 show the distributions of the domains of each column. Some implementations use brushing to show how these domains interact with each other.

An example here illustrates how the process is different from typical implementations by enabling a user to directly manipulate the data in a flow. Consider two alternative ways of filtering out specific rows of data. In this case, a user wants to exclude California from consideration. Using a typical tool, a user selects a "filter" node, places the filter into the flow at a certain location, then brings up a dialog box to enter the calculation formula, such as "state_ name< >'CA'". In disclosed implementations here, the user can see the data value in the profile pane 314 (e.g., showing the field value 'CA' and how many rows have that field value) and in the data pane 315 (e.g., individual rows with 'CA' as the value for state_name). In some implementations, the user can right click on "CA" in the list of state names in the Profile Pane 314 (or in the Data Pane 315), and choose "Exclude" from a drop down. The user interacts with the data itself, not a flow element that interacts with the data. Implementations provide similar functionality for calculations, joins, unions, aggregates, and so on. Another benefit of the approach is that the results are immediate. When "CA" is filtered out, the filter applies immediately. If the operation takes some time to complete, the operation is performed asynchronously, and the user is able to continue with work while the job runs in the background.

The data pane 315 displays the rows of data corresponding to the selected node or nodes in the flow pane 313. Each of the columns 315 corresponds to one of the data fields. A user can interact directly with the data in the data pane to modify the flow 323 in the flow pane 313. A user can also interact directly with the data pane to modify individual field values. In some implementations, when a user makes a change to one field value, the user interface applies the same change to all other values in the same column whose values (or pattern) match the value that the user just changed. For example, if a user changed "WA" to "Washington" for one field value in a State data column, some implementations update all other "WA" values to "Washington" in the same column. Some implementations go further to update the column to replace any state abbreviations in the column to be full state names (e.g., replacing "OR" with "Oregon"). In some implementations, the user is prompted to confirm before applying a global change to an entire column. In some implementations, a change to one value in one column can be applied (automatically or pseudo-automatically) to other columns as well. For example, a data source may include both a state for residence and a state for billing. A change to formatting for states can then be applied to both.

The sampling of data in the data pane 315 is selected to provide valuable information to the user. For example, some implementations select rows that display the full range of values for a data field (including outliers). As another example, when a user has selected nodes that have two or more tables of data, some implementations select rows to assist in joining the two tables. The rows displayed in the data pane 315 are selected to display both rows that match between the two tables as well as rows that do not match. This can be helpful in determining which fields to use for joining and/or to determine what type of join to use (e.g., inner, left outer, right outer, or full outer).

FIG. 3C illustrates some of the features shown in the user interface, and what is shown by the features. As illustrated above in FIG. 3B, the flow diagram 323 is always displayed in the flow pane 313. The profile pane 314 and the data pane 315 are also always shown, but the content of these panes changes based on which node or nodes are selected in the flow pane 313. In some instances, a selection of a node in the flow pane 313 brings up one or more node specific panes (not illustrated in FIG. 3A or FIG. 3B). When displayed, a node specific pane is in addition to the other panes. In some implementations, node specific panes are displayed as floating popups, which can be moved. In some implementations, node specific panes are displayed at fixed locations within the user interface. As noted above, the left-hand pane 312 includes a data source palette/chooser for selecting or opening data sources, as well as an operations palette for selecting operations that can be applied to the flow diagram 323. Some implementations also include an "other flow palette," which enables a user to import all or part of another flow into the current flow 323.

Different nodes within the flow diagram 323 perform different tasks, and thus the node internal information is different. In addition, some implementations display different information depending on whether or not a node is selected. For example, an unselected node includes a simple description or label, whereas a selected node displays more detailed information. Some implementations also display status of operations. For example, some implementations display nodes within the flow diagram 323 differently depending on whether or not the operations of the node have been executed. In addition, within the operations palette, some implementations display operations differently depending on whether or not they are available for use with the currently selected node.

A flow diagram 323 provides an easy, visual way to understand how the data is getting processed, and keeps the process organized in a way that is logical to a user. Although a user can edit a flow diagram 323 directly in the flow pane 313, changes to the operations are typically done in a more immediate fashion, operating directly on the data or schema in the profile pane 314 or the data pane 315 (e.g., right clicking on the statistics for a data field in the profile pane to add or remove a column from the flow).

Rather than displaying a node for every tiny operation, users are able to group operations together into a smaller number of more significant nodes. For example, a join followed by removing two columns can be implemented in one node instead of three separate nodes.

Within the flow pane 313, a user can perform various tasks, including:

Change node selection. This drives what data is displayed in the rest of the user interface.

Pin flow operations. This allows a user to specify that some portion of the flow must happen first, and cannot be reordered.

Splitting and Combining operations. Users can easily reorganize operation to match a logical model of what is going on. For example, a user may want to make one node called "Normalize Hospital Codes," which contains many operations and special cases. A user can initially create the individual operations, then coalesce the nodes that represent individual operations into the super node "Normalize Hospital Codes." Conversely, having created a node that contains many individual operations, a user may choose to split out one or more of the operations (e.g., to create a node that can be reused more generally).

The profile pane 314 provides a quick way for users to figure out if the results of the transforms are what they expect them to be. Outliers and incorrect values typically "pop out" visually based on comparisons with both other values in the node or based on comparisons of values in other nodes. The profile pane helps users ferret out data problems, regardless of whether the problems are caused by incorrect transforms or dirty data. In addition to helping users find the bad data, the profile pane also allows direct interactions to fix the discovered problems. In some implementations, the profile pane 314 updates asynchronously.

When a node is selected in the flow pane, the user interface starts populating partial values (e.g., data value distribution histograms) that get better as time goes on. In some implementations, the profile pane includes an indicator to alert the user whether is complete or not. With very large data sets, some implementations build a profile based on sample data only.

Within the profile pane 314, a user can perform various tasks, including:

- Investigating data ranges and correlations. Users can use the profile pane 314 to focus on certain data or column relationships using direct navigation.
- Filtering in/out data or ranges of data. Users can add filter operations to the flow 323 through direct interactions. This results in creating new nodes in the flow pane 313.
- Transforming data. Users can directly interact with the profile pane 314 in order to map values from one range to another value. This creates new nodes in the flow pane 313.

The data pane 315 provides a way for users to see and modify rows that result from the flows. Typically, the data pane selects a sampling of rows corresponding to the selected node (e.g., a sample of 10, 50, or 100 rows rather than a million rows). In some implementations, the rows are sampled in order to display a variety of features. In some implementations, the rows are sampled statistically, such as every nth row.

The data pane 315 is typically where a user cleans up data (e.g., when the source data is not clean). Like the profile pane, the data pane updates asynchronously. When a node is first selected, rows in the data pane 315 start appearing, and the sampling gets better as time goes on. Most data sets will only have a subset of the data available here (unless the data set is small).

Within the data pane 315, a user can perform various tasks, including:

- Sort for navigation. A user can sort the data in the data pane based on a column, which has no effect on the flow. The purpose is to assist in navigating the data in the data pane.
- Filter for navigation. A user can filter the data that is in the view, which does not add a filter to the flow.
- Add a filter to the flow. A user can also create a filter that applies to the flow. For example, a user can select an individual data value for a specific data field, then take action to filter the data according to that value (e.g., exclude that value or include only that value). In this case, the user interaction creates a new node in the data flow 323. Some implementations enable a user to select multiple data values in a single column, and then build a filter based on the set of selected values (e.g., exclude the set or limit to just that set).
- Modify row data. A user can directly modify a row. For example, change a data value for a specific field in a specific row from 3 to 4.
- Map one value to another. A user can modify a data value for a specific column, and propagate that change all of the rows that have that value for the specific column. For example, replace "N.Y." with "NY" for an entire column that represents states.
- Split columns. For example, if a user sees that dates have been formatted like "14 Nov. 2015", the user can split this field into three separate fields for day, month, and year.
- Merge columns. A user can merge two or more columns to create a single combined column.

A node specific pane displays information that is particular for a selected node in the flow. Because a node specific pane is not needed most of the time, the user interface typically does not designate a region with the user interface that is solely for this use. Instead, a node specific pane is displayed as needed, typically using a popup that floats over other regions of the user interface. For example, some implementations use a node specific pane to provide specific user interfaces for joins, unions, pivoting, unpivoting, running Python scripts, parsing log files, or transforming a JSON objects into tabular form.

The Data Source Palette/Chooser enables a user to bring in data from various data sources. In some implementations, the data source palette/chooser is in the left-hand pane 312. A user can perform various tasks with the data source palette/chooser, including:

- Establish a data source connection. This enables a user to pull in data from a data source, which can be an SQL database, a data file such as a CSV or spreadsheet, a non-relational database, a web service, or other data source.
- Set connection properties. A user can specify credentials and other properties needed to connect to data sources. For some data sources, the properties include selection of specific data (e.g., a specific table in a database or a specific sheet from a workbook file).

In many cases, users invoke operations on nodes in the flow based on user interactions with the profile pane 314 and data pane 315, as illustrated above. In addition, the left hand pane 312 provides an operations palette, which allows a user to invoke certain operations. For example, some implementations include an option to "Call a Python Script" in the operations palette. In addition, when users create nodes that they want to reuse, they can save them as available operations on the operations palette. The operations palette provides a list of known operations (including user defined operations), and allows a user to incorporate the operations into the flow using user interface gestures (e.g., dragging and dropping).

Some implementations provide an Other Flow Palette/Chooser, which allows users to easily reuse flows they've built or flows other people have built. The other flow palette provides a list of other flows the user can start from, or incorporate. Some implementations support selecting portions of other flows in addition to selecting entire flows. A user can incorporate other flows using user interface gestures, such as dragging and dropping.

The node internals specify exactly what operations are going on in a node. There is sufficient information to enable a user to "refactor" a flow or understand a flow in more detail. A user can view exactly what is in the node (e.g., what operations are performed), and can move operations out of the node, into another node.

Some implementations include a project model, which allows a user to group together multiple flows into one "project" or "workbook." For complex flows, a user may split up the overall flow into more understandable components.

In some implementations, operations status is displayed in the left-hand pane 312. Because many operations are executed asynchronously in the background, the operations status region indicates to the user what operations are in progress as well as the status of the progress (e.g., 1% complete, 50% complete, or 100% complete). The operations status shows what operations are going on in the background, enables a user to cancel operations, enables a user to refresh data, and enables a user to have partial results run to completion.

A flow, such as the flow 323 in FIG. 3B, represents a pipeline of rows that flow from original data sources through transformations to target datasets. For example, FIG. 3D illustrates a simple example flow 338. This flow is based on traffic accidents involving vehicles. The relevant data is stored in an SQL database in an accident table and a vehicle table. In this flow, a first node 340 reads data from the accident table, and a second node 344 reads the data from the vehicle table. In this example, the accident table is normalized (342) and one or more key fields are identified (342). Similarly, one or more key fields are identified (346) for the vehicle data. The two tables are joined (348) using a shared key, and the results are written (350) to a target data set. If the accident table and vehicle table are both in the same SQL database, an alternative is to create a single node that reads the data from the two tables in one query. The query can specify what data fields to select and whether the data should be limited by one or more filters (e.g., WHERE clauses). In some instances, the data is retrieved and joined locally as indicated in the flow 338 because the data used to join the tables needs to be modified. For example, the primary key of the vehicle table may have an integer data type whereas the accident table may specify the vehicles involved using a zero-padded character field.

A flow abstraction like the one shown in FIG. 3D is common to most ETL and data preparation products. This flow model gives users logical control over their transformations. Such a flow is generally interpreted as an imperative program and executed with little or no modification by the platform. That is, the user has provided the specific details to define physical control over the execution. For example, a typical ETL system working on this flow will pull down the two tables from the database exactly as specified, shape the data as specified, join the tables in the ETL engine, and then write the result out to the target dataset. Full control over the physical plan can be useful, but forecloses the system's ability to modify or optimize the plan to improve performance (e.g., execute the preceding flow at the SQL server). Most of the time customers do not need control of the execution details, so implementations here enable operations to be expressed declaratively.

Some implementations here span the range from fully-declarative queries to imperative programs. Some implementations utilize an internal analytical query language (AQL) and a Federated Evaluator. By default, a flow is interpreted as a single declarative query specification whenever possible. This declarative query is converted into AQL and handed over to a Query Evaluator, which ultimately divvies up the operators, distributes, and executes them. In the example above in FIG. 3D, the entire flow can be cast as a single query. If both tables come from the same server, this entire operation would likely be pushed to the remote database, achieving a significant performance benefit. The flexibility not only enables optimization and distribution flow execution, it also enables execution of queries against live data sources (e.g., from a transactional database, and not just a data warehouse).

When a user wants to control the actual execution order of the flow (e.g., for performance reasons), the user can pin an operation. Pinning tells the flow execution module not to move operations past that point in the plan. In some instances, a user may want to exercise extreme control over the order temporarily (e.g., during flow authoring or debugging). In this case, all of the operators can be pinned, and the flow is executed in exactly the order the user has specified.

Note that not all flows are decomposable into a single AQL query, as illustrated in FIG. 3E. In this flow, there is a hourly drop 352 that runs hourly (362), and the data is normalized (354) before appending (356) to a staging database. Then, on a daily basis (364), the data from the staging database is aggregated (358) and written (360) out as a target dataset. In this case, the hourly schedule and daily schedule have to remain as separate pieces.

Figure 4A:
FIGS. 4A-4V illustrate using a data preparation application to build a join in accordance with some implementations.
Figure 4B:
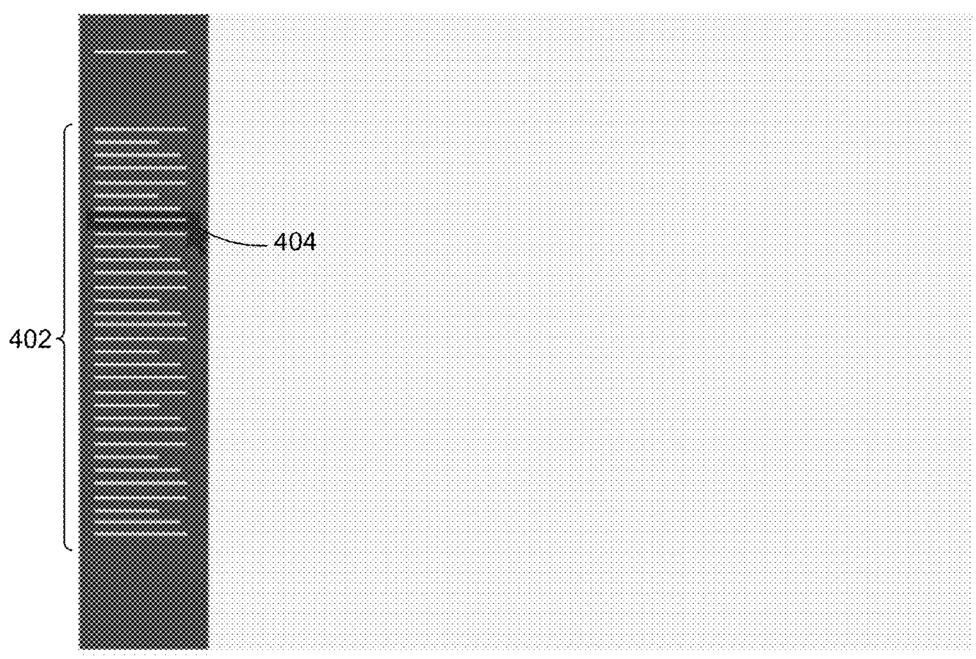
Figure 4C:
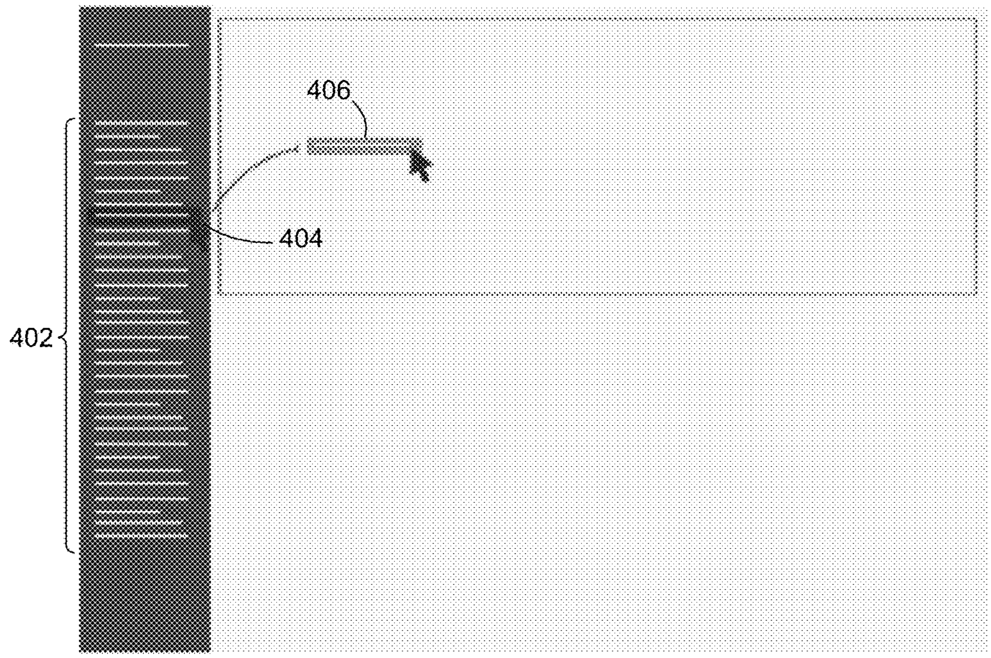
Figure 4D:
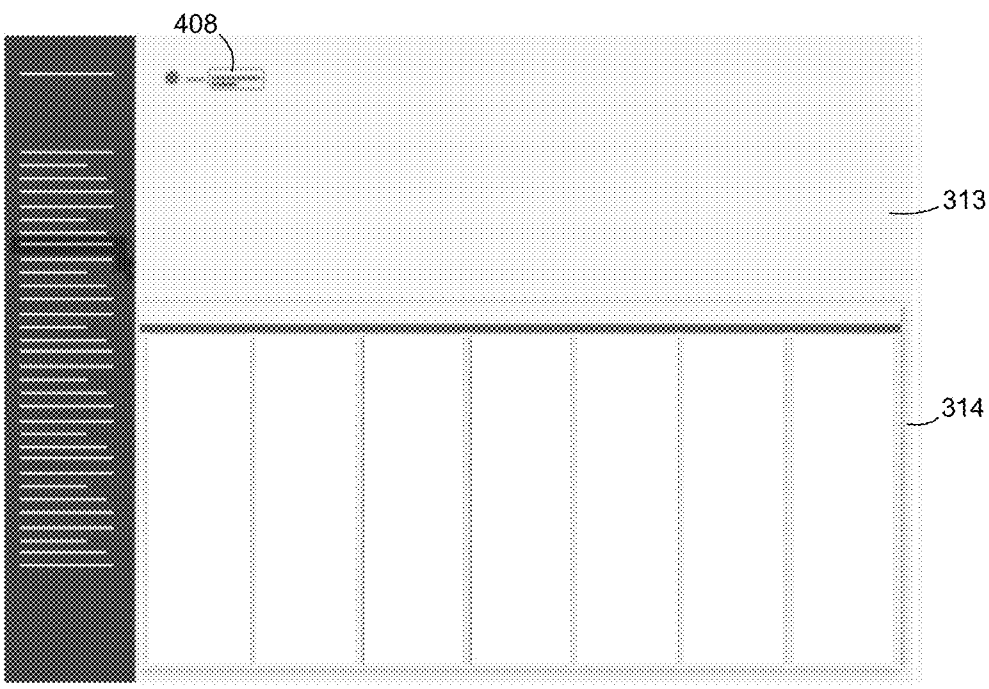
Figure 4E:
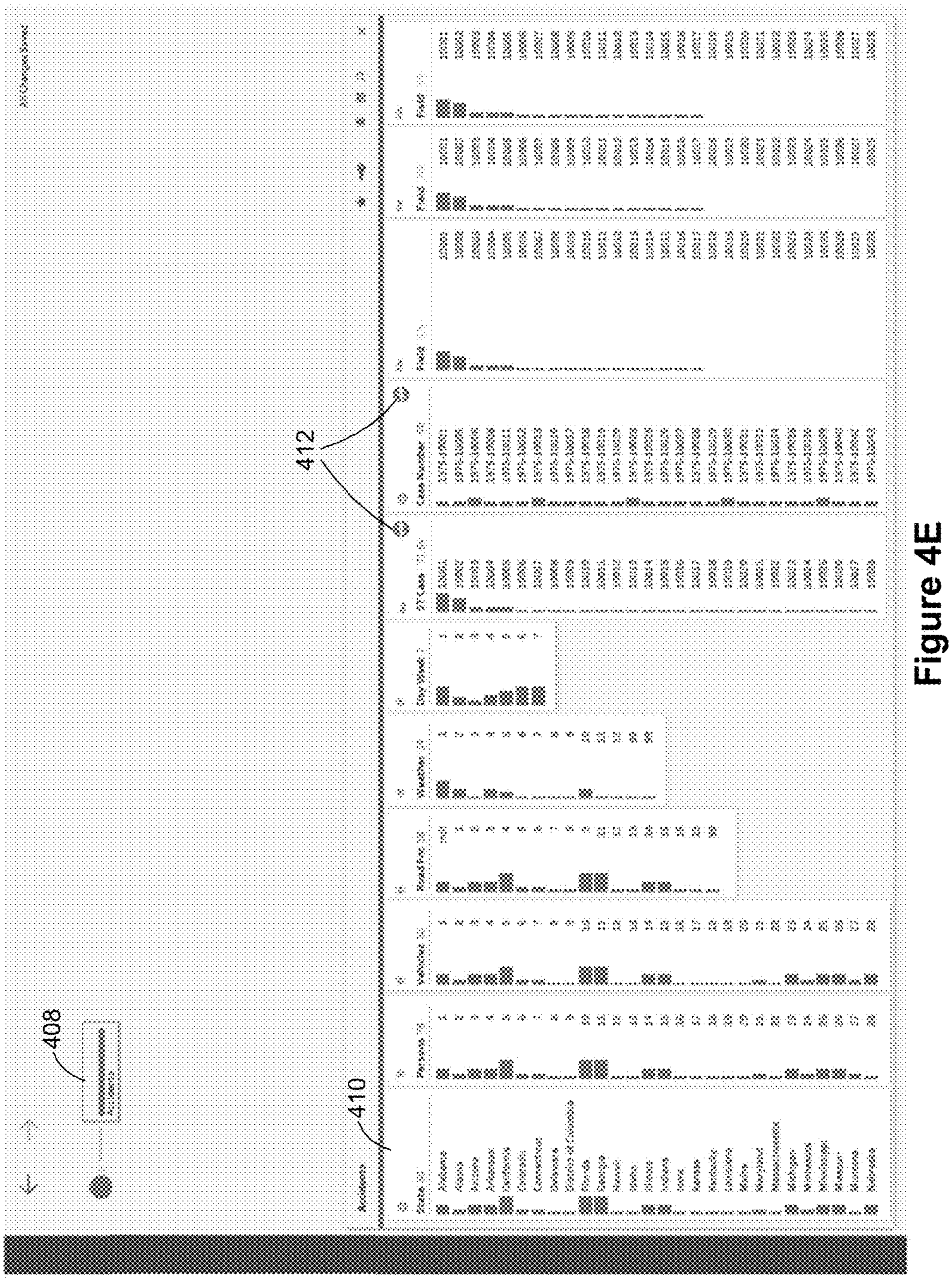
Figure 4F:
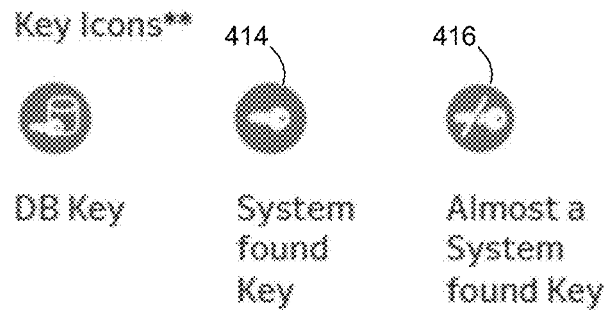
Figure 4G:
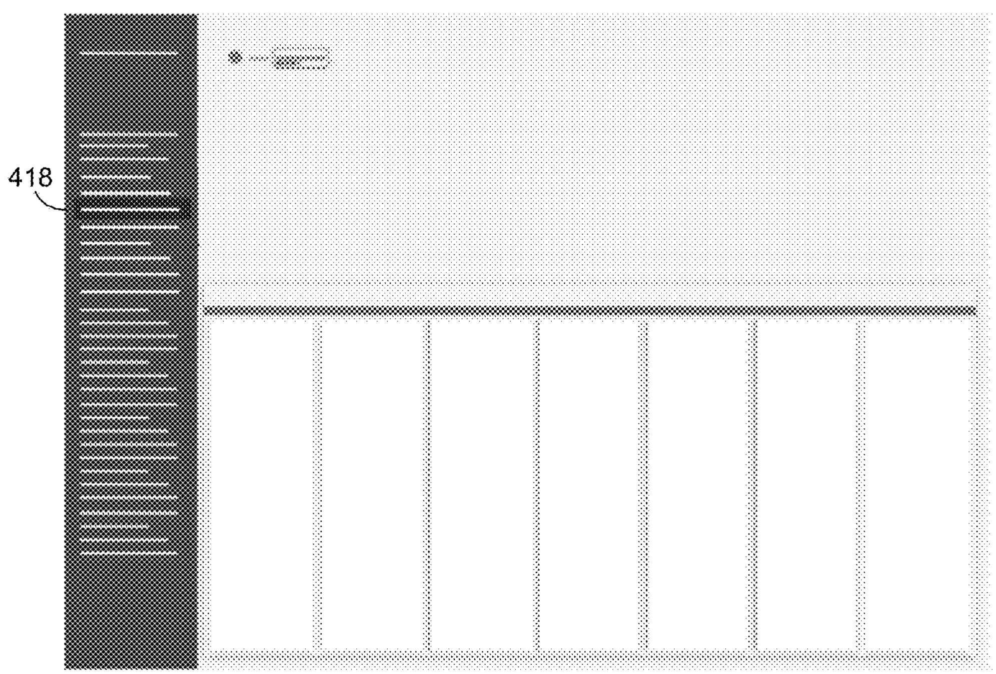
Figure 4H:
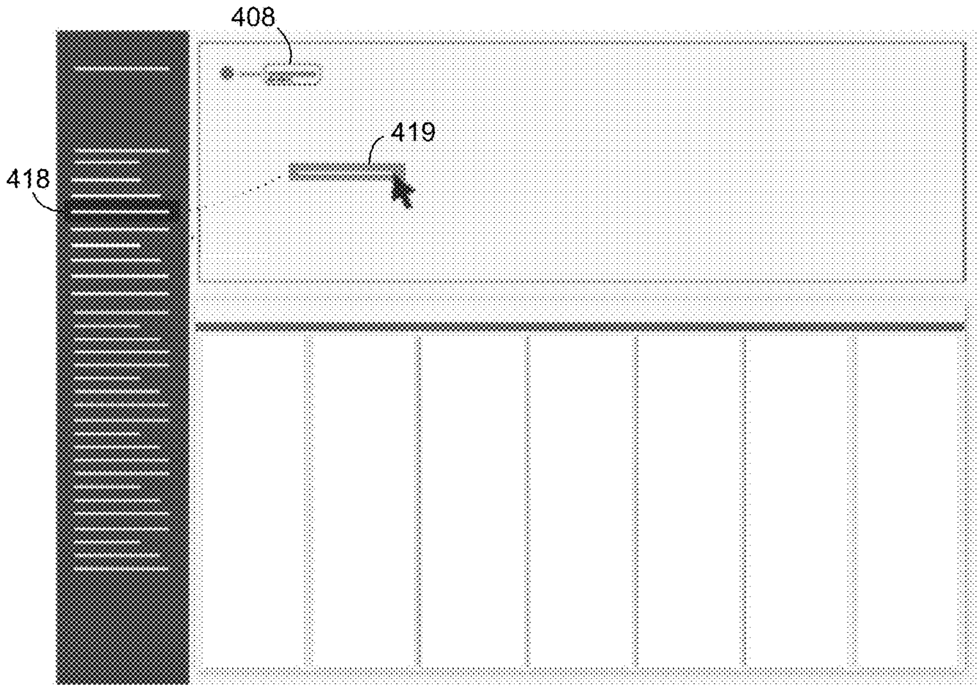
Figure 4I:
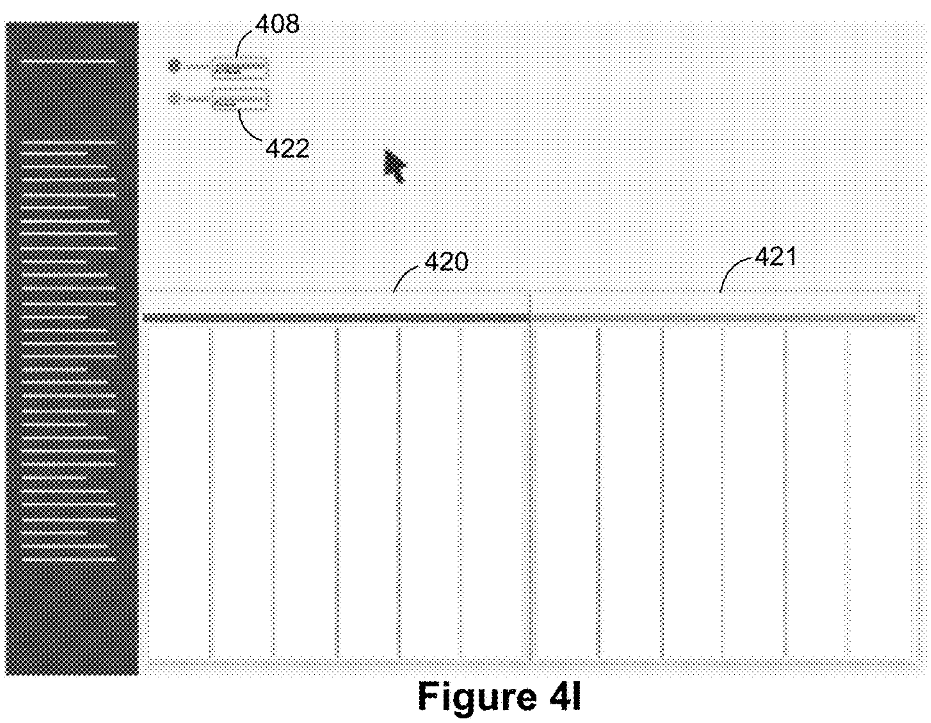
Figure 4J:
Figure 4K:
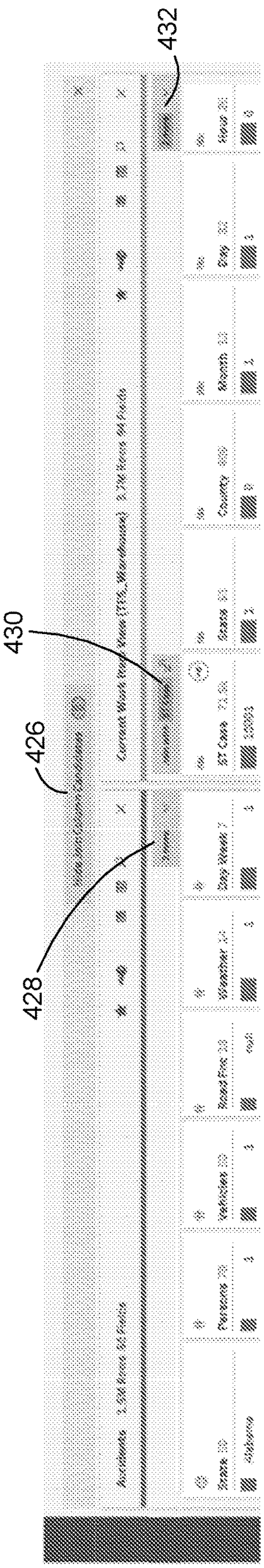
Figure 4L:
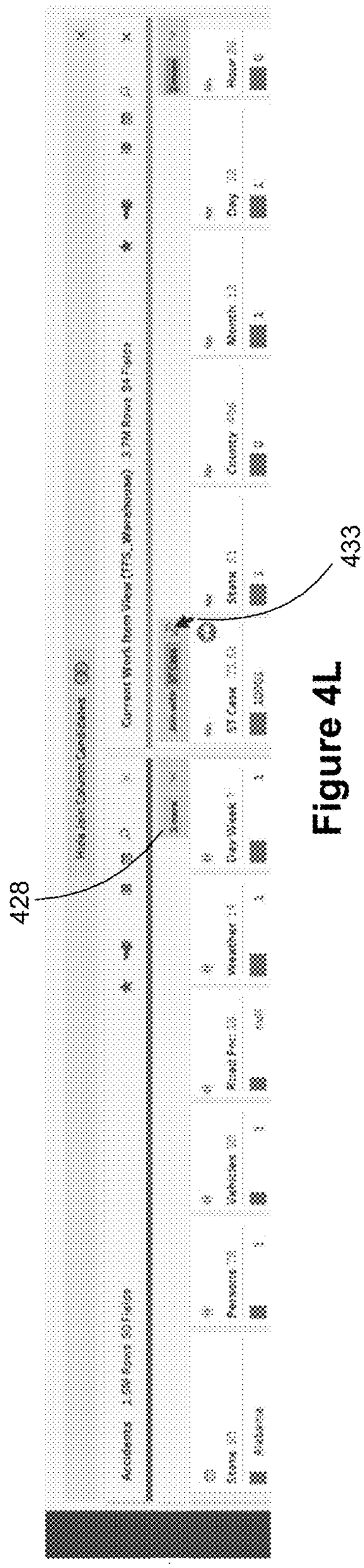
Figure 4M:
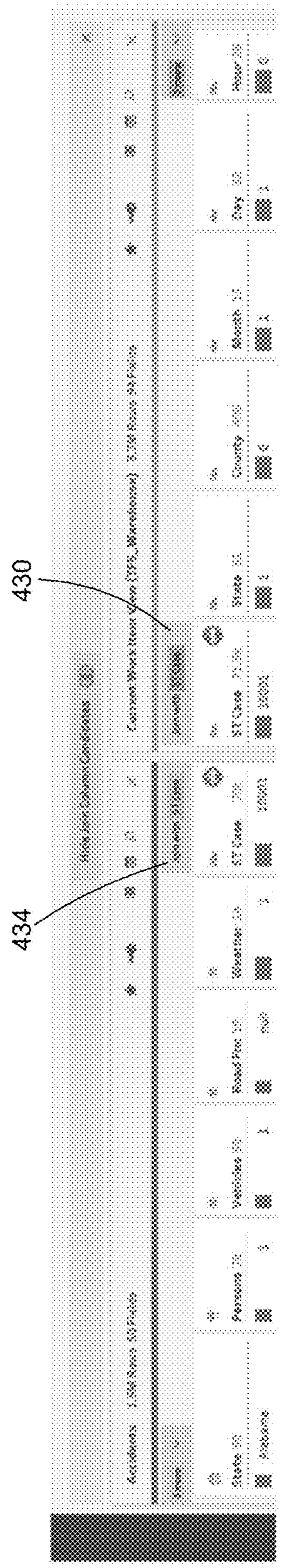
Figure 4N:
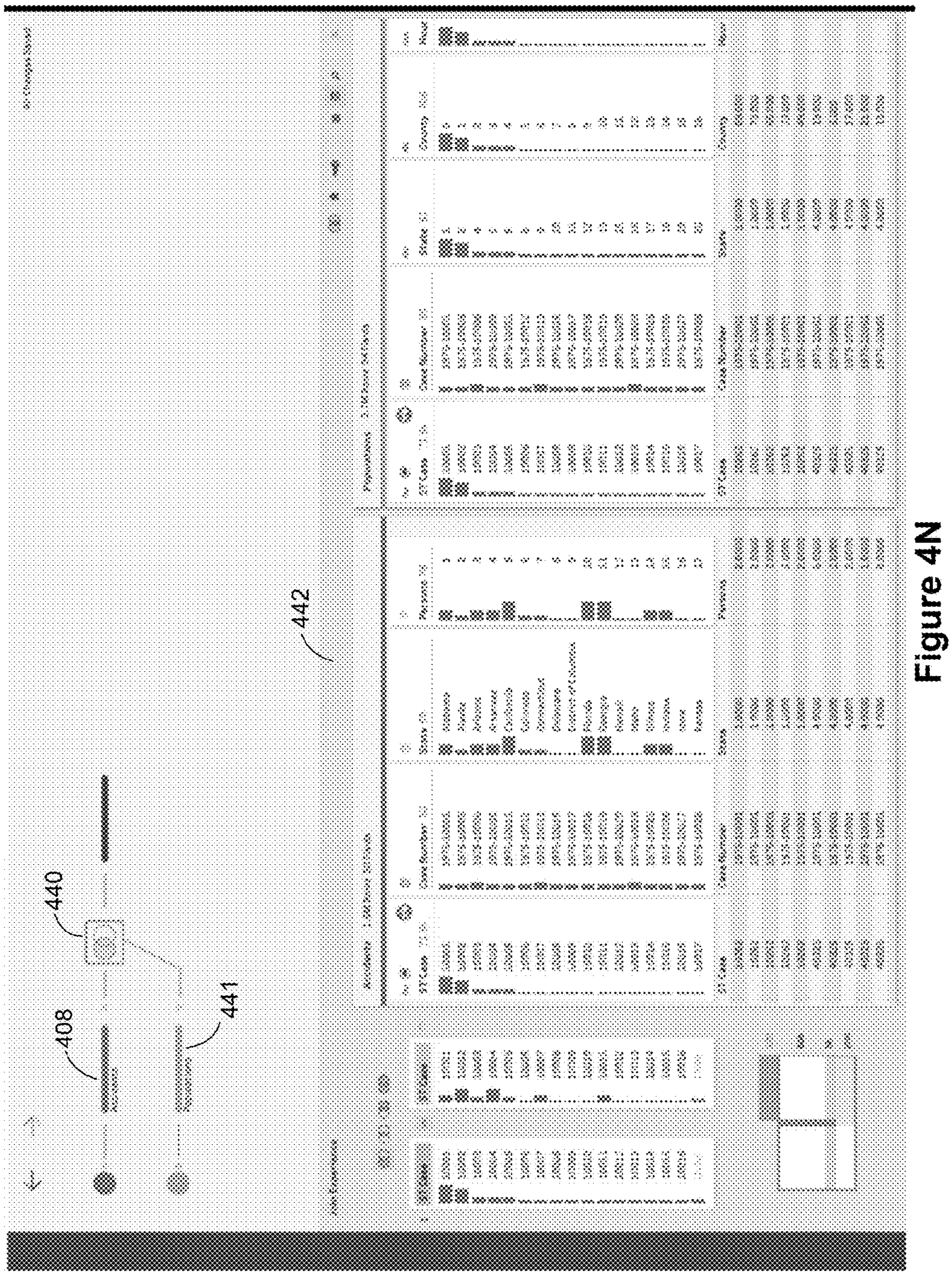
Figure 4O:
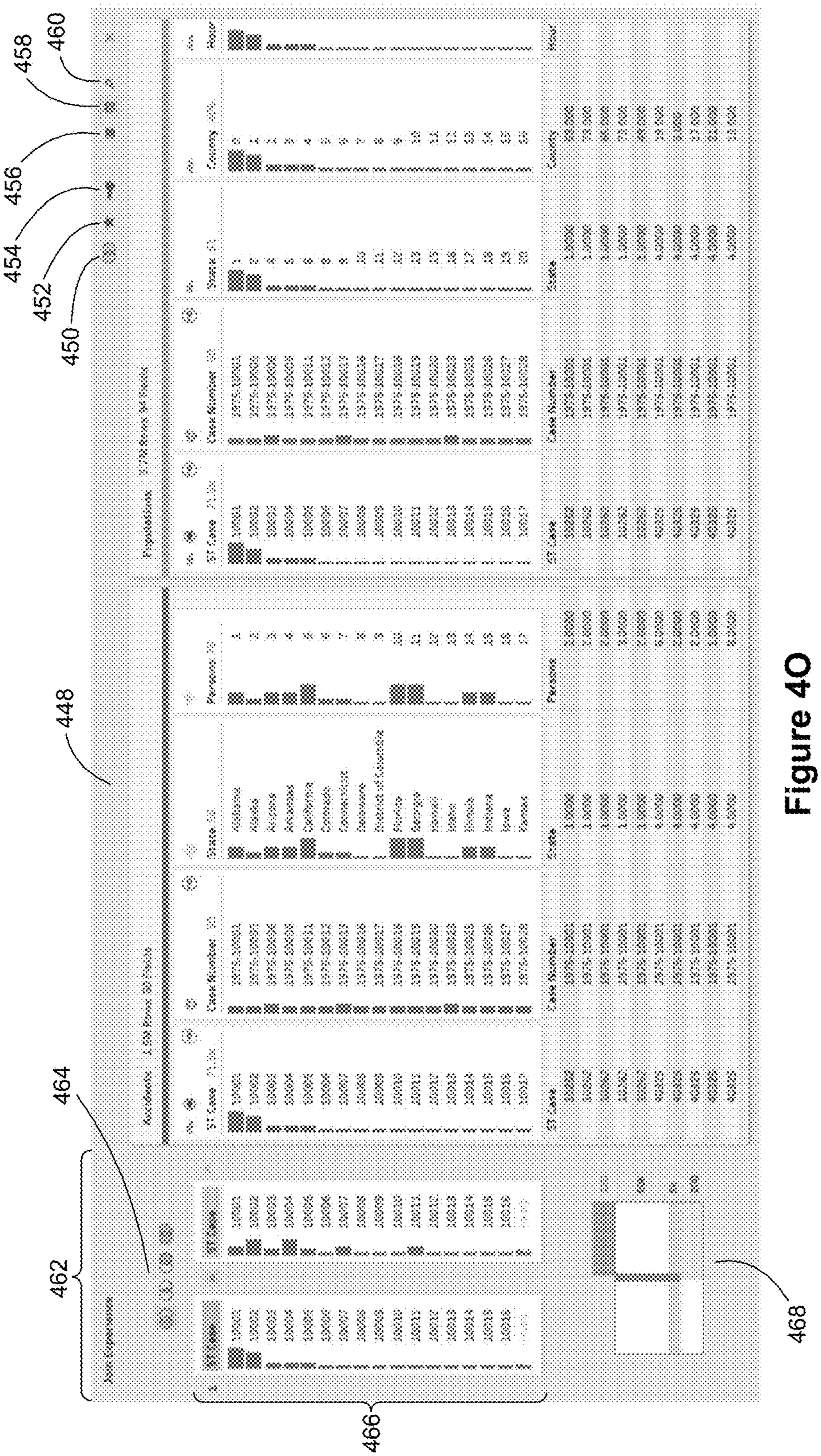
Figure 4P:
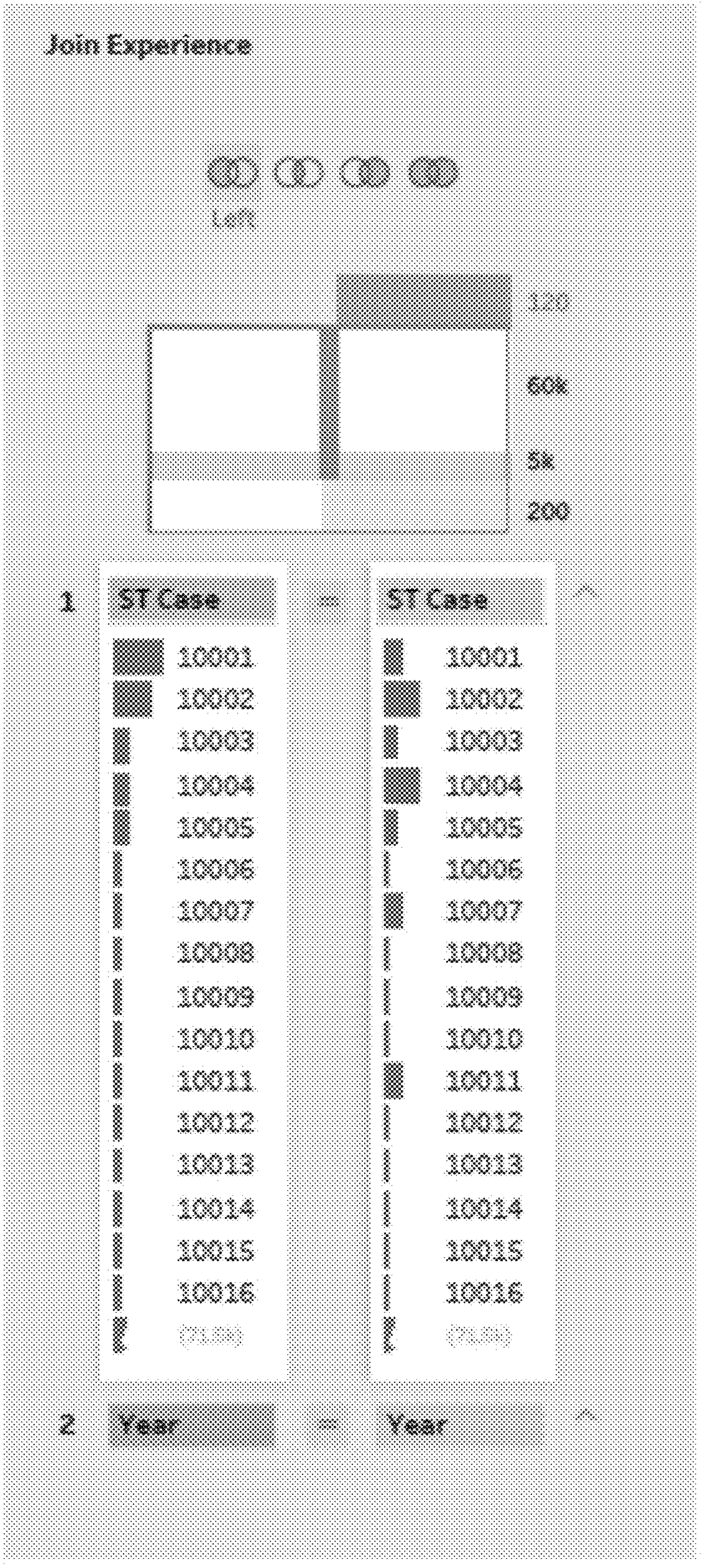
Figure 4Q:
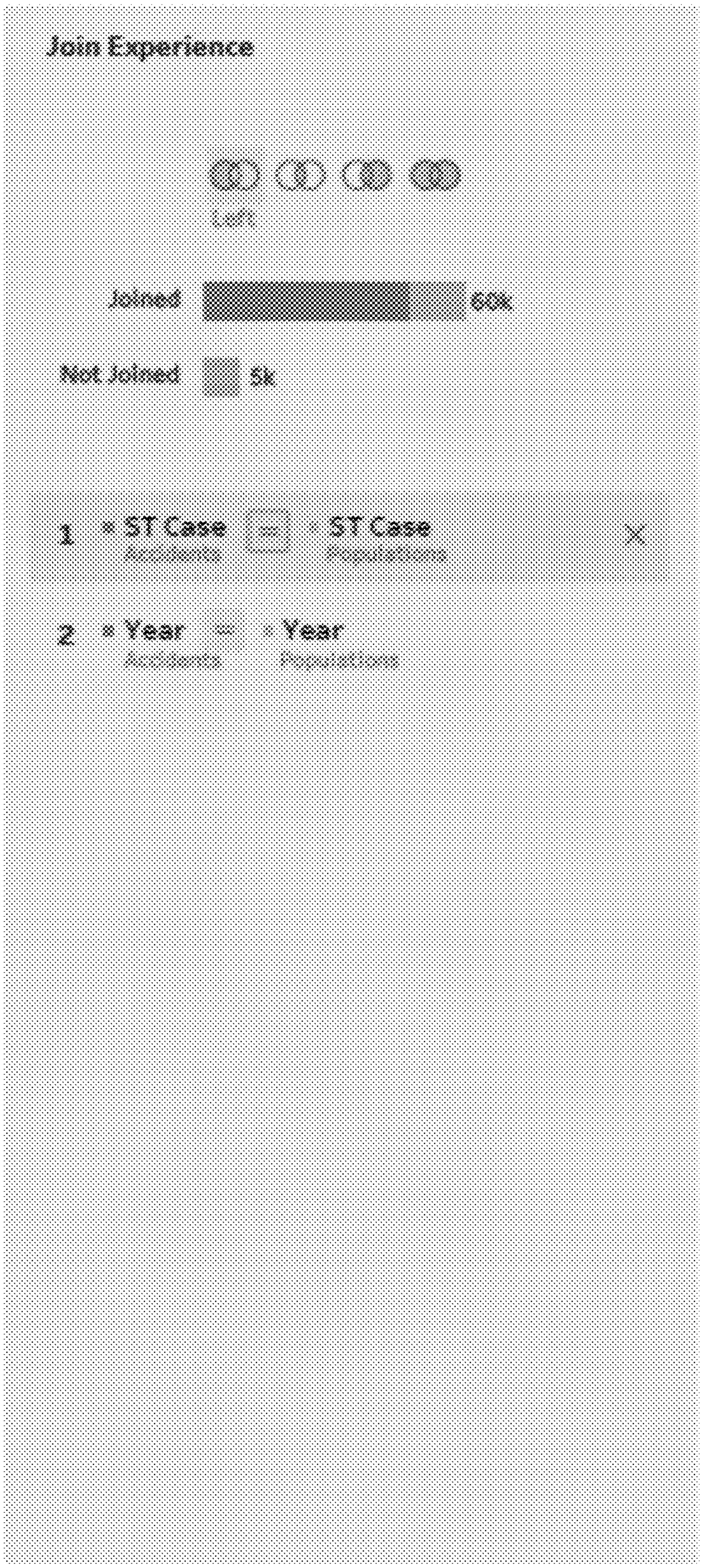
Figure 4R:
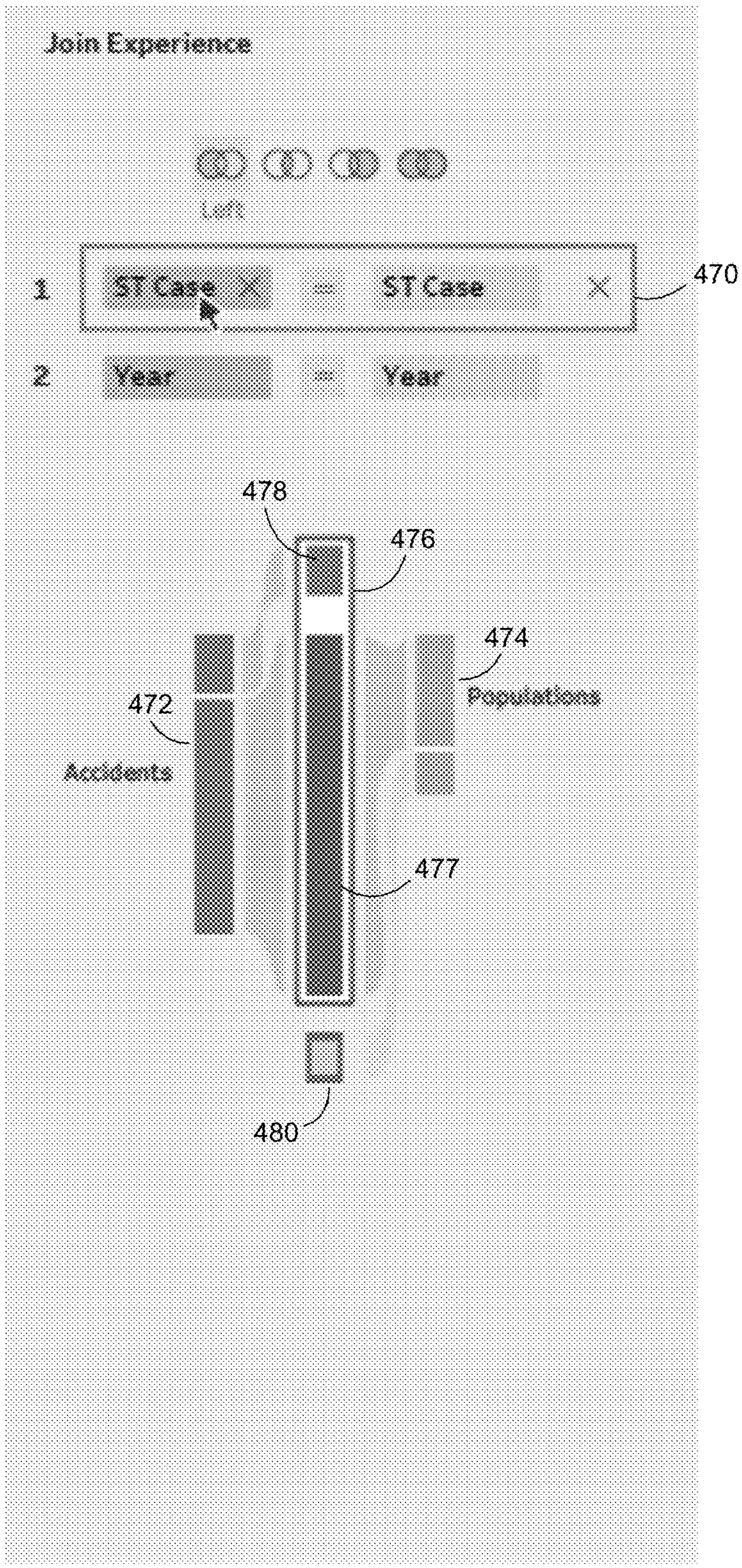
Figure 4S:
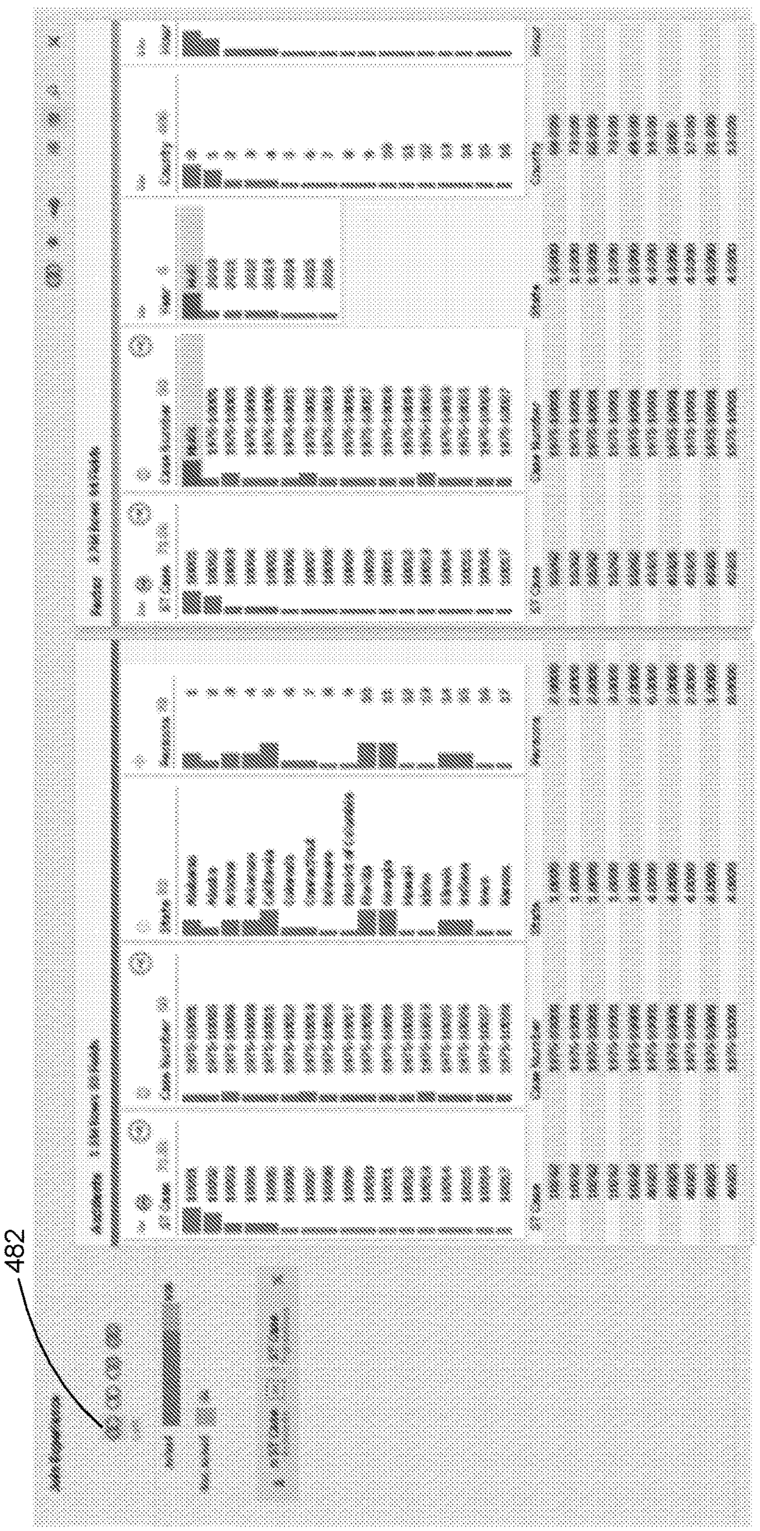
Figure 4T:
Figure 4U:
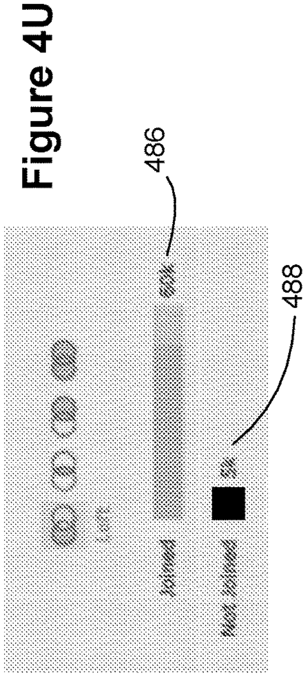
Figure 4V:
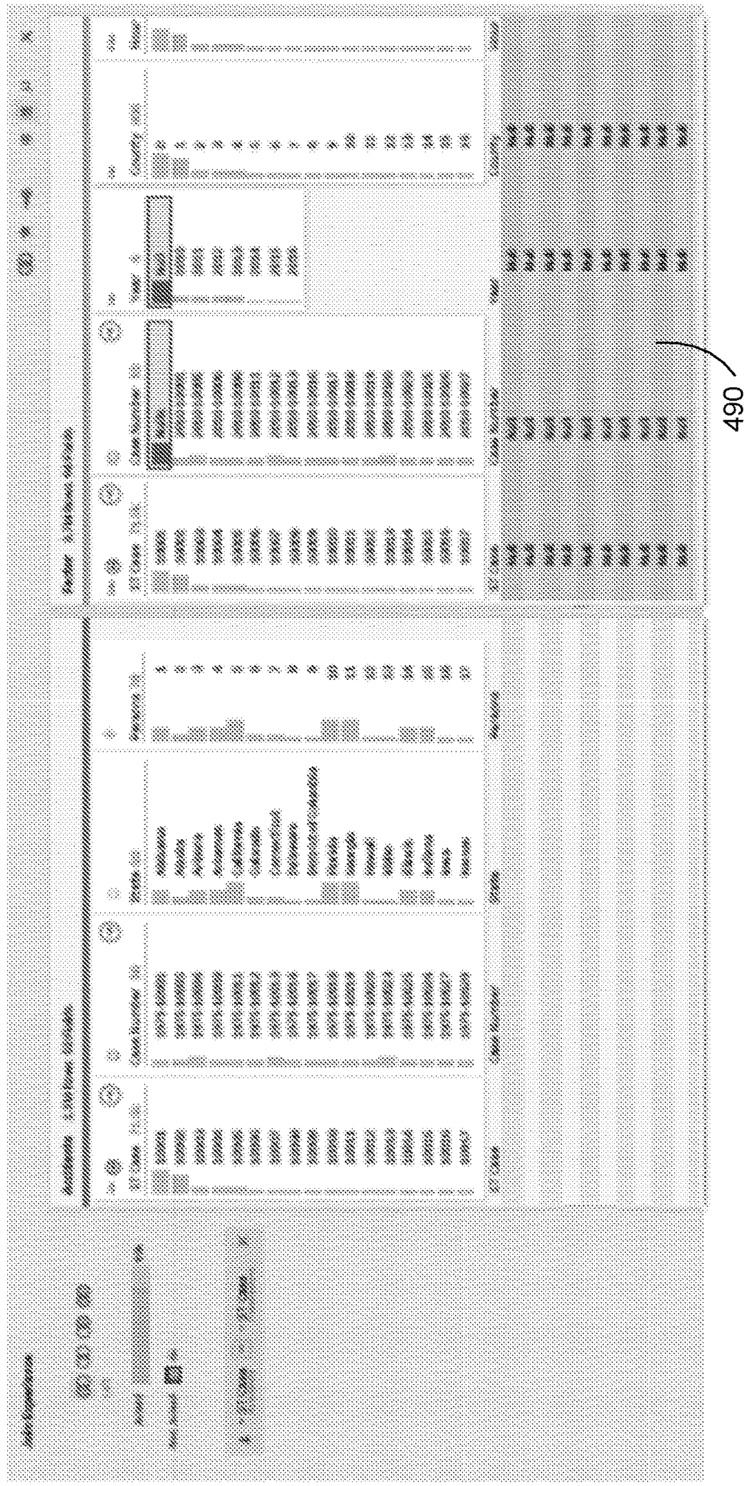

FIGS. 4A-4V illustrate some aspects of adding a join to a flow in accordance with some implementations. As illustrated in FIG. 4A, the user interface includes a left pane 312, a flow area 313, a profile area 314, and a data grid 315. In the example of FIGS. 4A-4V, the user first connects to an SQL database using the connection palette in the left pane 312. In this case, the database includes Fatality Analysis Reporting System (FARS) data provided by the National Highway Traffic Safety Administration. As shown in FIG. 4B, a user selects the "Accidents" table 404 from the list 402 of available tables. In FIG. 4C, the user drags the Accident table icon 406 to the flow area 313. Once the table icon 406 is dropped in the flow area 313, a node 408 is created to represent the table, as shown in FIG. 4D. At this point, data for the Accident table is loaded, and profile information for the accident table is displayed in the profile pane 314.

The profile pane 314 provides distribution data for each of the columns, including the state column 410, as illustrated in FIG. 4E. In some implementations, each column of data in the profile pane displays a histogram to show the distribution of data. For example, California, Florida, and Georgia have a large number of accidents, whereas Delaware has a small number of accidents. The profile pane makes it easy to identify columns that are keys or partial keys using key icons 412 at the top of each column. As shown in FIG. 4F, some implementations user three different icons to specify whether a column is a database key, a system key 414, or "almost" a system key 416. In some implementations, a column is almost a system key when the column in conjunction with one or more other columns is a system key. In some implementations, a column is almost a system key if the column would be a system key if null valued rows were excluded. In his example, both "ST Case" and "Case Number" are almost system keys.

In FIG. 4G, a user has selected the "Persons" table 418 in the left pane 312. In FIG. 4H, the user drags the persons table 418 to the flow area 313, which is displayed as a moveable icon 419 while being dragged. After dropping the Persons table icon 419 into the flow area 313, a Persons node 422 is created in the flow area, as illustrated in FIG. 4I. At this stage, there is no connection between the Accidents node 408 and the Persons node 422. In this example, both of the nodes are selected, so the profile pane 314 splits into two portions: the first portion 420 shows the profile information for the Accidents node 408 and the second portion 421 shows the profile information for the Persons node 422.

FIG. 4J provides a magnified view of the flow pane 313 and the profile pane 314. The profile pane 314 includes an option 424 to show join column candidates (i.e., possibilities for joining the data from the two nodes). After selecting this option, data fields that are join candidates are displayed in the profile pane 314, as illustrated in FIG. 4K. Because the join candidates are now displayed, the profile pane 314 displays an option 426 to hide join column candidates. In this example, the profile pane 314 indicates (430) that the column ST case in the Persons table might be joined with the ST case field in the Accidents table. The profile pane also indicates (428) that there are three additional join candidates in the Accidents table and indicates (432) that there are two additional join candidates in the Persons table. In FIG. 4L, the user clicks (433) on hint icon, and in response, the profile pane places the two candidate columns adjacent to each other as illustrated in FIG. 4M. The header 434 for the ST Case column of the Accidents table now indicates that it can be joined with the ST case column of the Persons table.

FIG. 4N illustrates an alternative method of joining the data for multiple nodes. In this example, a user has loaded the Accidents table data 408 and the Populations table data 441 into the flow area 313. By simply dragging the Populations node 441 on top of the Accidents node 408, a join is automatically created and a Join Experience pane 442 is displayed that enables a user to review and/or modify the join. In some implementations, the Join Experience is placed in the profile pane 314; in other implementations, the Join Experience temporarily replaces the profile pane 314. When the join is created, a new node 440 is added to the flow, which displays graphically the creation of a connection between the two nodes 408 and 441.

The Join Experience 442 includes a toolbar area 448 with various icons, as illustrated in FIG. 4O. When the join candidate icon 450 is selected, the interface identifies which fields in each table are join candidates. Some implementations include a favorites icon 452, which displays of highlights "favorite" data fields (e.g., either previously selected by the user, previously identified as important by the user, or previously selected by users generally). In some implementations, the favorites icon 452 is used to designate certain data fields as favorites. Because there is limited space to display columns in the profile pane 314 and the data pane 315, some implementations use the information on favorite data fields to select which columns are displayed by default.

In some implementations, selection of the "show keys" icon 454 causes the interface to identify which data columns are keys or parts of a key that consists of multiple data fields. Some implementations include a data/metadata toggle icon 456, which toggles the display from showing the information about the data to showing information about the metadata. In some implementations, the data is always displayed, and the metadata icon 456 toggles whether or not the metadata is displayed in addition to the data. Some implementations include a data grid icon 458, which toggles display of the data grid 315. In FIG. 4O, the data grid is currently displayed, so selecting the data grid icon 458 would cause the data grid to not display. Implementations typically include a search icon 460 as well, which brings up a search window. By default, a search applies to both data and metadata (e.g., both the names of data fields as well as data values in the fields). Some implementations include the option for an advanced search to specify more precisely what is searched.

On the left of the join experience 442 is a set of join controls, including a specification of the join type 464. As is known in the art, a join is typically a left outer join, an inner join, a right outer join, or a full outer join. These are shown graphically by the join icons 464. The current join type is highlighted, but the user can change the type of the join by selecting a different icon.

Some implementations provide a join clause overview 466, which displays both the names of the fields on both sides of the join, as well as histograms of data values for the data fields on both sides of the join. When there are multiple data fields in the join, some implementations display all of the relevant data fields; other implementations include a user interface control (not shown) to scroll through the data fields in the join. Some implementations also include an overview control 468, which illustrates how many rows from each of the tables are joined based on the type of join condition. Selection of portions within this control determines what is displayed in the profile pane 314 and the data grid 315.

FIGS. 4P, 4Q, and 4R illustrate alternative user interfaces for the join control area 462. In each case, the join type appears at the top. In each case, there is a visual representation of the data fields included in the join. Here there are two data fields in the join, which are ST case and Year. In each of these alternatives, there is also a section that illustrates graphically the fractions of rows from each table that are joined. The upper portion of FIG. 4Q appears in FIG. 4U below.

FIG. 4R includes a lower portion that shows how the two tables are related. The split bar 472 represents the rows in the Accidents table, and the split bar 474 represents the Populations table. The large bar 477 in the middle represents the rows that are connected by an inner join between the two tables. Because the currently selected join type is a left outer join, the join result set 476 also includes a portion 478 that represents rows of the Accidents table that are not linked to any rows of the Populations table. At the bottom is another rectangle 480, which represents rows of the Populations tables that are not linked to any rows of the Accidents table. Because the current join type is a left outer join, the portion 480 is not included in the result set 476 (the rows in the bottom rectangle 480 would be included in a right outer join or a full outer join). A user can select any portion of this diagram, and the selected portion is displayed in the profile pane and the data pane. For example, a user can select the "left outer portion" rectangle 478, and then look at the rows in the data pane to see if those rows are relevant to the user's analysis.

FIG. 4S shows a Join Experience using the join control interface elements illustrated in FIG. 4R, including the join control selector 464. Here, the left outer join icon 482 is highlighted, as shown more clearly in the magnified view of FIG. 4T. In this example, the first table is the Accident table, and the second table is the Factor table. As shown in FIG. 4U, the interface shows both the number of rows that are joined 486 and the number that are not joined 488. This example has a large number of rows that are not joined. The user can select the not joined bar 488 to bring up the display in FIG. 4V. Through brushing in the profile and filtering in the data grid the user is able to see that the nulls are a result of a left-outer join and non-matching values due to the fact that the Factor table has no entries prior to 2010.

Disclosed implementations support many features that assist in a variety of scenarios. Many of the features have been described above, but some of the following scenarios illustrate the features.

Scenario 1: Event Log Collection

Alex works in IT, and one of his jobs is to collect and prepare logs from the machines in their infrastructure to produce a shared data set that is used for various debugging and analysis in the IT organization.

The machines run Windows, and Alex needs to collect the Application logs. There is already an agent that runs every night and dumps CSV exports of the logs to a shared directory; each day's data are output to a separate directory, and they are output with a format that indicates the machine name. A snippet from the Application log is illustrated in FIG. 5A.

This has some interesting characteristics:

Line 1 contains header information. This may or may not be the case in general.

Each line of data has six columns, but the header has five. The delimiter here is clearly ",".

The final column may have used quoted multi-line strings. Notice that lines 3-9 here are all part of one row. Also note that this field uses double-double quotes to indicate quotes that should be interpreted literally.

Alex creates a flow that reads in all of the CSV files in a given directory, and performs a jagged union on them (e.g., create a data field if it exists in at least one of the CSV files, but when the same data field exists in two or more of the CSV files, create only one instance of that data field). The CSV input routine does a pretty good job reading in five columns, but chokes on the quotes in the sixth column, reading them in as several columns.

Alex then:

Selects the columns in the data pane and merges them back together.

Adds the machine name it came from, taken from the filename. He does this by selecting the machine name in an example of the data and choosing "Extract as new column." The system infers a pattern from this action.

Generates a unique identifier for each row by right-clicking and choosing "add identifier".

Edits column names and types right in the data pane.

All of this is accomplished through direct action on the data in the data pane 315, but results in logic being inserted into the flow in the flow pane 313.

Alex then drags his target data repository into the flow pane, and wires up the output to append these records to a cache that will contain a full record of his logs.

Finally, Alex's flow queries this target dataset to find the set of machines that reported the previous day, compares this to today's machines, and outputs an alert to Alex with a list of expected machines that did not report.

Note that Alex could have achieved the same result in different ways. For example:

Alex could create two separate flows: one that performs the ingest; and one that compares each day's machines with the previous day's machines, and then alerts Alex with the results.

Alex could create a flow that performs the ingest in one stage. When that is complete, Alex could execute a second flow that queries the database and compares each day to the previous day and alert Alex.

Alex could create a flow that would have the target as both input and output. This flow would perform the ingest, write it to the database, and further aggregate to find the day's machines. It would also query the target to get the previous day's results, perform the comparison, and fire the alert.

Alex knows that the machines should report overnight, so what Alex does the first thing every morning is run his flow. He then has the rest of the morning to check up on machines that did not report.

Scenario 2: Collecting and Integrating FARS

Bonnie works for an insurance company, and would like to pull in the Fatality Analysis Reporting System (FARS) data as a component of her analysis. The FARS data is available via FTP, and Bonnie needs to figure out how to get it and piece it together. She decides to do this using the data prep application 250.

Bonnie takes a look at the set of formats that FARS publishes in, and decides to use DBF file. These DBF files are spread around the FTP site and available only in compressed ZIP archives. Bonnie explores a tree view and selects the files she wishes to download. As the data is downloading, Bonnie begins the next step in her flow. She selects the collection of files and chooses "Extract," which adds a step to unzip the files into separate directories labeled by the year.

As the data starts to come in, Bonnie starts to sees problems:

The initial years have three files, corresponding to three tables: accident, person, and vehicle. These are present in later years, but there are many more tables as well.

The files don't have uniform names. For example, the accident file is named "accident.dbf" in the years 1975-1982 and 1994-2014, but is named "accYYYY-.dbf" (where YYYY is the four-digit year) in the middle years.

Even when the table names are the same, their structure changes somewhat over time. Later tables include additional columns not present in the earlier data.

Bonne starts with the accident table, which is present in all years. She chooses the files, right clicks, and chooses "Union," which performs a jagged union and preserves the columns. She repeats this with the other three tables present in all years, and then for the remaining tables. When she's done, her flow's final stage produces 19 separate tables.

Once she has this, she tries piecing the data together. It looks like the common join key should be a column called ST_CASE, but just by looking at the profile pane for the accident table, she can tell this isn't a key column anywhere. ST_CASE isn't a key, but by clicking on years, she can easily see that there is only one ST_CASE per year. Together, year and ST_CASE look like a good join key.

She starts with the person table. Before she can join on this, she needs the year in each of her tables, and it isn't there. But since the file paths have the year, she can select this data in the data pane and choose "Extract as new column." The system infers the correct pattern for this, and extracts the year for each row. She then selects both tables in her flow, selects the year and ST_CASE columns in one, and drags them to the other table, creating a join.

Now that she has the keys, she continues to create joins to flatten out the FARS data. When she's done, she publishes the data as a TDE (Tableau Data Extract) to her Tableau Server so her team can use it.

Scenario 3: FARS Cleanup

Colin is another employee at in the same department as Bonnie. Some people are trying to use the data Bonnie's flow produces, but it includes lots of cryptic values. Finding that Bonnie has moved on to another company, they turn to Colin.

Looking at the flow, Colin can easily see its overall logic and also sees the cryptic coded data. When he finds the 200-page PDF manual that contains the lookup tables (LUTs) for the cryptic codes, the process looks daunting. An example lookup table in the PDF is shown in FIG. 5B. Some are simpler and some are significantly more complex.

Colin starts with some of the more important tables. He finds that he can select the table in the PDF file and paste it into flow pane 313. In some cases, the data in the table is not entirely correct, but it does a reasonable job, and Colin can then manually patch up the results in the data pane 315, saving him considerable time. As he works, he sees his results immediately. If the tables don't align, he sees so right away.

Ultimately, Colin brings in a dozen LUTs that seem particularly relevant to the analysis his team performs, and publishes the results so his team can use the data. As people ask for more information about specific columns, Colin can further augment his flow to bring in additional LUTs.

Scenario 4: Discovering Data Errors

Danielle, a developer at a major software company, is looking at data that represents build times. Danielle has a lot of control over the format of the data, and has produced it in a nice consumable CSV format, but wants to simply load it and append it to a database she's created.

As she loads up the data, she scans the profile view 314. Something immediately looks odd to her: there are a few builds with negative times. There's clearly something wrong here, and she wants to debug the problem, but she also wants to pull the data together for analysis.

She selects the negative times in the profile view, and clicks "Keep only" to retain only the erroneous rows. She adds a target to flow these into a file. She's going to use those raw rows to guide her debugging.

Going back to her flow, she adds another branch right before the filter. She again selects the negative values (e.g., in the profile pane 314 or the data pane 315), and then simply presses "delete." This replaces the values with null, which is a good indicator that the real value simply isn't known. She proceeds with the rest of her simple flow, appending the build data to her database, and she will look into the negative values later.

Scenario 5: Tracking Vehicle Parts

Earl works for a car manufacturer, and is responsible for maintaining a dataset that shows the current status of each vehicle and major part in the factory. The data is reported to a few operational stores, but these operational stores are quite large. There are hundreds of thousands of parts, and as an automated facility, many thousands of records are mechanically created for each vehicle or part as it proceeds through the factory. These operational stores also contain many records that have nothing to do with part status, but other operational information (e.g., "the pressure in valve 134 is 500 kPa"). There is a business need for a fast, concise record for each part.

Earl drags the tables for each of the three relational operational stores into the flow pane 313. Two of them store data as single tables containing log records. The third has a small star schema that Earl quickly flattens by dragging and dropping to create a join.

Next, through additional dragging and dropping, Earl is able to quickly perform a jagged union of the tables. In the result, he can drag-and-drop columns together and the interface coalesces the results for him.

The part identification number is a little problematic: one system has a hyphen in the value. Earl takes one of the values in the data pane 315, selects the hyphen, and presses delete. The interface infers a rule to remove the hyphens from this column, and inserts a rule into the flow that removes the hyphen for all of the data in that column.

Earl doesn't want most of the status codes because they are not relevant to his current project. He just wants the status codes that relate to parts. He pulls in a table that has information on status codes and drops it on the last node of his flow, resulting in a new join on the status code. He now selects only those rows with "target type" equal to "part" and chooses "Keep only" to filter out the other values. This filtering is done in the profile pane 314 or the data pane 315.

Finally, Earl only wants the last value for each part. Through a direct gesture, he orders the data in the data pane by date, groups by part number, and adds a "top-n" table calculation to take only the final update for each part.

Earl runs his flow, and finds that it takes four hours to run. But he knows how he can speed this up. He can record the last time he ran his flow, and only incorporate new records on each subsequent run. To do this, however, he needs to update existing rows in his accumulated set, and only add rows if they represent new parts. He needs a "merge" operation.

Earl uses the part number to identify matches, and supplies actions for when a match occurs or does not occur. With the update logic, Earl's flow only takes 15 minutes to run. The savings in time lets the company keep much tighter track of where parts are in their warehouse and what their status is.

Earl then pushes this job to a server so it can be scheduled and run centrally. He could also create a scheduled task on his desktop machine that runs the flow using a command-line interface.

Scenario 6: An Investment Broker

Gaston works at an investment broker in a team responsible for taking data produced by IT and digesting it so that it can be used by various teams that work with customers. IT produces various data sets that show part of a customer's portfolio—bond positions, equity positions, etc.—but each alone is not what Gaston's consumers need.

One team, led by Hermine, needs all of the customer position data pulled together so that her team can answer questions their customers have when they call in. The data preparation is not that complex.

Gaston does some massaging of the nightly database drops IT produces, unions them together, and does some simple checks to make sure the data looks okay. He then filters it down to just what Hermine's team needs and creates a TDE for her team to use.

With their previous tools, Gaston had to remember to come in and run the flow every morning. But with the new data prep application 250, this flow can be treated declaratively. He sends a TDS to Hermine that her team uses, so every data visualization that Hermine's team makes runs directly against the database. This means Gaston doesn't have to worry about refreshing the data, and it executes quickly.

Another team, led by Ian, uses similar data to do performance reviews of his customers' accounts. To produce this data, Gaston reuses the work he's done for Hermine, but filters the data to Ian's team's accounts, and then performs an additional flow to join the data with various indexes and performance indicators so that Ian's team can perform their analysis. This work is expensive and doesn't seem to perform well live. If he runs the flow, it takes several hours to complete—but Ian's team only needs this once a month. Gaston sets up a recurring calendar item on the server to run it once each month.

Scenario 7: Scrubbing Customer Data

Karl is a strategic account manager for a major software company. He is trying to use Tableau to visualize information about attendees at an industry conference, who they work for, who their representatives are, whether they are active or prospective customers, whether their companies are small or large, and so on.

Karl has a list of the conference attendees, but he's been down this road before. The last time he was in this position, it took him 8 hours to clean up the list—and 15 minutes to build the visualization once he was done. This time he's using the data preparation application 250 to speed up and automate the process.

Karl first wants to clean up the company names. Eyeballing the data, he sees what he'd expect: the same company is often listed in multiple different formats and some of them are misspelled. He invokes a fuzzy deduplication routine provided on the operation palette to identify potential duplicates. He reviews the results and corrects a couple cases where the algorithm was over-eager. He also finds a few cases that the algorithm missed, so he groups them. This yields a customer list with canonical company names.

He then tries to join his data with a list of companies kept in a data source on his Tableau Server. He finds that each company has multiple listings. Multiple different companies may have the same name, and a single company may have multiple accounts based on region.

To sort this out, Karl uses a REST connector for LinkedIn™ that he's found, and passes it each of the email addresses in his data to retrieve the country and state for each person. This procedure takes the information he has (e.g., the person's name, the person's company, and the person's position) and uses LinkedIn's search functionality to come up with the best result for each entry. He then joins the company and location data to the data in his Server to find the correct account.

Karl finds that his join doesn't always work. The canonical company name he picked doesn't always match what is in his accounts database. He converts his join to a fuzzy join, reviews the fuzzy matches, and further corrects the result manually.

Now that he has his data cleaned up, he opens it up in Tableau to create his data visualization.

Commonly used features of flows include:

- Multiple levels of unions, joins, and aggregations that require the user to have precise control over the logical order of operations.
- A layout that has been arranged and annotated by the user to improve understanding.
- A need for clarity into the structure of data as it progresses through the flow.
- Reuse of portions of a flow to produce two different outputs.
- An author preparing data for two or more other users, sometimes on separate teams.
- Scheduling flows to run automatically.

Data preparation applications are sometimes classified as ETL (extract, transform, and load) systems. Each of the three phases performs different types of tasks.

In the extract phase, users pull data from one or more available data sources. Commonly, users perform these tasks:

- Simply move files. For example, a user may retrieve a file from an FTP source prior to other processing.
- Ingest data that varies widely in structure (e.g., relational, semi-structured, or unstructured), format (e.g., structured storage, CSV files, or JSON files), and source (e.g., from a file system or from a formal database).
- Read an entire source, or a select part of it. Partial reads are common, both to pull data that is newer than or changed since the last ingestion, or to sample or pull chunks for performance reasons.

In the transform phase, users transform the data in a wide variety of ways. Commonly, the transformations include these tasks:

- Clean the data to fix errors, handle missing or duplicate values, reconcile variant values that should be the same, conform values to standards, and so on.
- Augment or enrich the data through scalar and table calculations, aggregation, filtering of rows and columns, (un-)pivot, or incorporation of external data (e.g., through geocoding).
- Combine multiple sources through union or joins (including fuzzy joins).
- Deinterleave multiple types of data that have been put together (either in rows or in columns) for separate processing.
- Extract profiles of the data or metrics about the data to better understand it.

In the load phase, a user stores the results so that the results can be analyzed. This includes:

- Writing data to a Tableau Data Extract (TDE), formatted files (e.g., CSV or Excel), or an external database.
- Create snapshots on a schedule.
- Append or update data with new or modified results.

Once a user has constructed a flow to prepare data, the user often needs to:

- Schedule the flow to run at specified times, or in concert with other flows.
- Share the result of a flow with others.
- Share the flow itself with others, so that others may examine, modify, clone, or manage it. This includes sharing the flow or data with IT so that IT can improve and manage it.

Disclosed systems 250 give control to users. In many cases, the data prep application makes intelligent choices for the user, but the user is always able to assert control. Control often has two different facets: control over the logical ordering of operations, which is used to ensure the results are correct and match the user's desired semantics; and physical control, which is mostly used to ensure performance.

Disclosed data prep application 250 also provide freedom. Users can assemble and reassemble their data production components however they wish in order to achieve the shape of data they need.

Disclosed data prep applications 250 provide incremental interaction and immediate feedback. When a user takes actions, the system provides feedback through immediate results on samples of the user's data, as well as through visual feedback.

Typically, ETL tools use imperative semantics. That is, a user specifies the details of every operation and the order in which to perform the operations. This gives the user complete control. In contrast, an SQL database engine evaluates declarative queries and is able to select an optimal execution plan based on the data requested by the query.

Disclosed implementations support both imperative and declarative operations, and a user can select between these two execution options at various levels of granularity. For example, a user may want to exercise complete control of a flow at the outset while learning about a new dataset. Later, when the user is comfortable with the results, the user may relinquish all or part of the control to the data prep application in order to optimize execution speed. In some implementations, a user can specify a default behavior for each flow (imperative or declarative) and override the default behavior on individual nodes.

Disclosed implementations can write data to many different target databases, including a TDE, SQL Server, Oracle, Redshift, flat files, and so on. In some instances, a flow creates a new data set in the target system. In other instances, the flow modifies an existing dataset by appending new rows, updating existing rows, inserting rows, or deleting rows.

Errors can occur while running a flow. Errors can include transient system issues, potential known error condition in the data, for which the user may encode corrective action, and implicit constraints that the author did not consider. Disclosed implementations generally handle these error conditions automatically when possible. For example, if the same error condition was encountered in the past, some implementations reapply a known solution.

Although a flow is essentially a data transformation, implementations enable users to annotate their outputs with declarative modelling information to explain how the outputs can be used, viewed, validated, or combined. Examples include:

- Annotations that affect how values are displayed in Tableau, such as default coloring or formatting.
- Annotations on a field to indicate units or lineage.
- The creation of aliases and groups.
- Functional constraints, such as primary and foreign keys between tables.
- Domain constraints, such as requiring that a field be positive.

Disclosed implementations generally include these components:

- A front-end area that users interact with to view, build, edit, and run the flows.
- An Abstract Flow Language (AFL). This is an internal language that expresses all of the logic in a flow, including connections to sources, calculations and other transformations, modeling operations, and what is done with rows that are the result of the flow.
- An execution engine. The engine interprets and executes AFL programs. In some implementations, the engine runs locally. Queries may be pushed to remote servers, but the results and further processing will be done using local resources. In a server environment, the server provides a shared, distributed execution environment for flows. This server can schedule and execute flows from many users, and can analyze and scale out AFL flows automatically.
- A catalog server, which allows flows to be published for others.

Some data visualization applications are able to execute data prep flows and can use TDEs or other created datasets to construct data visualizations.

Disclosed implementations can also import some data flows created by other applications (e.g., created in an ETL tool).

Implementations enable users to:

- Connect to and read from a data source, as shown in FIG. 6B.
- Build a flow that combines supported operations (see FIG. 6A) in arbitrary orders and combinations.
- See a reasonable sample of how the data will be transformed at each step of their flow (e.g., in the profile pane and data pane).
- Craft visualizations of the data at every step of a flow.
- Execute a completed flow locally to produce outputs, such as a TDE or CSV output (see FIG. 6C).
- Publish a pipeline or TDE result to a Catalog Server.
- Import a TDS (Tableau Data Source) created in Data Prep as an explicit flow.

With access to a configured Server, a user can:

- Share a TDE with others.
- Share a data prep pipeline (flow) with other users with appropriate security.
- Execute a data prep pipeline in a server environment to produce a TDE manually or on a schedule.

The output of a node can be directed to more than one following node. There are two basic cases here. In the first case, the flows diverge and do not come back together. When the flows do not converge, there are multiple outputs from the flow. In this case, each branch is effectively a separate query that consists of all predecessors in the tree. When possible, implementations optimize this so that the shared portion of the flow is not executed more than once.

In the second case, the flow does converge. Semantically, this means that the rows flow though both paths. Again, the flow execution generally does not double execute the ancestors. Note that a single flow can have both of these cases.

The user interface:

- enables users to create forks in a flow. When a new node is added, a user can specify whether the new node creates a fork at the selected node or is inserted as an intermediate node in the existing sequence of operations. For example, if there is currently a path from node A to node B, and the user chooses to insert a new node at A, the user can select to either create a second path to the new node, or insert the new node between A and B.
- enables a user to run individual outputs of a flow rather than the entire flow.

Users can add filters to a flow of arbitrary complexity. For example, a user can click to add a filter at a point in the flow, and then enter a calculation that acts as a predicate. In some implementations, the calculation expressions are limited to scalar functions. However, some implementations enable more complex expressions, such as aggregations, table calculations, or Level of Detail expressions.

A user can edit any filter, even if it was inferred by the system. In particular, all filters are represented as expressions.

The profile pane 314 and data pane 315 provide easy ways to create filters. For example, some implementations enable a user to select one or more data values for a column in the data pane, then right-click and choose "keep only" or "exclude." This inserts a filter into the flow at the currently selected node. The system infers an expression to implement the filter, and the expression is saved. If the user needs to modify the filter later, it is easy to do so, regardless of whether the later time is right away or a year later.

In the profile pane 314, a user can select a bucket that specifies a range of values for a data field. For example, with a categorical field, the range is typically specified as a list of values. For a numeric field, the range is typically specified as a contiguous range with an upper or lower bound. A user can select a bucket and easily create a filter that selects (or excludes) all rows whose value for the field fall within the range.

When a user creates a filter based on multiple values in one column or multiple buckets for one column, the filter expression uses OR. That is, a row matches the expression if it matches any one of the values or ranges.

A user can also create a filter based on multiple data values in a single row in the data pane. In this case, the filter expression uses AND. That is, only rows that match all of the specified values match the expression. This can be applied to buckets in the profile pane as well. In this case, a row much match on each of the selected bucket ranges.

Some implementations also allow creation of a filter based on a plurality of data values that include two or more rows and include two or more columns. In this case, the expression created is in disjunctive normal form, with each disjunct corresponding to one of the rows with a selected data value. Some implementations apply the same technique to range selections in the profile window as well.

Note that in each of these cases, a user visually selects the data values or buckets, then with a simple gesture (e.g., right-click plus a menu selection) creates a filter that limits the rows to just the selected values or excludes the selected values. The user does not have to figure out how to write an expression in correct Boolean logic.

Figure 9:
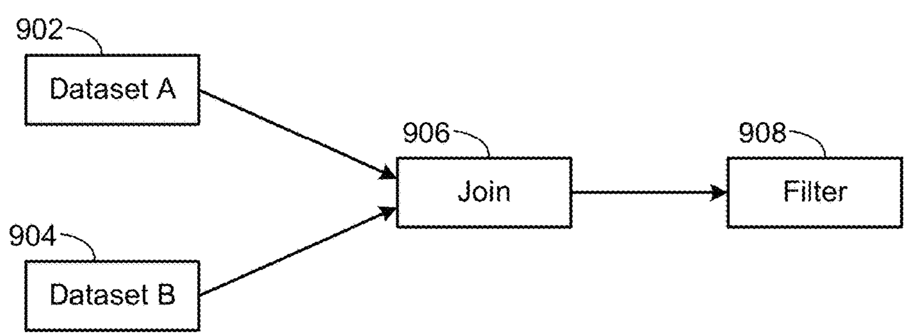
FIG. 9 illustrates a portion of a flow diagram in accordance with some implementations.

As illustrated above with respect to FIGS. 4A-4V, a user can create joins. Depending on whether declarative execution is enabled, the join may be pushed to a remote server for execution, as illustrated in FIG. 9 below.

Some implementations provide simplified or condensed versions of flows as nodes and annotations. In some implementations, a user can toggle between a full view or a condensed view, or toggle individual nodes to hide or expose the details within the node. For example, a single node may include a dozen operations to perform cleanup on certain source files. After several iterations of experimentation with the cleanup steps, they are working fine, and the user does not generally want to see the detail. The detail is still there, but the user is able to hide the clutter by viewing just the condensed version of the node.

In some implementations, operational nodes that do not fan out are folded together into annotations on the node. Operations such as joins and splits will break the flow with additional nodes. In some implementations, the layout for the condensed view is automatic. In some implementations, a user can rearrange the nodes in the condensed view.

Both the profile pane and the data pane provide useful information about the set of rows associated with the currently selected node in the flow pane. For example, the profile pane shows the cardinalities for various data values in the data (e.g., a histogram showing how many rows have each data value). The distributions of values are shown for multiple data fields. Because of the amount of data shown in the profile pane, retrieval of the data is usually performed asynchronously.

In some implementations, a user can click on a data value in the profile pane and see proportional brushing of other items. When a user selects a specific data value, the user interface:

- Indicates the selection.
- Uses proportional brushing to indicate the correlation with other columns in that table.
- Filters or highlight the associated data pane to show only rows whose values that match the selection. (This filters the displayed data in the data pane, and does not create a filter node in the flow pane.)
- When there are multiple values selected in the profile pane, all of the selected values are indicated and the data pane is filtered accordingly (i.e., filtered to rows matching any one of the values).

In some implementations, rows are not displayed in the data pane unless specifically requested by the user. In some implementations, the data pane is always automatically populated, with the process proceeding asynchronously. Some implementations apply different standards based on the cardinality of the rows for the selected node. For example, some implementations display the rows when the cardinality is below a threshold and either does not display the rows or proceeds asynchronously if the cardinality is above the threshold. Some implementations specify two thresholds, designating a set of rows as small, large, or very large. In some implementations, the interface displays the rows for small cardinalities, proceeds to display rows asynchronously for large cardinalities, and does not display the results for very large cardinalities. Of course the data pane can only display a small number of rows, which is usually selected by sampling (e.g., every nth row). In some implementations, the data pane implements an infinite scroll to accommodate an unknown amount of data.

Disclosed data prep applications provide a document model that the User Interface natively reads, modifies, and operates with. This model describes flows to users, while providing a formalism for the UI. The model can be translated to Tableau models that use AQL and the Federated Evaluator to run. The model also enables reliable caching and re-use of intermediate results.

Figure 7A:
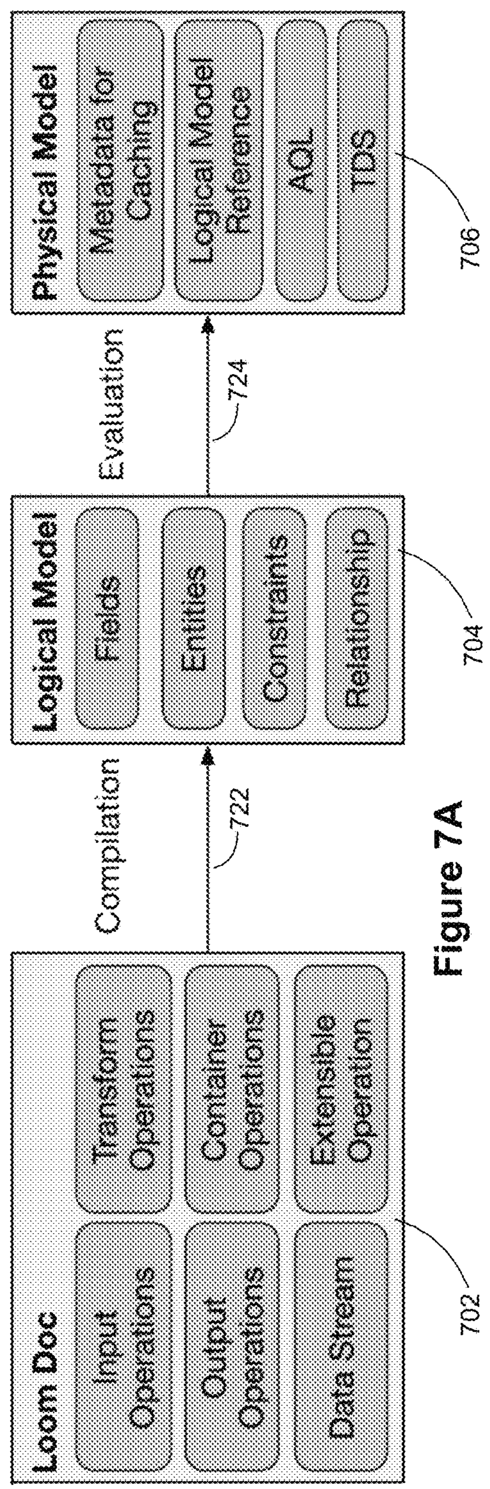
FIGS. 7A and 7B illustrate some components of a data preparation system, in accordance with some implementations.

As illustrated in FIG. 7A, the data model includes three sub-models, each of which describes a flow in its appropriate stages of evaluation. The first sub-model is a "Loom Doc" 702. (Some implementations refer to the data prep application as "Loom.")

A Loom doc 702 is the model that describes the flow that a user sees and interacts with directly. A Loom doc 702 contain all the information that is needed to perform all of the ETL operations and type checking. Typically, the Loom doc 702 does not include information that is required purely for rendering or editing the flow. A Loom doc 702 is constructed as a flow. Each operation has:

- A set of properties that describe how it will perform its operations.
- Zero or more inputs that describe what data to perform the operations on.
- Zero or more outputs that describe the data that results from this operation.

There are four major types of operations: input operations, transform operations, output operations, and container operations.

The input operations perform the "Extract" part of ETL. They bind the flow to a data source, and are configured to pull data from that source and expose that data to the flow. Input operations include loading a CSV file or connecting to an SQL database. A node for an input operation typically has zero inputs and at least one output.

The transform operations perform the "Transform" part of ETL. They provide "functional" operations over streams of data and transform it. Examples of transform operations include "Create Calculation as '[HospitalName]-[Year]'", "Filter rows that have hospitalId='HarbourView'", and so on. Transform nodes have at least one input and at least one output.

The output operations provide the "Load" part of ETL. They operate with the side effects of actually updating the downstream data sources with the data stream that come in. These nodes have one input, and no output (there are no "outputs" to subsequent nodes in the flow).

The container operations group other operations into logical groups. These are used to help make flows easier to document. Container operations are exposed to the user as "Nodes" in the flow pane. Each container node contains other flow elements (e.g., a sequence of regular nodes), as well as fields for documentation. Container nodes can have any number of inputs and any number of outputs.

A data stream represents the actual rows of data that moves across the flow from one node to another. Logically, these can be viewed as rows, but operationally a data stream can be implemented in any number of ways. For example, some flows are simply compiled down to AQL (Analytical Query Language).

The extensible operations are operations that the data prep application does not directly know how to evaluate, so it calls a third-party process or code. These are operations that do not run as part of the federated evaluator.

The logical model 704 is a model that contains all of the entities, fields, relationships, and constraints. It is built up by running over the flow, and defines the model that is built up at any part in the flow. The fields in the logical model are column in the results. The entities in the logical model represent tables in the results, although some entities are composed of other entities. For example, a union has an entity that is a result of other entities. The constraints in the logical model represents additional constraints, such as filters. The relationships in the logical model represent the relationships across entities, providing enough information to combine them.

The physical model 706 is the third sub-model. The physical model includes metadata for caching, including information that identifies whether a flow needs to be re-run, as well as how to directly query the results database for a flow. The metadata includes:

A hash of the logical model at this point.

A timestamp for each root data source, and when it was last queried.

A path or URI describing where the results data is.

This data is used for optimizing flows as well as enabling faster navigation of the results.

The physical model includes a reference to the logical model used to create this physical model (e.g. a pointer to a file or a data store). The physical model 706 also includes a Tableau Data Source (TDS), which identifies the data source that will be used to evaluate the model. Typically, this is generated from the logical model 704

The physical model also includes an AQL (Analytical Query Language) query that will be used to extract data from the specified data source.

As illustrated in FIG. 7A, the loom doc 702 is compiled (722) to form the logical model 704, and the logical model 704 is evaluated (724) to form the physical model.

Figure 7B:
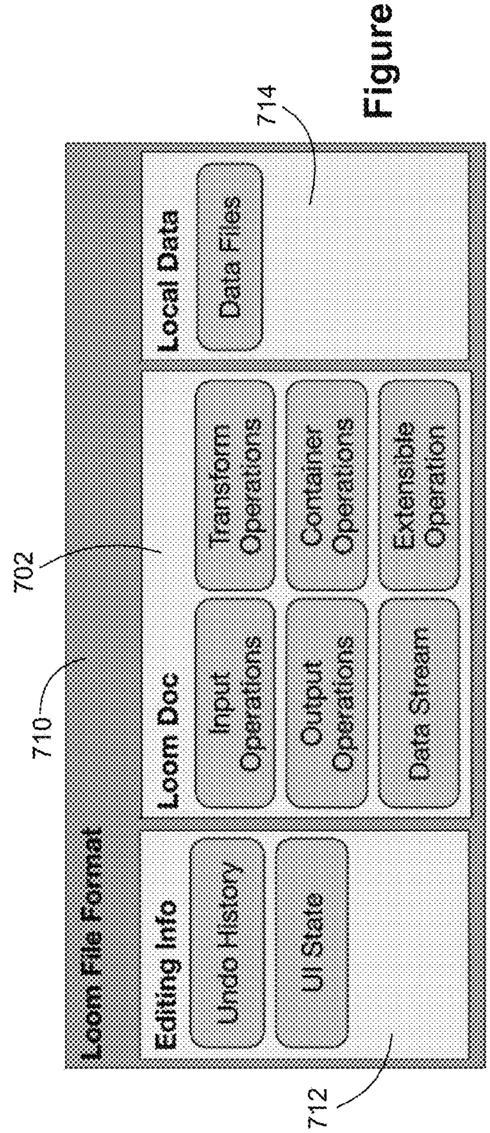

FIG. 7B illustrates a file format 710 that is used by some implementations. The file format 710 is used in both local and remote execution. Note that the file format contains both data and flows. In some instances, a flow may create data by doing a copy/paste. In these cases, the data becomes a part of the flow. The file format holds a UI state, separate from the underlying flow. Some of the display is saved with the application. Other parts of layout are user specific and are stored outside of the application. The file format can be versioned.

The file format has a multi-document format. In some implementations, the file format has three major parts, as illustrated in FIG. 7B. In some implementations, the file format 710 includes editing info 712. This section is responsible for making the editing experience continue across devices and editing sessions. This section stores any pieces of data that are not needed for evaluating a flow, but are needed to re-construct the UI for the user. The editing info 712 include Undo History, which contains a persistent undo buffer that allows a user to undo operations after an editing session has been closed and re-opened. The editing info also includes a UI State, such as what panes are visible, x/y coordinates of flow nodes, which are not reflected in how a flow is run. When a user re-opens the UI, the user sees what was there before, making it easier to resume work The file format 710 includes a Loom Doc 702, as described above with respect to FIG. 7A. This is the only section of the file format that is required. This section contains the flow.

The file format 710 also includes local data 714, which contains any tables or local data needed to run a flow. This data can be created through user interactions, such as pasting an HTML table into the data prep application, or when a flow uses a local CSV file that needs to get uploaded to a server for evaluation.

Figure 7C:
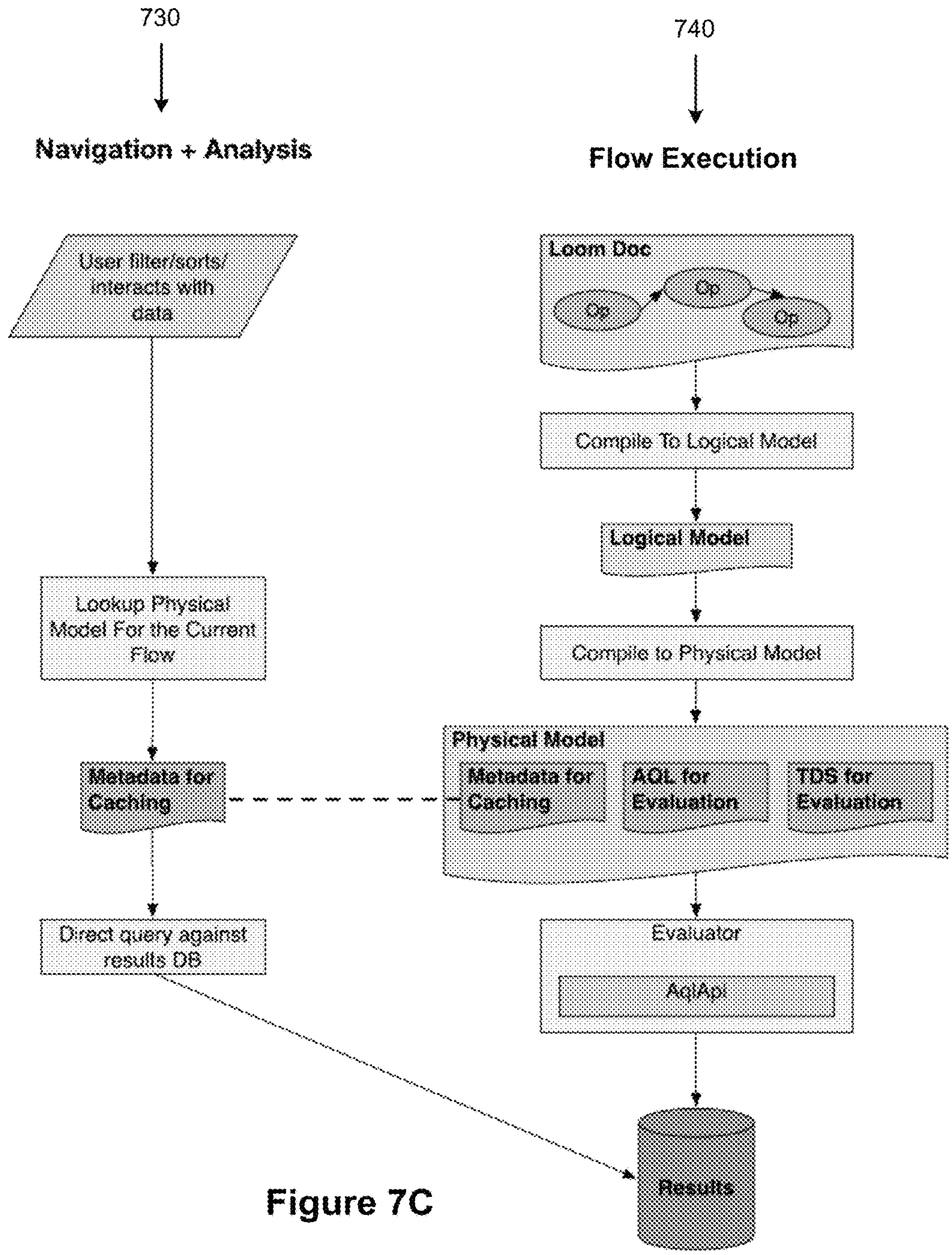
FIG. 7C illustrate evaluating a flow, either for analysis or execution, in accordance with some implementations.

The Evaluation Sub-System is illustrated in FIG. 7C. The evaluation sub-system provides a reliable way to evaluate a flow. The evaluation sub-system also provides an easy way to operate over the results of an earlier run or to layer operations on top of a flow's operation. In addition, the evaluation sub-system provides a natural way to re-use the results from one part of the flow when running later parts of the flow. The evaluation sub-system also provides a fast way to run against cached results.

There are two basic contexts for evaluating a flow, as illustrated in FIG. 7C. When running (740) a flow, the process evaluates the flow and pours the results into the output nodes. If running in debug mode, the process writes out the results in temporary databases that can be used for navigation, analysis, and running partial flows faster.

In navigation and analysis (730), a user is investigating a dataset. This can include looking at data distributions, looking for dirty data, and so on. In these scenarios, the evaluator generally avoids running the entire flow, and instead runs faster queries directly against the temporary databases created from running the previous the flows previously.

These processes take advantage of good metadata around caching in order to make sure that smart caching decisions are possible.

Figure 7D:
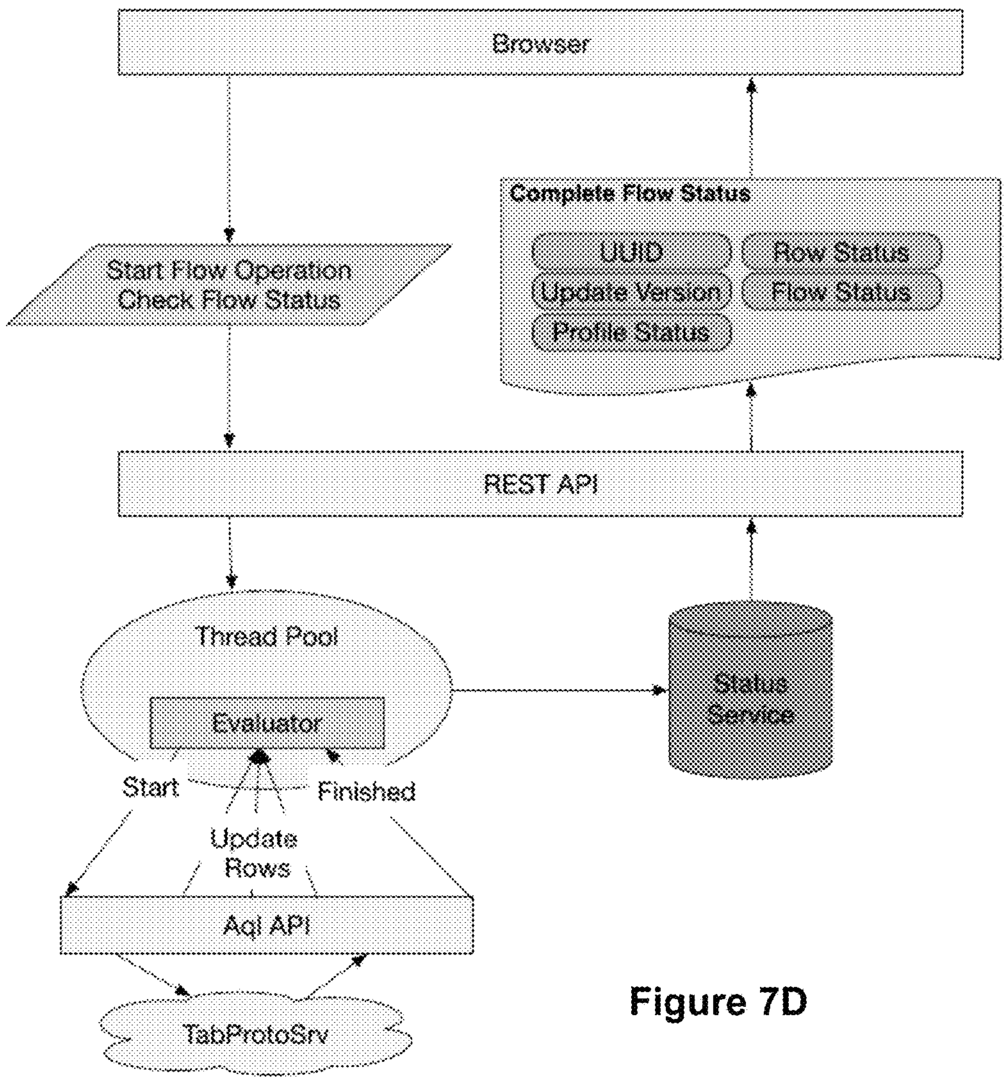
FIG. 7D schematically represents an asynchronous subsystem used in some data preparation implementations.

Some implementations include an Async sub-system, as illustrated in FIG. 7D. The async sub-system provides non-blocking behavior to the user. If the user is doing a bunch of operations that don't require getting rows back, the user is not blocked on getting them. The async sub-system provides incremental results. Often a user won't need the full set of data to start validating or trying to understand the results. In these cases, the async sub-system gives the best results as they arrive. The async sub-system also provides a reliable "cancel" operation for queries in progress.

In some implementations, the async model includes four main components:

A browser layer. This layer gets a UUID and an update version from the async tasks it starts. It then uses the UUID for getting updates.

A REST API. This layer starts tasks in a thread-pool. The tasks in the thread-pool update the Status Service as they get updates. When the browser layer wants to know if there are updates, it calls a REST API procedure to get the latest status.

An AqlAPI. This layer is called as if it were a synchronous call that had callbacks. The call will only finish when the underlying request is finished. However, the callbacks allow updates to the Status Service with rows already processed. This enables providing incremental progress to the user.

A federated evaluator. The AqlApi calls into the federated evaluator, which provides another layer of asynchrony, because it runs as a new process.

Implementation of cancel operations depend on where the cancellation occurs. In the browser layer, it is easy to send a cancel request, and then stop polling for results. In the REST API, it is easy to send a cancel event to a thread that is running.

Some implementations make it safe and easy to "refactor" a flow after it is already created. Currently, ETL tools allow people to make flows that initially appear fairly simple, but become impossible to change as they get bigger. This is because it is hard for people to understand how their changes will affect the flow and because it is hard to break out chunks of behavior into pieces that relate to the business requirements. Much of this is caused by the user interface, but the underlying language needs to provide the information needed by the UI.

Disclosed implementations enable users to create flows that can be easily refactored. What this means is that users are able to take operations or nodes and easily:

- Move the operations around, re-ordering them logically. Implementations provide direct feedback on whether these operations create errors. For example, suppose a user has a flow with ADD_COLUMN→FILTER. The user can drag the FILTER node before the ADD_COLUMN node, unless the FILTER uses the column that was added. If the FILTER uses the new column, the interface immediate raises an error, telling the user the problem.
- Collapse a number of operations and nodes into one new node (which can be re-used). This new node will have a "type" that it accepts and a "type" that it returns. For example, suppose a user has a snippet of a flow that includes JOIN_TABLES→ALTER_COLUMN→ALTER_COLUMN→ALTER_COLUMN. Implementations enable a user to combine these four steps into one node and assign the node a meaningful name, such as "FIXUP_CODES." The new node takes two tables as inputs and returns a table. The types of the input tables would include the columns that they were joined on, and any columns that ended up being used in the ALTER_COLUMNS. The type of the output table is the type that results from the operations.
- Split out operations from a node. This is where a user can re-organize the operations that were organically added to a node, during immediate operations. For example, suppose a user has a giant node that has 20 operations in it, and the user wants to split out the 10 operations related to fixing up hospital codes into its own node. The user can select those nodes, and pull them out. If there are other operations in the node that depend on the operations that are getting removed, the system shows the error, and suggests a fix of creating a new node after the FixupHospitalCodes node.
- Inlining operations into an existing node. After a user has done some cleaning, there may be some work that belongs in another part of the flow. For example, as a user cleans up Insurance Codes, she finds some problems with the hospital codes and cleans it up. Then, she wants to move the hospital code clean-up to the FixupHospitalCodes node. This is accomplished using an easy drag/drop operation. If the user tries to drop the operation in a location in the flow before an operation that it depends on, the interface provides immediate visual feedback that the proposed drop location does not work.
- Change a type, and find out if it breaks parts of the flow immediately. A user may use a flow, then decide to change a type of one of the columns. Implementations immediately inform the user about any problems even before running the flow.

In some implementations, when a user is refactoring a flow, the system helps by identifying drop targets. For example, if a user selects a node and begins to drag it within the flow pane, some implementations display locations (e.g., by highlighting) where the node can be moved.

Disclosed data prep applications use a language that has three aspects:

- An expression language. This is how users define calculations
- A data flow language. This is how users define a flow's inputs, transforms, relationships, and outputs. These operations directly change the data model. The types in this language are entities (tables) and relationships rather than just individual columns. Users do not see this language directly, but use it indirectly through creating nodes and operations in the UI. Examples include joining tables and removing columns.
- A control flow language. These are operations that may happen around the data flow, but are not actually data flow. Examples include copying a zip from a file share and then unzipping it, taking a written out TDE, and then copying it to a share, or running a data flow over an arbitrary list of data sources.

These languages are distinct, but layer on top of each other. The expression language is used by the flow language, which in turn can be used by the control flow language.

Figure 8A:
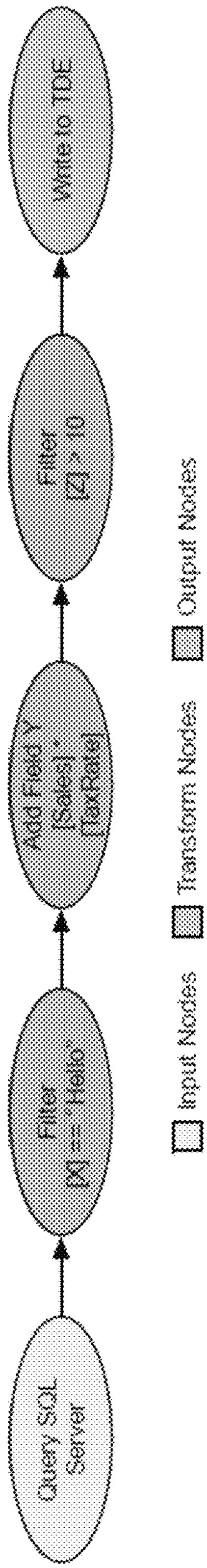
FIG. 8A illustrates a sequence of flow operations in accordance with some implementations.

The language describes a flow of operations that logically goes from left to right, as illustrated in FIG. 8A. However, because of the way the flow is evaluated, the actual implementation can rearrange the operations for better performance. For example, moving filters to remote databases as the data is extracted can greatly improve overall execution speed.

The data flow language is the language most people associate with the data prep application because it describes the flow and relationship that directly affect the ETL. This part of the language has two major components: models and nodes/operations. This is different from standard ETL tools. Instead of a flow directly operating on data (e.g. flowing actual rows from a "filter" operation to an "add field" operation) disclosed flows define a logical model that specifies what it wants to create and the physical model defining how it wants to materialize the logical model. This abstraction provides more leeway in terms of optimization.

Models are the basic nouns. They describe the schema and the relationships of the data that is being operated on. As noted above, there is a logical model and a separate physical model. A Logical Model provides the basic "type" for a flow at a given point. It describes the fields, entities, and relationships that describe the data being transformed. This model includes things such as sets and groups. The logical model specifies what is desired, but not any materialization. The core parts of this model are:

- Fields: These are the actual fields that will get turned in data fields in the output (or aid calculations that do so). Each field is associated with an entity and an expression. Fields don't necessarily all need to be visible. There are 3 types of fields: physical fields, computed fields, and temporary fields. Physical fields get materialized into the resulting data set. These can be either proper fields, or calculations. Computed fields are written to the resulting TDS as computed fields, so they will never get materialized. Temporary fields are written to better factor the calculations for a physical field. They are not written out in any way. If a temporary field is referenced by a computed field, the language will issue a warning and treat this field as a computed field.
- Entities: These are the objects that describe the namespace for the logical model. Entities are created either by the schema of a table coming in, or can be composed of a collection of entities that are associated together by relationships.
- Relationships: These are objects that describe how different entities relate to each other. They can be used to combine multiple Entities into a new composite entity.

Constraints: These describe constraints added to an entity. Constraints include filters that actually limit the results for an entity. Some constraints are enforced. Enforced constraints are guaranteed from an upstream source, such as a unique constraint, or not-null constraint. Some constraints are asserted. These are constraints that are believed to be true. Whenever data is found to violate this constraint, the user is notified in some way.

A flow can include one or more forks in the logical model. Forking a flow uses the same Logical Model for each fork. However, there are new entities under the covers for each side of the fork. These entities basically pass through to the original entities, unless a column gets projected or removed on them.

One reason to create new entities is to keep track of any relationships across entities. These relationships will continue to be valid when none of the fields change. However, if a field is modified it will be a new field on the new entity so the relationship will be known not to work anymore.

Some implementations allow pinning a node or operation. The flows describe the logical ordering for a set of operations, but the system is free to optimize the processing by making the physical ordering different. However, a user may want to make sure the logical and physical orderings are exactly the same. In these cases, a user can "pin" a node. When a node is pinned, the system ensures that the operations before the pin happen physically before the operations after the pin. In some cases, this will result in some form of materialization. However, the system streams through this whenever possible.

The physical model describes a materialization of the logical model at a particular point. Each physical model has a reference back to the logical model that was used to generate it. Physical models are important to caching, incremental flow runs, and load operations. A physical model includes a reference to any file that contains results of a flow, which is a unique hash describing the logical model up to this point. The physical model also specifies the TDS (Tableau Data Source) and the AQL (Analytical Query Language) generated for a run.

Nodes and Operations are the basic verbs. Nodes in the model include operations that define how the data is shaped, calculated, and filtered. In order to stay consistent with the UI language, the term "operations" refers to one of the "nodes" in a flow that does something. Nodes are used to refer to containers that contain operations, and map to what a user sees in the flow pane in the UI. Each specialized node/operation has properties associated with it that describe how it will operate.

There are four basic types of nodes: input operations, transform operations, output operations, and container nodes. Input operations create a logical model from some external source. Examples include an operation that imports a CSV. Input operations represent the E in ETL (Extract). Transform operations transform a logical model into a new logical model. A transform operation takes in a logical model and returns a new logical model. Transform nodes represent the T in ETL (Transform). An example is a project operation that adds a column to an existing logical model. Output operations take in a logical model and materialize it into some other data store. For example, an operation that takes a logical model and materializes its results into a TDE. These operations represent the L in ETL (Load). Container nodes are the base abstraction around how composition is done across flows, and also provide an abstraction for what should be shown as the nodes are shown in the UI.

Figure 8B:
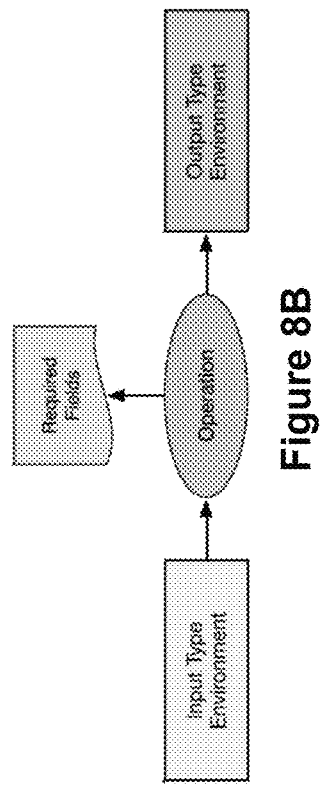
FIG. 8B illustrates three aspects of a type system in accordance with some implementations.

As illustrated in FIG. 8B, the type system consists of three major concepts:

Operations are atomic actions, each having inputs and outputs, as well as a required set of fields.

Required fields are fields that are needed by an operation. The required fields can be determined by evaluating the operation with an empty type environment, then gathering any of the fields that are "assumed."

Type Environments are the constructs that determine how to look up the types for a given point in a flow. Each "edge" in flow graph represents a type environment.

Type checking is performed in two phases. In the type environments creation phase, the system runs through the flow in the direction of the flow. The system figures out what types are needed by each node, and what type environments they output. If the flow is abstract (e.g., it does not actually connect to any input nodes), the empty type environment is used. Type refinement is the second phase. In this phase, the system takes the type environments from the first phase and flow them "backwards" to see if any of the type narrowing that happened in type environment creation created type conflicts. In this phase, the system also creates a set of required fields for the entire sub flow.

Each operation has a type environment associated with it. This environment contains all the fields that are accessible and their types. As illustrated in FIG. 8C, a type environment has five properties.

An environment can be either "Open" or "Closed". When an environment is Open, it assumes that there may be fields that it does not know about. In this case, any field that is not known will be assumed to be any type. These fields will be added to the AssumedTypes field. When an environment is Closed, it assumes it knows all the fields, so any fields that is not knows is a failure.

All known types are in the Types member. This is a mapping from field names to their types. The type may be either another type environment or it can be a Field. A field is the most basic type.

Each field is composed of two parts. basicTypes is a set of types that describes the possible set of types for the field. If this set has only one element, then we know what type it has. If the set is empty, then there was a type error. If the set has more than one element, then there are several possible types. The system can resolve and do further type narrowing if needed. derivedFrom is a reference to the fields that went into deriving this one.

Each field in a scope has a potential set of types. Each type can be any combination of Boolean, String, Integer, Decimal, Date, DateTime, Double, Geometry, and Duration. There is also an "Any" type, which is shorthand for a type that can be anything.

In the case of open Type Environments, there may be cases of fields that are known to not exist. For example, after a "removeField" operation, the system may not know all the fields in the Type Environment (because it is open), but the system does know that the field just removed is not there. The type Environment property "NotPresent" is used to identify such fields.

The AssumedTypes property is a list of the types that were added because they were referenced rather than defined. For example, if there is an expression [A]+[B] that is evaluated in an open type environment, the system assumes that there were two fields: A and B. The AssumedTypes property allows the system to keep track of what was added this way. These fields can be rolled up for further type winnowing as well as for being able to determine the required fields for a container.

The "Previous" type environment property is a reference to the type environment this one was derived from. It is used for the type refinement stages, during the backwards traversal through the flow looking for type inconsistencies.

Type environments can also be composed. This happens in operations that take multiple inputs. When, a type environment is merged, it will map each type environment to a value in its types collection. Further type resolution is then delegated to the individual type environments. It will then be up to the operator to transform this type environment to the output type environment, often by "flattening" the type environment in some way to create a new type environment that only has fields as types.

This is used by Join and Union operators in order to precisely use all of the fields from the different environments in their own expressions, and having a way to map the environment to an output type environment.

The type environment created by an input node is the schema returned by the data source it is reading. For an SQL database, this will be the schema of the table, query, stored procedure, or view that it is extracting. For a CSV file, this will be the schema that is pulled from the file, with whatever types a user has associated with the columns. Each column and its type is turned into a field/type mapping. In addition, the type environment is marked as closed.

The type environment for a transform node is the environment for its input. If it has multiple inputs, they will be merged to create the type environment for the operation. The output is a single type environment based on the operator. The table in FIGS. 8J-1 to 8J-3 lists many of the operations.

A container node may have multiple inputs, so its type environment will be a composite type environment that routes appropriate children type environments to the appropriate output nodes. When a container is pulled out to be re-used, it resolves with empty type environments for each input to determine its dependencies.

In some implementations, a container node is the only type of node that is able to have more than one output. In this case, it may have multiple output type environments. This should not be confused with branching the output, which can happen with any node. However, in the case of branching an output, each of the output edges has the same type environment.

There are a few cases where type errors are flagged when the system discovers conflicting requirements for a field. Unresolved fields are not treated as errors at this stage because this stage can occur over flows with unbounded inputs. However, if a user tried to run a flow, unresolved variables would be a problem that is reported.

Many of inputs have specific definitions of types. For example, specific definitions include using CHAR(10) instead of VARCHAR(2000), what collation a field uses, or what scale and precision a Decimal type has. Some implementations do not track these as part of the type system, but do track them as part of the runtime information.

The UI and middle tier are able to get at the runtime types. This information is able to flow through the regular callback, as well as being embedded in the types for tempdb (e.g., in case the system is populating from a cached run). The UI shows users the more specific known types, but does not type check based on them. This enables creation of Output-Nodes that use more specific types, while allowing the rest of the system to use the more simplified types.

Figure 8E:
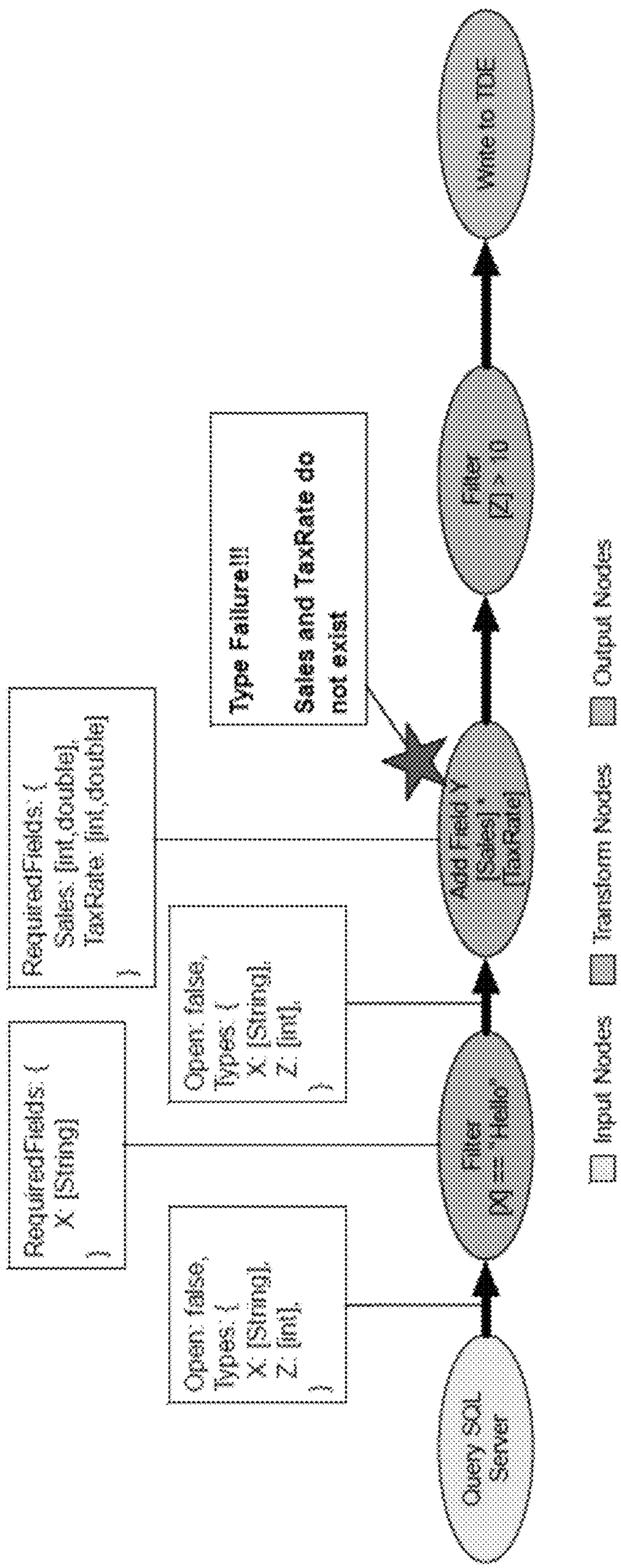
FIG. 8E illustrates a simple type failure with types fully known, in accordance with some implementations.
Figure 8F:
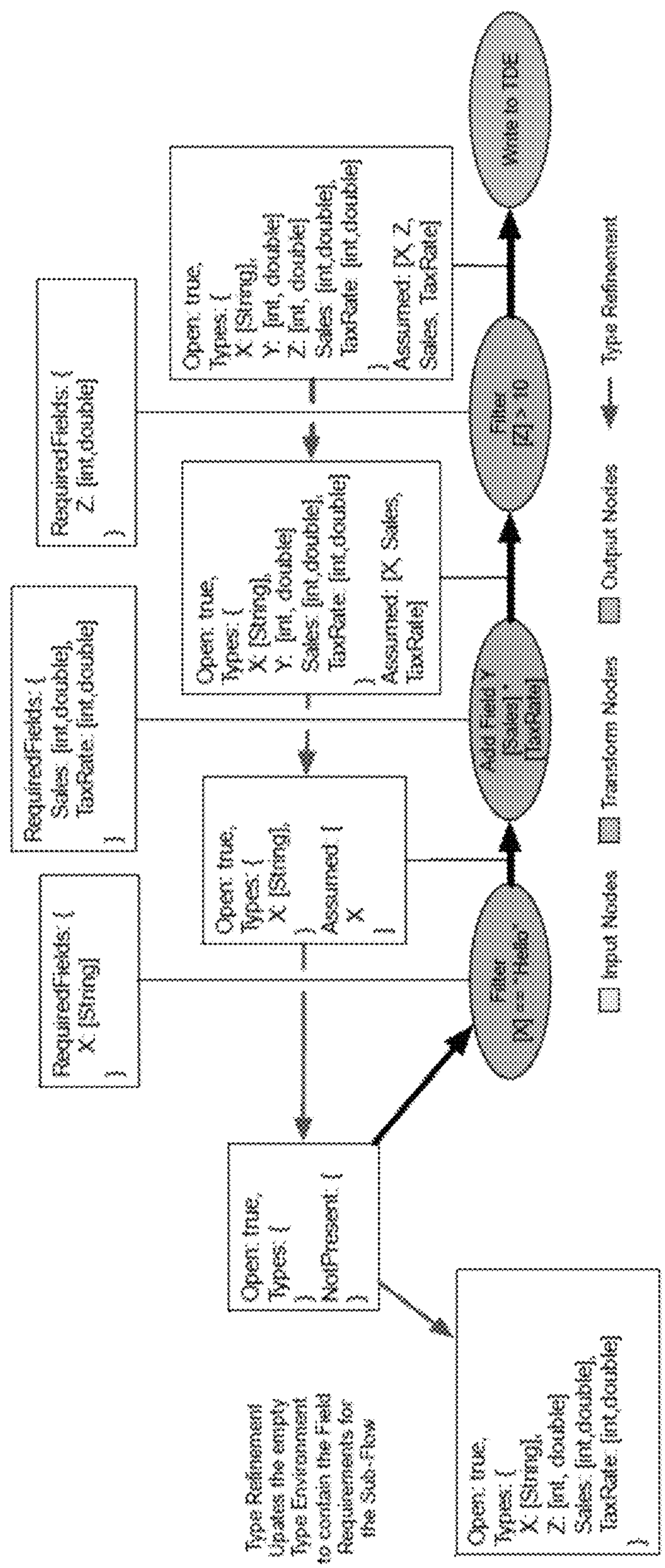
FIG. 8F illustrates simple type environment calculations for a partial flow, in accordance with some implementations.
Figure 8G:
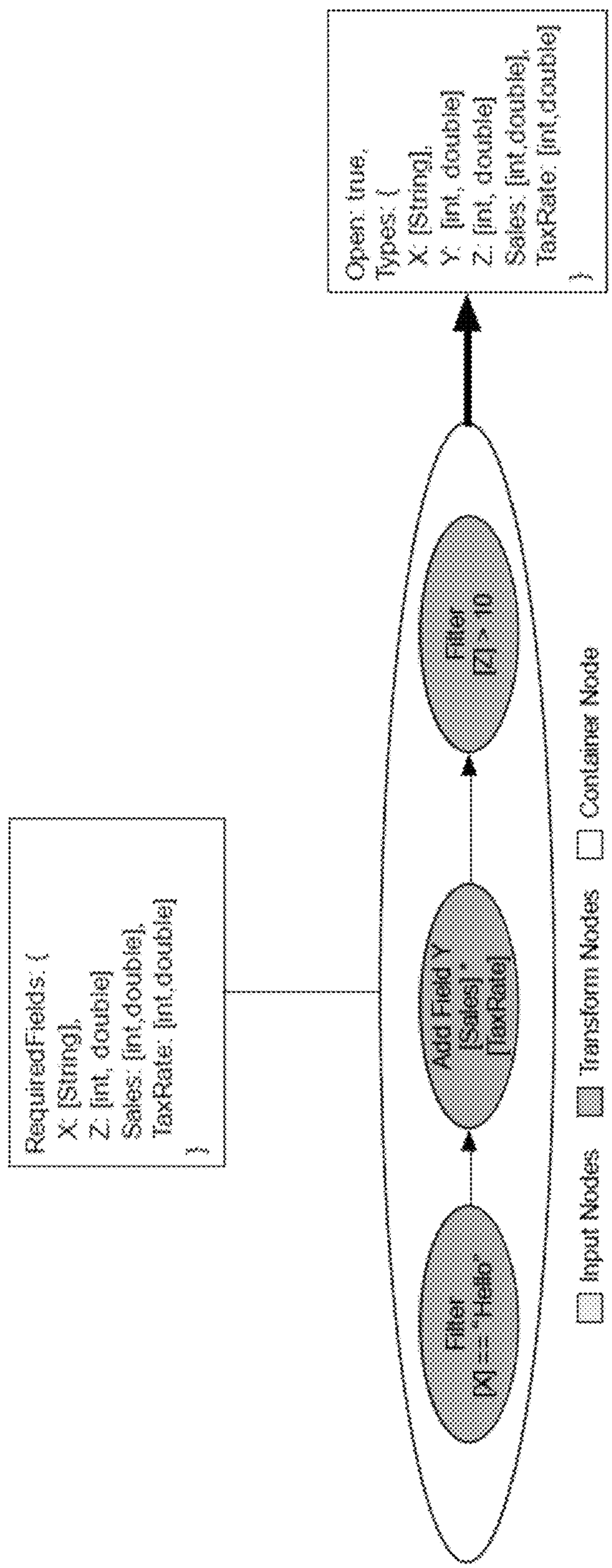
FIG. 8G illustrates types of a packaged-up container node, in accordance with some implementations.
Figure 8H:
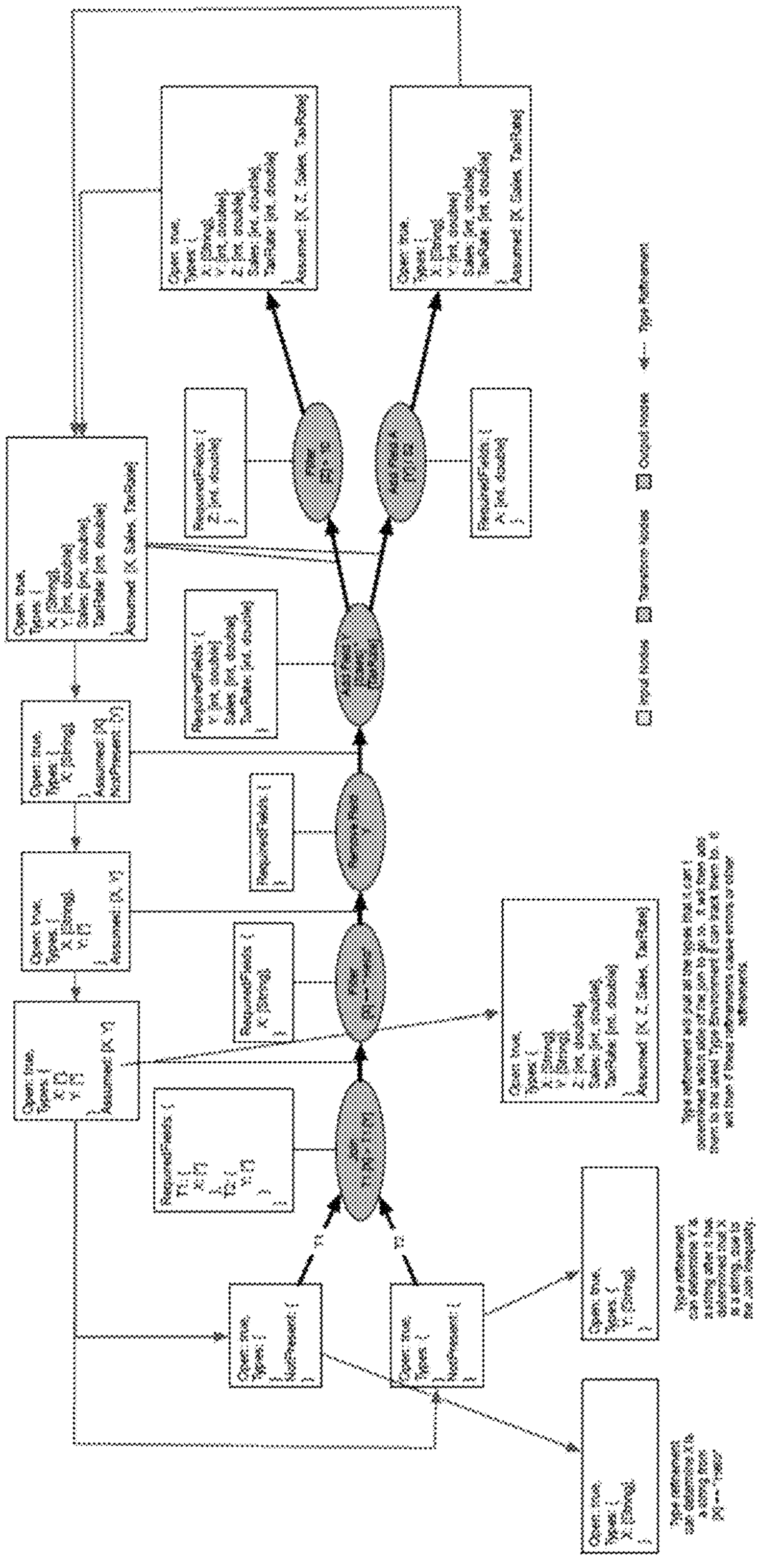
FIG. 8H illustrates a more complicated type environment scenario, in accordance with some implementations.
Figure 8I:
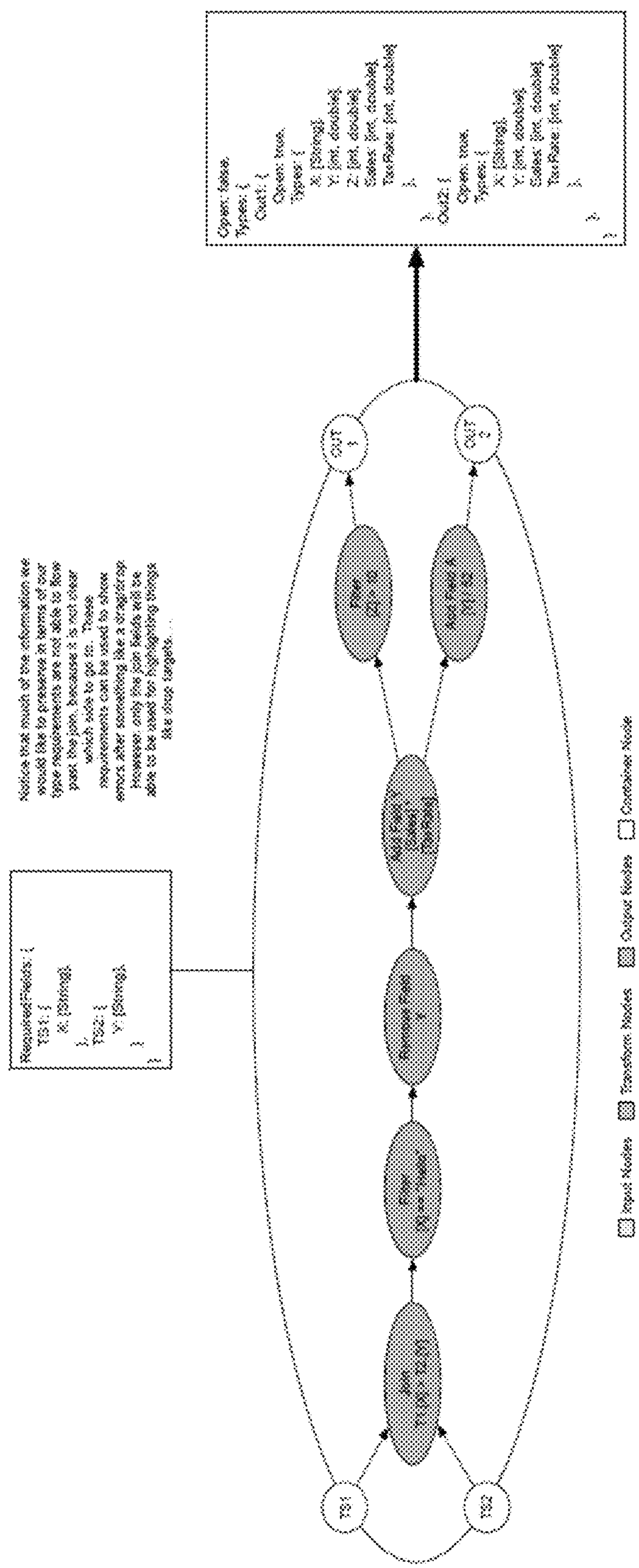
FIG. 8I illustrates reusing a more complicated type environment scenario, in accordance with some implementations.

FIG. 8D illustrates simple type checking based on a flow with all data types known. FIG. 8E illustrates a simple type failure with types fully known. FIG. 8F illustrates simple type environment calculations for a partial flow. FIG. 8G illustrates types of a packaged-up container node. FIG. 8H illustrates a more complicated type environment scenario. FIG. 8I illustrates reusing a more complicated type environment scenario.

Some implementations infer data types and use the inferred data types for optimizing or validating a data flow. This is particularly useful for text-based data sources such as XLS or CSV files. Based on how a data element is used later in a flow, a data type can sometimes be inferred, and the inferred data type can be used earlier in the flow. In some implementations, a data element received as a text string can be cast as the appropriate data type immediately after retrieval from the data source. In some instances, inferring data types is recursive. That is, by inferring the data type for one data element, the system is able to infer the data types of one or more additional data elements. In some instances, a data type inference is able to rule out one or more data types without determining an exact data type (e.g., determining that a data element is numeric, but not able to determine whether it is an integer or a floating point number).

Most of the type errors are found in the type checking stage. This comes right after calculating the initial type environments, and refines the scopes based on what is known about each type.

This phase starts with all the terminal type environments. For each type environment, the system walks back to its previous environments. The process walks back until it reaches a closed environment or an environment with no previous environment. The process then checks the types in each environment to determine if any fields differ in type. If so and the intersection of them is null, the process raises a type error. If any of the fields differ in type and the intersection is not null, the process sets the type to be the intersection and any affected nodes that have their type environments recalculated. In addition, any types that are "assumed" are added to the previous type environment and the type environments is recalculated.

There are a few subtleties that are tracked. First, field names by themselves are not necessarily unique, because a user can overwrite a field with something that has a different type. As a result, the process uses the pointer from a type back to the types used to generate it, thereby avoiding being fooled by unrelated things that resolve to the same name at different parts in the graph. For example, suppose a field A has type [int, decimal], but then there is a node that does a project that makes A into a string. It would be an error to go back to earlier versions of A and say the type doesn't work. Instead, the backtracking at this point will not backtrack A past the addField operation.

Type checking narrows one variable at a time. In the steps above, type checking is applied to only one variable, before re-computing the known variables. This is to be safe in the case there is an overloaded function with multiple signatures, such as Function1(string, int) and Function1(int, string). Suppose this is called as Function1([A], [B]). The process determines that the types are A: [String, int] and B: [String,,int]. However, it would be invalid for the types to resolve to A:[String] and B:[String], because if A is a String, B needs to be an int. Some implementations handle this type of dependency by re-running the type environment calculation after each type narrowing.

Some implementations optimize what work to do by only doing work on nodes that actually have a required field that includes the narrowed variable. There is a slight subtlety here, in that narrowing A may end up causing B to get narrowed as well. Take the Function1 example above. In these cases, the system needs to know when B has changed and check its narrowing as well.

When looking at how operators will act, it is best to think of them in terms of four major properties, identified here as "Is Open", "Multi-Input", "Input Type", and "Resulting Type".

An operation is designated as Open when it flows the columns through. For example, "filter" is an open operation, because any column that are in the input will also be in the output. Group by is not Open, because any column that is not aggregated or grouped on will not be in the resulting type.

The "Multi-Input" property specifies whether this operation takes multiple input entities. For example, a join is multi-input because it takes two entities and makes them one. A union is another operation that is multi-input.

The "Input Type" property specifies the type the node requires. For a multi-input operation, this is a composite type where each input contains its own type.

The "Resulting Type" property specifies the output type that results from this operation.

The tables in FIGS. 8J-1, 8J-2, and 8J-3 indicate the properties for many of the most commonly used operators.

In many instances, a flow is created over time as needs change. When a flow grows by organic evolution, it can become large and complex. Sometimes a user needs to modify a flow, either to address a changing need, or to reorganize a flow so that it is easier to understand. Such refactoring of a flow is difficult or impossible in many ETL tools.

Implementations here not only enable refactoring, but assist the user in doing so. At a technical level, the system can get the RequireFields for any node (or sequence of nodes), and then light up drop targets at any point that has a type environment that can accommodate it.

Another scenario involves reusing existing nodes in a flow. For example, suppose a user wants to take a string of operations and make a custom node. The custom node operates to "normalize insurance codes". The user can create a container node with a number of operations in it. The system can then calculate the required fields for it. The user can save the node for future use, either using a save command or dragging the container node to the left-hand pane 312. Now, when a person selects the node from the palette in the left-hand pane, the system lights up drop targets in the flow, and the user can drop the node onto one of the drop targets (e.g., just like the refactoring example above.).

ETL can get messy, so implementations here enable various system extensions. Extensions include

- User Defined Flow Operations. Users can extend a data flow with Input, Output, and Transform operations. These operations can use custom logic or analytics to modify the contents of a row.
- Control Flow Scripts. Users can build in scripts that do non-data flow operations, such as downloading a file from a share, unzipping a file, running a flow for every file in a directory, and so on.
- Command Line Scripting. Users can run their flows from a command line.

Implementations here take an approach that is language agnostic in terms of how people use the provided extensibility.

A first extension allows users to build custom nodes that fit into a flow. There are two parts to creating an extension node:

- Define the type of the output. For example, "everything that came in as well as the new column 'foo'".
- Provide the script or executable to actually run the transform.

Some implementations define two node types that allow for user-defined extensions. A "ScriptNode" is a node where the user can write script to manipulate rows, and pass them back. The system provides API functions. The user can then write a transform (or input or output) node as a script (e.g., in Python or Javascript). A "ShellNode" is a node where the user can define an executable program to run, and pipe the rows into the executable. The executable program will then write out the results to stdout, write errors to stderr and exit when it is done.

Figure 8K:
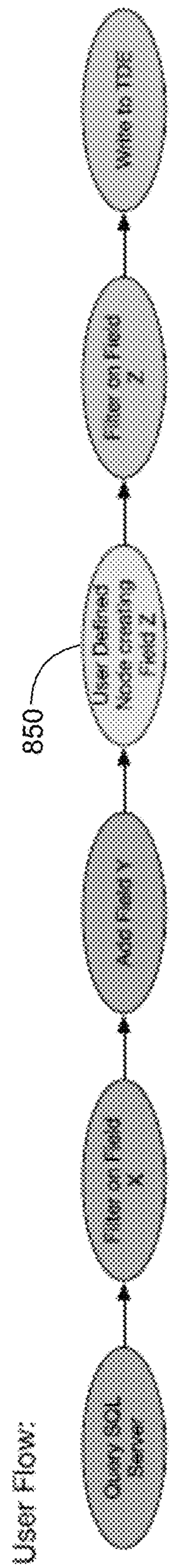
FIGS. 8K and 8L illustrate a flow and corresponding execution process, in accordance with some implementations.
Figure 8L:
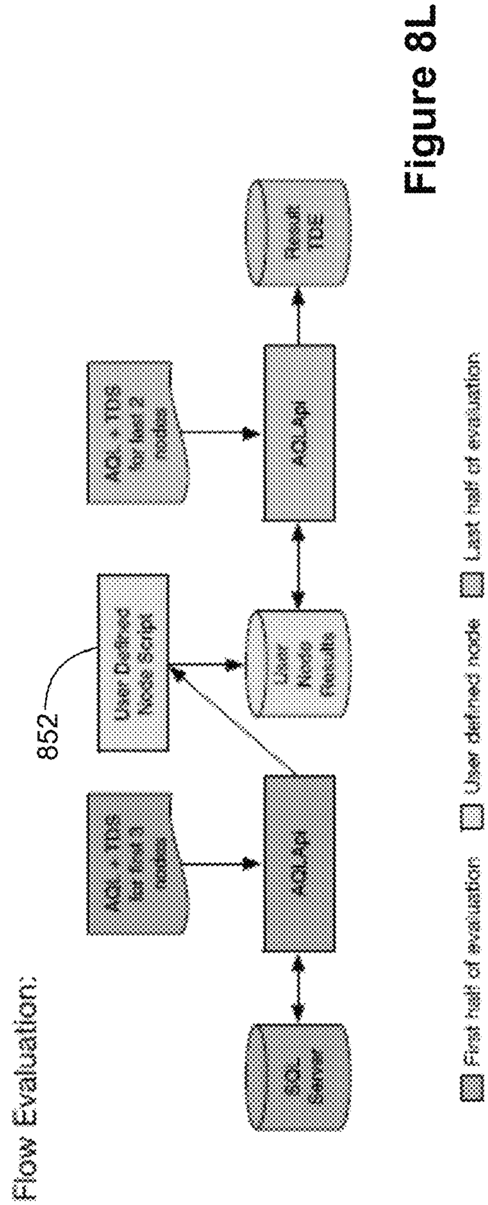

When users create extensions for flows, the internal processing is more complex. Instead of compiling everything down to one AQL statement, the process splits the evaluation into two pieces around the custom node, and directs the results from the first piece into the node. This is illustrated in FIGS. 8K and 8L, where the user defined node 850 splits the flow into two portions. During flow evaluation, the user defined script node 852 receives data from the first portion of the flow, and provides output for the second portion of the flow.

In addition to customizations that modify the flowing data in some way, users can write scripts that control how a flow runs. For example, suppose a user needs to pull data from a share that has spreadsheets published to it each day. A defined flow already knows how to deal with CSV or Excel files. A user can write a control script that iterates over a remote share, pulls down the relevant files, then runs the over those files.

There are many common operations, such as pattern union, that a user can add into a data flow node. However, as technology continues to evolve, there will always be ways to get or store data that are not accommodated by the system-defined data flow nodes. These are the cases where control flow scripts are applicable. These scripts are run as part of the flow.

As noted above, flows can also be invoked from the command line. This will allow folks to embed the scripts in other processes or overnight jobs.

Implementations have a flow evaluation process that provides many useful features. These features include:

- Running a flow all the way through.
- Breaking a flow apart in order to ensure order or "pinning" operations.
- Breaking a flow apart to allow 3rd party code to run.
- Running a flow, but instead of going all the way back to the upstream data sources, running it off of the output of a previously run flow.
- Pre-running some parts of the flow to populate local caches.

The evaluation process works based on the interplay between the logical models and physical models. Any materialized physical model can be the starting point of a flow. However, the language runtime provides the abstractions to define what subsections of the flows to run. In general, the runtime does not determine when to run sub-flows versus full flows. That is determined by other components.

Figure 8M:
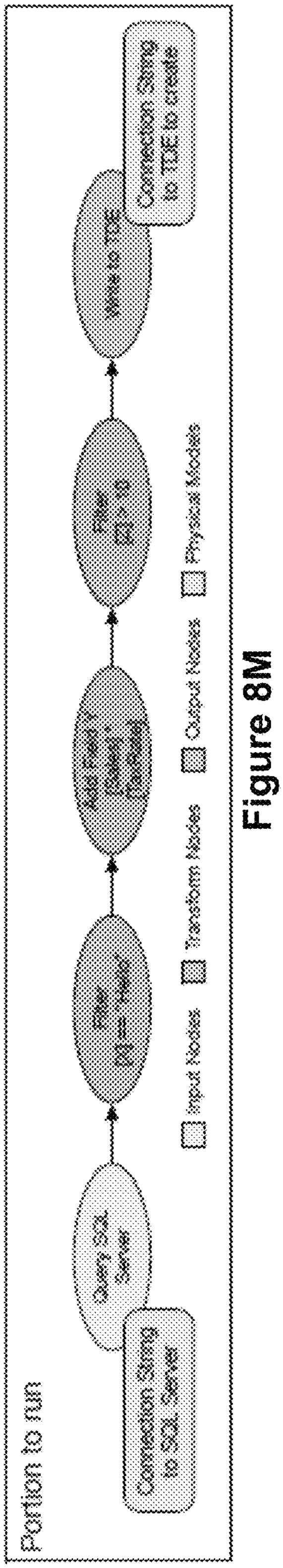
FIG. 8M illustrates that running an entire flow starts with implied physical models at input and output nodes, in accordance with some implementations.
Figure 8N:
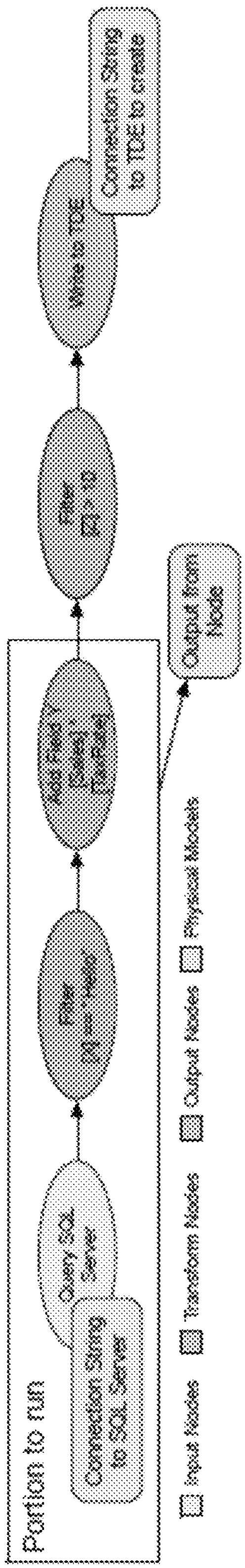
FIG. 8N illustrates that running a partial flow materializes a physical model with the results, in accordance with some implementations.
Figure 8O:
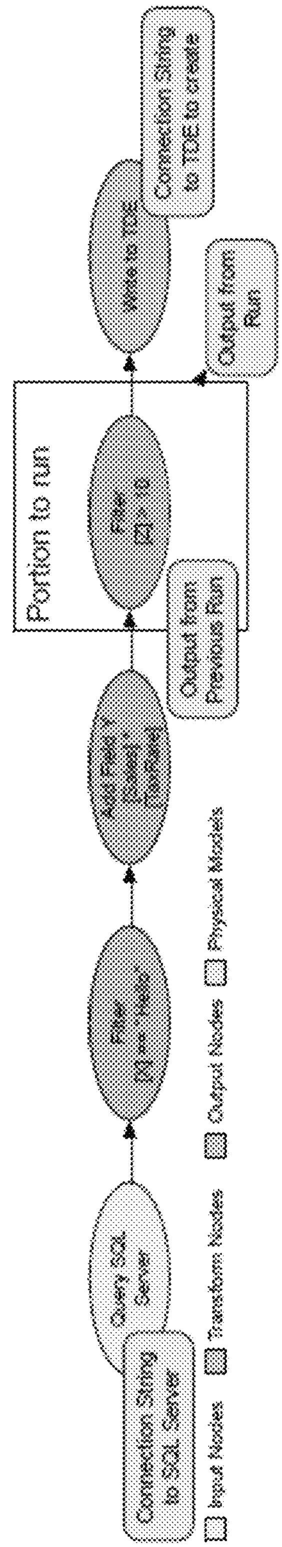
FIG. 8O illustrates running part of a flow based on previous results, in accordance with some implementations.

FIG. 8M illustrates that running an entire flow starts with implied physical models at input and output nodes. FIG. 8N illustrates that running a partial flow materializes a physical model with the results. FIG. 8O illustrates running part of a flow based on previous results.

Although physical models can be reordered to optimize processing, the logical models hide these details from the user because they are generally not relevant. The flow evaluator makes it look like the nodes are evaluated in the order they are shown in the flow. If a node is pinned, it will actually cause the flow to materialize there, guaranteeing that the piece on the left evaluates before the one on the right. In a forked flow, the common pre-flow is run only once. The process is idempotent, meaning that input operators can be called again due to a failure and not fail. Note that there is no requirement that the data that comes back is exactly the same as it would have been the first time (i.e., when the data in the upstream data source has changed between the first and second attempts).

Execution of transform operators has no side-effects. On the other hand, extract operators typically do have side-effects. Any operation that modifies the data sources before it in the flow are not seen until the next run of the flow. Load operators generally do not have side effects, but there are exceptions. In fact, some load operators require side-effects. For example, pulling files down from a share and unzipping them are considered side effects.

Some implementations are case sensitive with respect to column names, but some implementations are not. Some implementations provide a user configurable parameter to specify whether column names are case sensitive.

In general, views of cached objects always go "forward" in time.

Figure 8P:
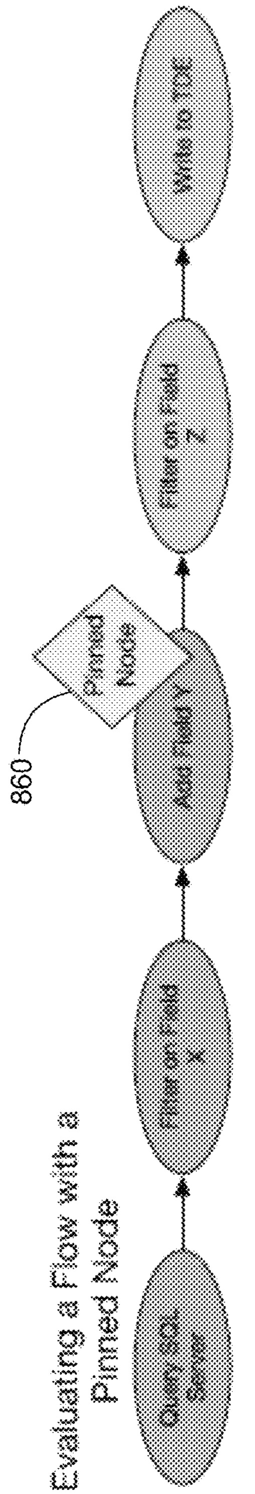
FIGS. 8P and 8Q illustrate evaluating a flow with a pinned node 860, in accordance with some implementations.
Figure 8Q:
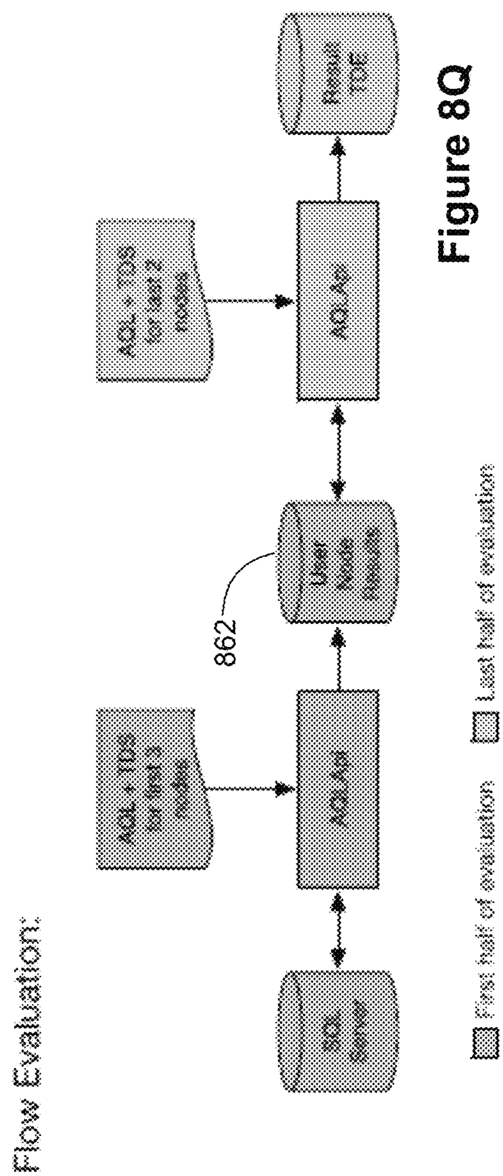

FIGS. 8P and 8Q illustrate evaluating a flow with a pinned node 860. During flow evaluation, the nodes before the pin are executed first to create user node results 862, and the user node results 862 are used in the latter portion of the flow. Note that pinning does not prevent rearranging execution within each of the portions. A pinned node is effectively a logical checkpoint.

In addition to nodes that are pinned by a user, some nodes are inherently pinned based on the operations they perform. For example, if a node makes a call out to custom code (e.g., a Java process), logical operations cannot be moved across the node. The custom code is a "black box," so its inputs and outputs must be well-defined.

In some instances, moving the operations around can improve performance, but create a side-effect of reducing consistency. In some cases, a user can use pinning as a way to guarantee consistency, but at the price of performance.

As noted above, a user can edit data values directly in the data grid 315. In some instances, the system infers a general rule based on the user's edit. For example, a user may add the string "19" to the data value "75" to create "1975." Based on the data and the user edit, the system may infer a rule that the user wants to fill out the character string to form 4 character years for the two character years that are missing the century. In some instances, the inference is based solely on the change itself (e.g., prepend "19"), but in other instances, the system also bases the inference on the data in column (e.g., that the column has values in the range "74"-"99"). In some implementations, the user is prompted to confirm the rule before applying the rule to other data values in the column. In some implementations, the user can also choose to apply the same rule to other columns.

User edits to a data value can include adding to a current data value as just described, removing a portion of a character string, replacing a certain substring with another substring, or any combination of these. For example, telephone numbers may be specified in a variety of formats, such as (XXX)YYY-ZZZZ. A user may edit one specific data value to remove the parentheses and the dash and add dots to create XXX.YYY.ZZZZ. The system can infer the rule based on a single instance of editing a data value and apply the rule to the entire column.

As another example, numeric fields can have rules inferred as well. For example, if a user replaces a negative value with zero, the system may infer that all negative values should be zeroed out.

In some implementations, a rule is inferred when two or more data values are edited in a single column of the data grid 315 according to a shared rule.

FIG. 9 illustrates how a logical flow 323 can be executed in different ways depending on whether the operations are designated as imperative or declarative. In this flow, there are two input datasets, dataset A 902 and dataset B 904. In this flow, these datasets are retrieved directly from data sources. According to the flow, the two datasets 902 and 904 are combined using a join operation 906 to produce an intermediate dataset. After the join operation, the flow 323 applies a filter 908, which creates another intermediate dataset, with fewer rows than the first intermediate dataset created by the join operation 906.

If all of the nodes in this flow are designated as imperative, executing the flow does exactly what the nodes specify: the datasets 902 and 904 are retrieved from their data sources, these datasets are combined locally, and then the number of rows is reduced by the filter.

If the nodes in this flow are designated to have declarative execution (which is generally the default), the execution optimizer can reorganize the physical flow. In a first scenario, suppose that the datasets 902 and 904 come from distinct data sources and that the filter 908 applies only to fields in dataset A 902. In this case, the filter can be pushed back to the query that retrieved dataset A 902, thus reducing the amount of data retrieved and processed. This can be particularly useful when dataset A 902 is retrieved from a remote server and/or the filter eliminates a substantial number of rows.

In a second scenario, again assume declarative execution, but suppose both dataset A 902 and dataset B 902 are retrieved from the same data source (e.g., each of these datasets corresponds to a table in the same database on the same database server). In this case, the flow optimizer may push the entire execution back to the remote server, building a single SQL query that joins the two tables and includes a WHERE clause that applies the filter operation specified by the filter node 908. This execution flexibility can greatly reduce the overall execution time.

A user builds and changes a data flow over time, so some implementations provide incremental flow execution. Intermediate results for each node are saved, and recomputed only when necessary.

To determine whether a node needs to be recomputed, some implementations use a flow hash and a vector clock. Each node in the flow 323 has its own flow hash and vector clock.

A flow hash for a given node is a hash value that identifies all of the operations in the flow up to and including the given node. If any aspect of the flow definition has changed (e.g., adding nodes, removing nodes, or changing the operations at any of the nodes), the hash will be different. Note that the flow hash just tracks the flow definition, and does not look at the underlying data.

A vector clock tracks versioning of the data used by a node. It is a vector because a given node may use data from multiple sources. The data sources include any data source accessed by any node up to and including the given node. The vector includes a monotonically increasing version value for each of the data sources. In some cases, the monotonically increasing value is a timestamp from the data source. Note that the value corresponds to the data source, not when the data was processed by any nodes in the flow. In some cases, a data source can provide the monotonically increasing version value (e.g., the data source has edit timestamps). If the data source cannot provide a version number like this, the data prep application 250 computes a surrogate value (e.g., when was the query sent to or retrieved from the data source). In general, it is preferable to have a version value that indicates when the data last changed instead of a value that indicates when the data prep application last queried the data.

By using the flow hash and the vector clock, the data prep application 250 limits the number of nodes that need to be recomputed.

Figure 10A:
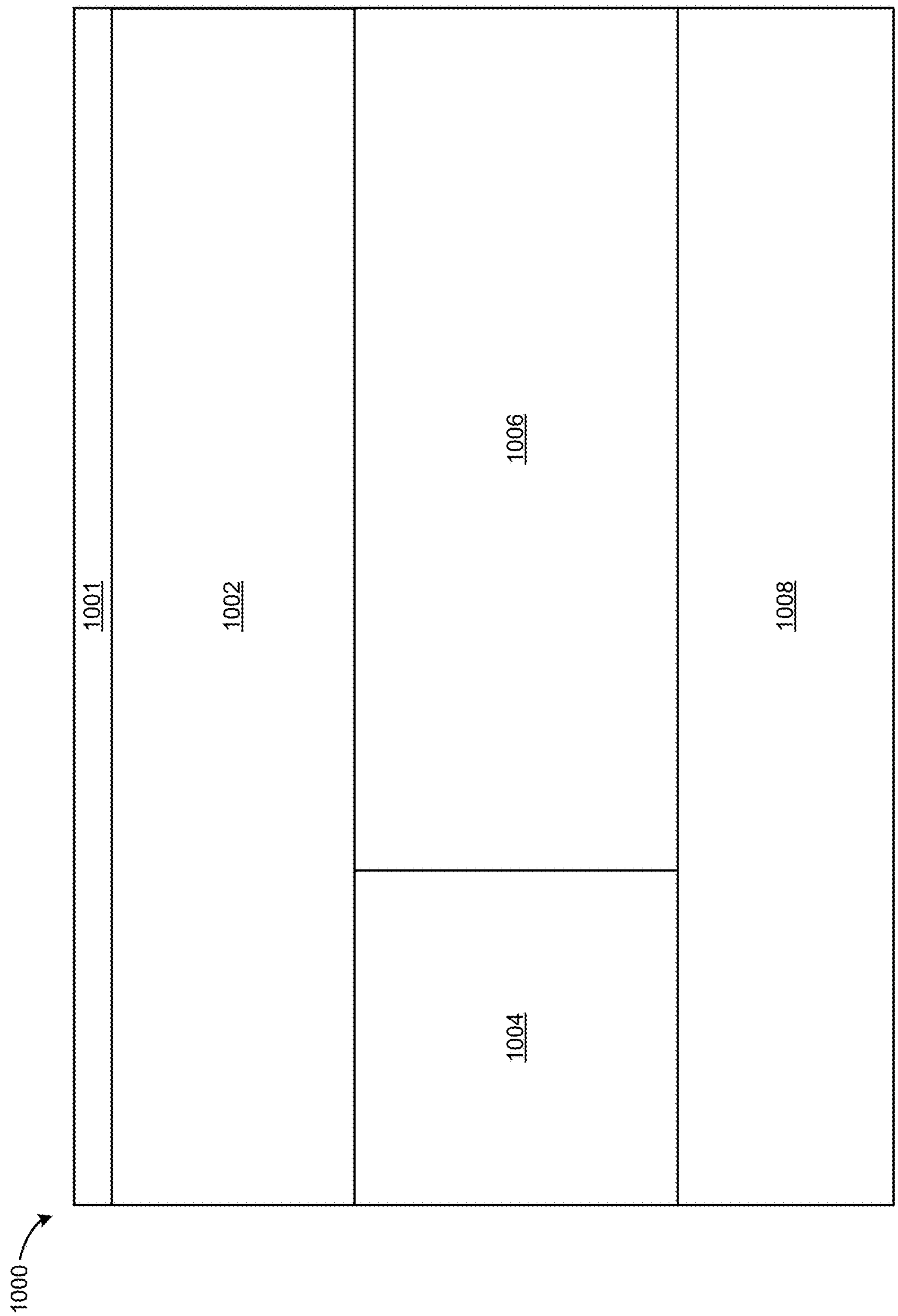
FIGS. 10A and 10B illustrate error resolution user interfaces for a data preparation application in accordance with some implementations.
Figure 10B:
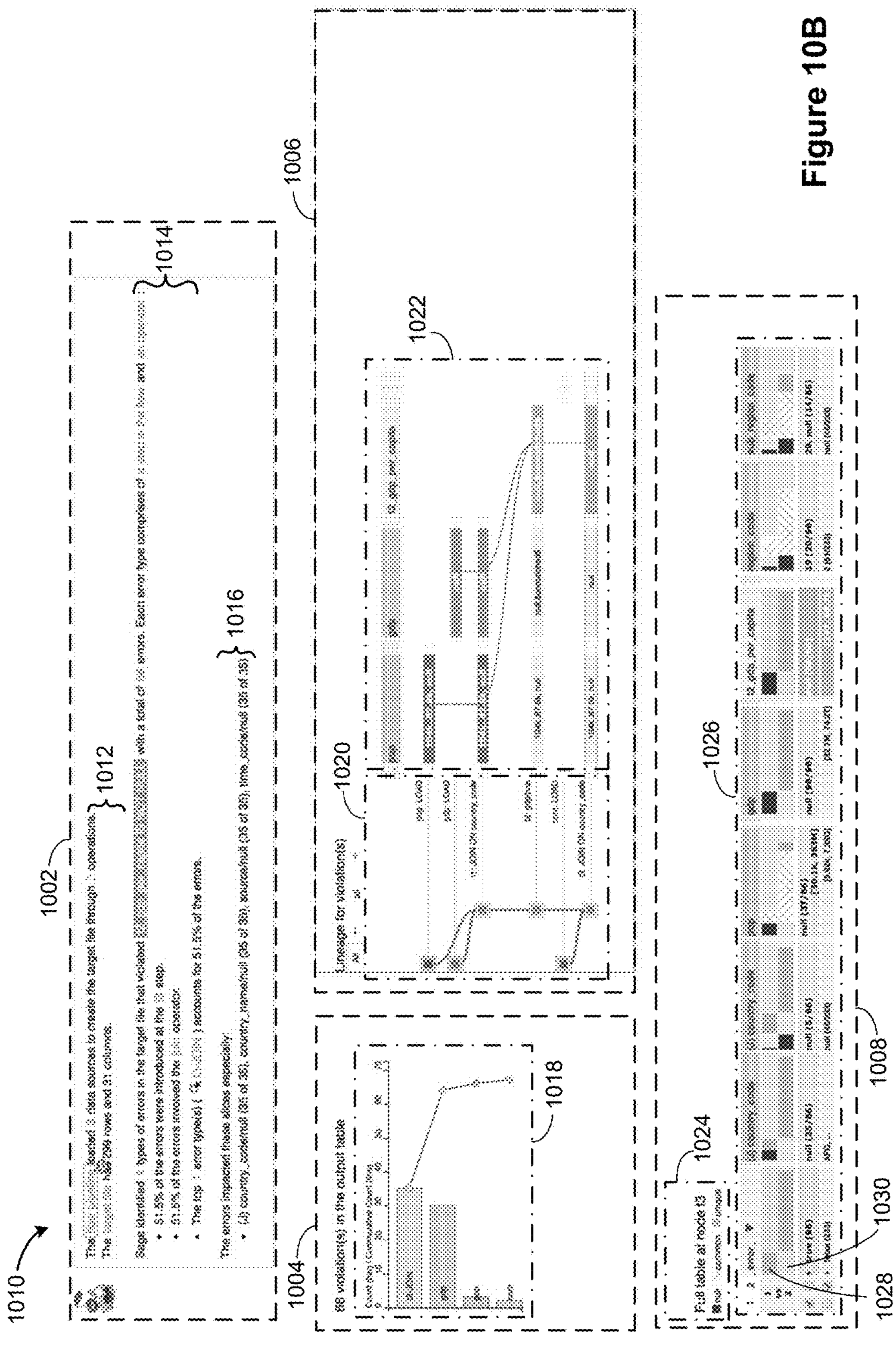

FIGS. 10A and 10B illustrate a user interface 1000 (also referred to herein as an error resolution user interface) for preparing data in accordance with some implementations. In these implementations, there are at least five regions (or panes), which have distinct functionality. FIG. 10A shows this conceptually as a menu bar region 1001, a natural language summary region 1002, an error profile region 1004, a data flow trace region 1006, and a data region 1008. It should be noted that a position of each region is not fixed, so the regions may be organized as needed. Moreover, some of the regions are connected (i.e., linked) such that an action in one region results in an action being performed in another region (or multiple regions).

The user interface 1000 provides a user with multiple streamlined, coordinated views that help the user to see and understand errors from a data flow, if any. This novel user interface presents users with multiple views of their data to help them take corrective actions and also discover the origin of errors in their data. The natural language summary region 1002 provides a synopsis of the errors discovered in the data, and the synopsis is presented in a readable, intuitive manner. The error profile region 1004 graphically depicts the discovered errors so that a user can quickly understand the number of errors in the data, and the types of the errors. Sometime the error type indicates the origin of the errors. In some implementations, the error profile region 1004 graphically depicts the discovered errors using a Pareto chart. However, the error profile region 1004 can use other chart types to graphically depict the discovered errors. The data flow trace region 1006 provides a lineage of the discovered errors. The lineage displays at least a portion of the nodes from a flow diagram (e.g., the flow 323 in FIG. 3B). The data region 1008 displays specific columns from the data. The actual columns displayed are related to the discovered errors. The user can use the data region 1008 to understand the error(s) within the data, and remedy those errors. Each of these regions will be discussed in further detail with reference to FIG. 10B.

In some implementations, the menu bar region 1001 has a File menu with options to analyze a new data set, save a previously analyzed data set, and load previously analyzed data sets. In some implementations, the menu bar region 1001 has a Rule menu with options to add new validation rules to a data set.

In some implementations, a user opens a new error resolution user interface 1000 by selecting "File→New interface" option in the Menu Bar. Users can also open a new error resolution user interface by interacting with a flow in the user interface 250 (FIGS. 3A and 3B). For example, in some implementations, a user right clicks on a node (or a plurality of nodes) in the flow 323, and a menu appears with a "New interface" option. In some implementations, when a plurality of nodes are selected, user selection of the "New interface" option causes multiple new interfaces to be opened. In some implementations, when a plurality of nodes are selected, a single new interface is opened for data associated with the plurality of nodes.

In some instances, a data source is a relational database. In some instances, one or more data sources are file-based, such as CSV files or spreadsheet files. In some implementations, a user adds a file-based source to the flow using a file connection affordance in the left-hand pane 302 (FIG. 3A), as discussed above.

FIG. 10B illustrates an error resolution (insight) user interface 1010 for data preparation. The illustrated error resolution user interface 1010 includes the user interface elements mentioned above with reference to the user interface 1000 (excluding the Menu bar 1001).

The natural language summary region 1002 includes a natural language synopsis (also referred to herein as simply a synopsis). The synopsis guides a user of a data preparation application 250 (FIG. 2) through error exploration. The data preparation application evaluates and determines that an intermediate data set in a flow includes one or more errors (e.g., determines that one or more data values is NULL, or the data values are statistical outliers), and then presents a summary of the one or more errors using the natural language synopsis. The actual components (e.g., portions and sub-portions) of the natural language synopsis may change depending on the circumstances, and the synopsis described below is simply one example synopsis.

For example, the data preparation application may present a first synopsis for a first intermediate data set and may present a second synopsis for a second intermediate data set, where the second synopsis includes one or more components not included in the first synopsis. The second synopsis may include multiple validation rule violations, which require additional explanation, whereas the first synopsis may include a single validation rule violation, as shown in FIG. 10B. Accordingly, the data preparation application is able to dynamically modify the display in the natural language summary region 1002 to suit the circumstances. In this way, a user of the data preparation application is provided with a comprehensive summary of the issues, if any, associated with the intermediate data set. The intermediate data set is also referred to as a "target file." The term "intermediate" refers to the transient nature of a data set while processing a flow (e.g., a data set that has been retrieved from a database and stored in memory of the computer or a data set generated as a result of an operation at a respective node in the flow). Each node in the flow has an associated data set, and the word "intermediate" is used to indicate that the associated data set is part of the flow.

The natural language summary region 1002 in FIG. 10B includes three distinct portions, with each portion including at least one sub-portion. Depending on the circumstances, each portion may include zero sub-portions or multiple sub-portions. A first portion 1012 provides a natural language synopsis of a flow pipeline (such as the flow 323 in FIG. 3B). As discussed above, a flow specification describes how to manipulate input data from one or more data sources to create a target data set (i.e., the target file). For example, the natural language synopsis reads "the 'flow pipeline' loaded '3' data sources to create the target file through '3' operations." The first portion 1012 also indicates that "the 'target file' has 299 rows and 31 columns." In doing so, the first portion 1012 displays the building blocks of the target file, as well as characteristics of the target file (e.g., number of rows and columns). A user of the data preparation application is able to determine if the target file is missing a fundament component (e.g., the user forgot to add a particular data source to the flow) and also determine if the resulting target file has an obvious error (e.g., the number of rows after a join operation is too high or too low). It should be noted that the identified elements (e.g., 'flow pipeline,' '3', etc.) are selectable affordances, which are described in further detail with reference to FIGS. 11A-11I below.

A second portion 1014 provides a natural language synopsis of errors, if any, detected in the target file. An error is detected when one or more rows in the target file (individually or collectively) violates a validation rule established for the target file. In some instances, a validation rule applies to individual data cells (e.g., determining whether the data value is NULL, whether the data value is a correctly spelled name, or whether the data value is within a specific range). In some instances, a validation rule applies to two or more data fields within each row of data (e.g., determine whether the data value for a birth date is earlier than a data value for a hire date, or determine whether the combination of a data value for city is consistent with a data value for state). In some implementations, a validation rule applies to an aggregation of rows (e.g., computing a SUM or COUNT for an entire column and comparing the aggregate calculation to a specific value). In some implementations, an individual validation rule can apply to two or more intermediate data sets. In general, a validation rule for a node in a flow can refer to other intermediate data sets that must be calculated earlier in the flow. An example validation rule requires that the number of rows for the current node is strictly less than the number of rows in an earlier intermediate data set. Many of the validation rules apply to individual data values, so the examples herein typically refer to evaluating data cells. However, to check some of the more complex validation rules just described, more than a single data value must be used.

In some implementations, the validation rule 325 (or one or more validation rules) is defined by a user (e.g., a user selects a node from the flow 323 and defines a validation rule for a data set associated with the node). In some implementations, the validation rule (or one or more validation rules) is defined by the data preparation application 250. For example, the validation rule may be fundamental to data preparation, and therefore, the validation rule is built into the data preparation application 250. In some implementations, the menu bar 1001 provides access to a "validation rule repository," which allows a user to browse previously created validation rules, or validation rules that are built into the data preparation application 250. It should be noted that the built-in validation rules may be turned on and off by the user.

An example validation rule applied to a node (i.e., to the target file) may require that there are no null values. In some instances, NULL values indicate missing or empty data (e.g., as shown in FIG. 11Q, the gdp column is missing 29 values (dotted-box), which are null values). In some instances, a null is created by mathematical operation (e.g., dividing by zero) or by having unmatched values resulting from a join operation. In some instances, a null is created when a data value has the wrong data type (e.g., when a string is used as a numeric measure). As shown in the second portion 1014 of the natural language summary region 1002, the validation rule requires that "t2_gdp_per_capita IS NOT NULL." As shown in FIG. 11Q, the gdp column is missing 29 values (dotted-box), which results in the t2_gdp_per_capita column (next column to the right) having 29 null values as well. As such, these 29 null values violate the validation rule.

Other validation rules can be applied to the target file (or other nodes in the flow). For example, one or more validation rules may concern consistency, such as misalignment of units of measurement (e.g., inches versus centimeters), misspellings (e.g., California v. Califoria), ordering and representation of the target file (e.g., columns and/or rows in an improper order), format (e.g., 89 versus 1989), duplicates, and special characters (e.g., a validation rule may be violated when an entry includes the symbol "$" or some other special character). In another example, one or more validation rules may identify erroneous entries in the data set, extraneous data, numeric outliers, and time-series outliers.

In some implementations, one or more functions are used to identify the one or more errors (i.e., identify one or more data cells that violate respective validation rules). In some implementations, the one or more functions include a characterization function. For example, the characterization function reads each cell for blank data, and if a blank data cell if found, the data cell is deemed to be a null. In some implementations, the one or more functions include comparing a respective tuple of data to a template tuple of data. For example, the template tuple of data may include several components, such as (State, numeric value above 50,000) and the respective tuple of data for the given cell may include (California, 200,000). Based on this, the comparison operation may reference a list of state names, and then determine that the respective tuple of data includes a misspelling, and this misspelling violates a validation rule. In this case, a cell associated with the misspelling is deemed to include an error.

In some implementations, the one or more functions include a statistical operation performed on a respective tuple of data. In some implementations, the statistical operation is used to classify a data cell as an outlier. The statistical operation may involve comparing values in the respective tuple of data against one or more statistics for the data set (e.g., against statistics for specific columns in the data set). The one or more statistics may be a mean average associated with a data set (e.g., the mean salary of public employees in California), a mode associated with the data set (e.g., the mode salary of public employees in California), or a median associated with the data set (e.g., the medium salary of public employees in California). Further, using the one or more statistics, the statistical operation may determine that the respective tuple of data includes a value that is a threshold number of standard deviations from the mean (e.g., three standard deviations from the mean, or some lesser or greater number of standard deviations). As another example, using the one or more statistics, the statistical operation may determine that the respective tuple of data includes a value in a certain percentile that violates the validation rule.

As shown in the second portion 1014, the data preparation application (dubbed "Sage") identified 4 types of errors in the target file (e.g., identified data cells in the target file whose lineage can be traced to four different nodes in the flow), and the data preparation application identified a total of 66 errors in the target file. Moreover, the synopsis in the second portion 1014 indicates that multiple steps in the flow contributed to the errors. In other words, the data prep application indicates that the errors are not all localized to a single operator or node in the data flow, but instead, the errors are spread throughout the flow 323.

The second portion 1014 of the synopsis further includes a statistical break down of the errors detected in the target file. For example, based on the total number of errors identified and the origin of each error, the data preparation application provides an intuitive natural language synopsis that a specific node of the flow 323 is most responsible for the errors. In the example shown, the second portion 1014 indicates that 51.5% of the errors were introduced at the t3 step. In light of this, the second portion 1014 of the synopsis further states that "the top 1 error type(s) (t3-JOIN) accounts for 51.5% of the errors." It should be noted that the second portion 1014 of the synopsis, depending on the circumstances, may identify multiple nodes of the flow 323 when a single step is not responsible for 50% of the errors (e.g., the second portion 1014 of the synopsis may include additional information (e.g., additional lines) depending on the circumstances)

A third portion 1016 of the synopsis summarizes the errors' impact on specific portions of the target file (e.g., specific slices of the target file). As used herein, a "slice" or a "data slice" is a subset of cells from the same column or from various rows and columns of the target file. In this example, the slices are the intermediate result columns from the country table that didn't join in node t3. The third portion 1016 lists the slices most impacted by the previously listed errors (e.g., the column country_code). Moreover, the country name is also null and included in the third portion 1016 because there is a slice of country name that does not match any country_code. The third portion 1016 also includes a limited number of other slices most impacted by these errors. A user may reference the third portion 1016 of the synopsis to identify portions of the target file to repair or avoid in his or her analysis.

The error resolution user interface 1010 includes an error profile region 1004. The error profile region 1004 graphically depicts the errors identified in the target file. The error profile region 1004 includes a graph 1018, which depicts the identified errors. As noted above, the natural language summary region 1002 identified 4 types of errors in the target file, and each segment (e.g., bar) in the graph 1018 corresponds to one of the 4 error types. In some implementations, the graph 1018 is a Pareto chart (as shown in FIG. 10B). However, other chart types can be used to graphically depict the identified errors. In some implementations, each segment (e.g., bar in the Pareto chart) displayed in the graph 1018 corresponds to either: (i) a data source, or (ii) an operation. For example, the largest segment in the graph 1018 corresponds to the t3-JOIN operation, the second largest segment corresponds to the gross domestic product (gdp) data source, and so on. Moreover, each segment is selectable and linked to corresponding portions in the natural language summary region 1002, the data flow trace region 1006, and the data region 1008. The linkage between the various regions is discussed in further detail below.

As shown, the graph 1018 has two dimensions: the location of the first encountered error (error type) and error count. In some implementations, the graph 1018 is extended to three or more dimensions by adding metrics such as an error lineage graph similarity (e.g., a value between 0 and 1 that measures similarity between the error graphs) for the four error types. Moreover, in some implementations, another dimension lists all instances of error types and the error count. For example, some source rows may have null cells for gdp and also have null cells for their join column.

In some implementations, the dimensions of the chart 1018 are explored in a single multiple dimensional chart. In some implementations, dimensions of the chart 1018 are explored as a series of linked two dimensional charts.

The error resolution user interface 1010 includes a data flow trace region 1006. The data flow trace region 1006 provides a lineage of the one or more errors according to the flow. The data flow trace region 1006 includes a flow region 1020, which includes: (i) a visual representation of at least a subset of nodes (e.g., data sources) included in the flow, and (ii) a visual representation for each respective operation associated with the nodes included in the flow. The flow region 1020 can also be manipulated, which allows the user to add and remove nodes from the flow region 1020. For example, the user can collapse a node for a respective operation and in turn expand the node.

In those circumstances where the flow region 1020 includes a visual representation of a subset of nodes included in the flow (as opposed to each node included in the flow), the subset of nodes is selected by the data preparation application based on the one or more errors detected in the target file. For example, the subset of nodes displayed in the flow region 1020 is the nodes having a highest concentration of errors, and/or a highest degree of association with the one or more errors relative to other nodes in the flow. In this way, the data preparation application limits the number of nodes displayed in the flow region 1020. As a result, a user of the data preparation application is not overwhelmed by a crowded array of nodes.

The data flow trace region 1006 also includes an expanded flow 1022, which includes data values for the displayed nodes. The data values displayed in the expanded flow 1022 are rows and columns from the target file that correspond to the identified errors. Using the expanded flow 1022, the user can trace and thereby locate a root cause of each error identified in the target file. In the example shown, the expanded flow 1022 illustrates that the gdp data source includes null values, which violates the validation rule shown in the natural language summary region 1002, specifying that "t2_gdp_per_capita IS NOT NULL". Seeing this, the user may retrieve the gdp data source, and determine if the null values require repair. In some instances, a null value does not require repair, depending on the circumstances (e.g., the country simply did not report its gdp to the data gatherer).

It should be noted that the data flow trace region 1006 depends on the error(s) and operations of the target file. More specifically, the top row of the expanded flow 1022, by default, lists a subset of the columns of the nodes in the flow region 1020 (although other columns of nodes in the data flow trace region 1006 can also be included). For example, the t1 join operation involves the gdp data source and the pop data source. Therefore, columns of these two data sources are listed in the top row of the expanded flow 1022.

The expanded flow 1022 and the flow region 1020 shown in FIG. 10B provide a summary of all the identified errors. However, if a user wants to view data for individual errors, the user can toggle (e.g., using the left and right arrows) between errors. For example, the data flow trace region 1006 includes an affordance to cycle through the identified errors (e.g., the arrow 1146 shown FIG. 11K). For each individual error, the expanded flow 1022 and the flow region 1020 are updated to show the relevant information for each individual error. Toggling between individual errors is further described below with reference to FIG. 11K.

The error resolution user interface 1010 includes a data region 1008. The data region displays data for a subset of columns 1026 from the target file. The data region 1008 includes a legend 1024 for the subset of columns 1026. The legend 1024 indicates that "null" values are solid black, "common" values are cross-hatched, and "unique" values are solid grey. The legend 1024 changes according to the validation rule. In some implementations, the subset of columns 1026 is selected accordingly to a degree of association with the one or more errors identified in the target file. In some implementations, the degree of association is determined using a Wilcoxon rank-sum test. Alternatively, in some implementations, the degree of association is determined using some other metric of association/correlation, as known by those skilled in the art.

In some implementations, the subset of columns 1026 includes an error population region 1028 for an error population of the target file and a non-error population region 1030 for a non-error population of the target file. These two populations provide an overview of the errors identified in the target file. In some implementations (as shown), the error population region 1028 and the non-error population region 1030 are displayed in Mondrian diagrams. Alternatively, in some implementations, the error population region 1028 and the non-error population region 1030 are displayed in a fishbone diagram, or some other diagram or graph. The data region 1008 is discussed in further detail below with reference to FIGS. 11A-11R.

In some implementations, the natural language summary region 1002 is linked to the error profile region 1004, the data flow trace region 1006, and the data region 1008. In addition, manipulating one of the regions results in one or more other regions updating in accordance with the manipulation. For example, toggling between individual errors in the data flow trace region 1006 causes the data region 1008 to update. In another example, selecting one of the columns in the chart 1018 causes the data flow trace region 1006 and the data region 1008 to update. Linking between regions is described in detail below with reference to FIGS. 11A-11R.

Figure 11A:
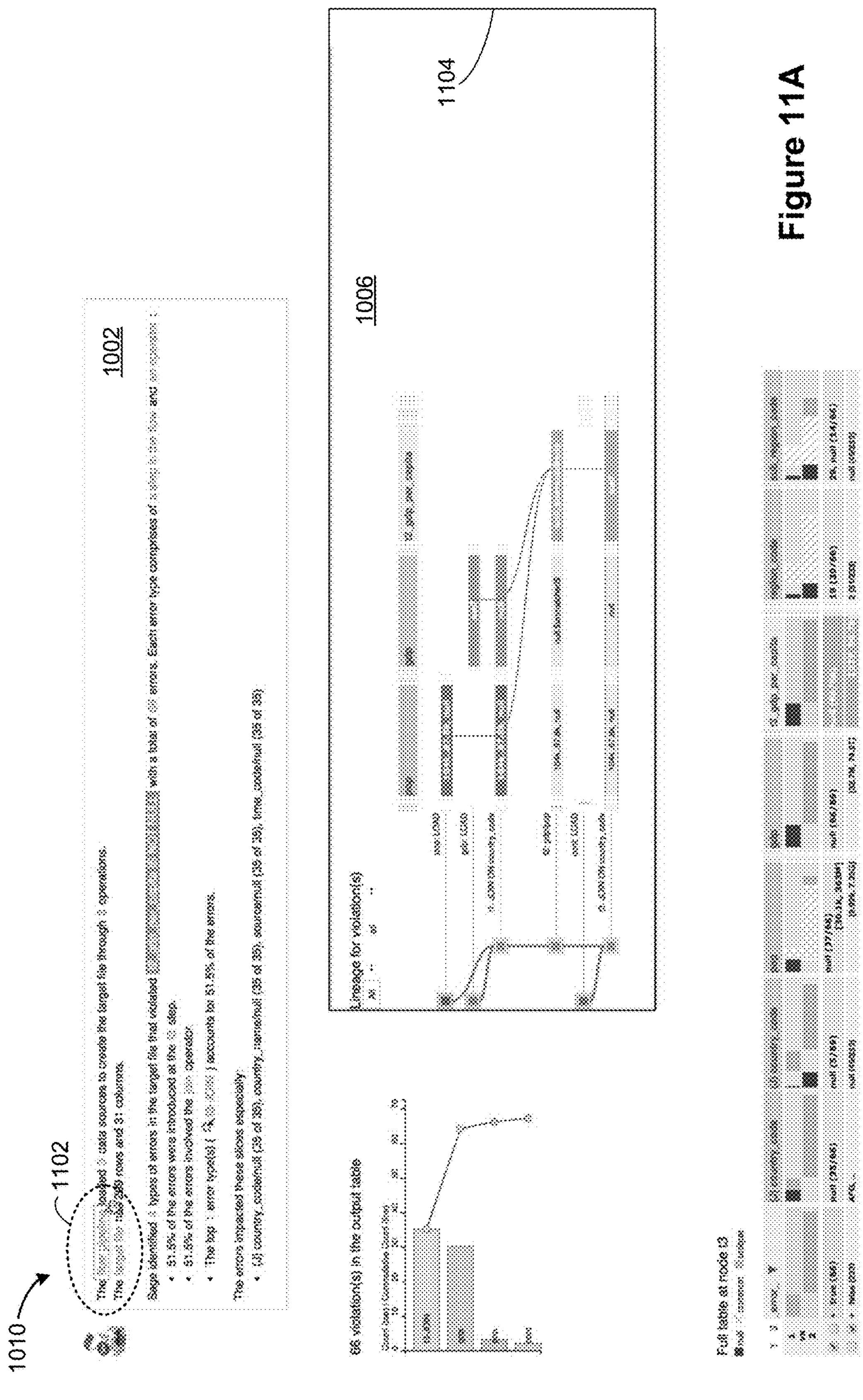
FIGS. 11A-11R illustrate user interactions with the error resolution user interface in accordance with some implementations.

Turning to FIG. 11A, a user positions a cursor (e.g., positions a mouse cursor or touches a touch-sensitive display of the computer 200 with his or her finger) over a "flow pipeline" affordance 1102 in the natural language summary region 1002. In some implementations, the user selects (e.g., left clicks on) the flow pipeline affordance 1102 while in some implementations the user hovers the cursor above the flow pipeline affordance 1102 to activate the flow pipeline affordance 1102. In response to the selecting (or hovering), the data flow trace region 1006 is highlighted (e.g., a border 1104 is displayed around the data flow trace region 1006). In doing so, the user's attention is drawn to the data flow trace region 1006, and in particular, to the flow diagram shown in the data flow trace region 1006 (e.g., the expanded flow 1022 and the flow region 1020). For ease of discussion, the description below refers to the user selecting the various affordances; however, at least in some implementations, hovering the cursor can activate the various affordances. Also, in some implementations, hovering the cursor above a respective affordance, or other portion of the error resolution user interface 1010 causes a different action to be performed (discussed in further detail below).

Figure 11B:
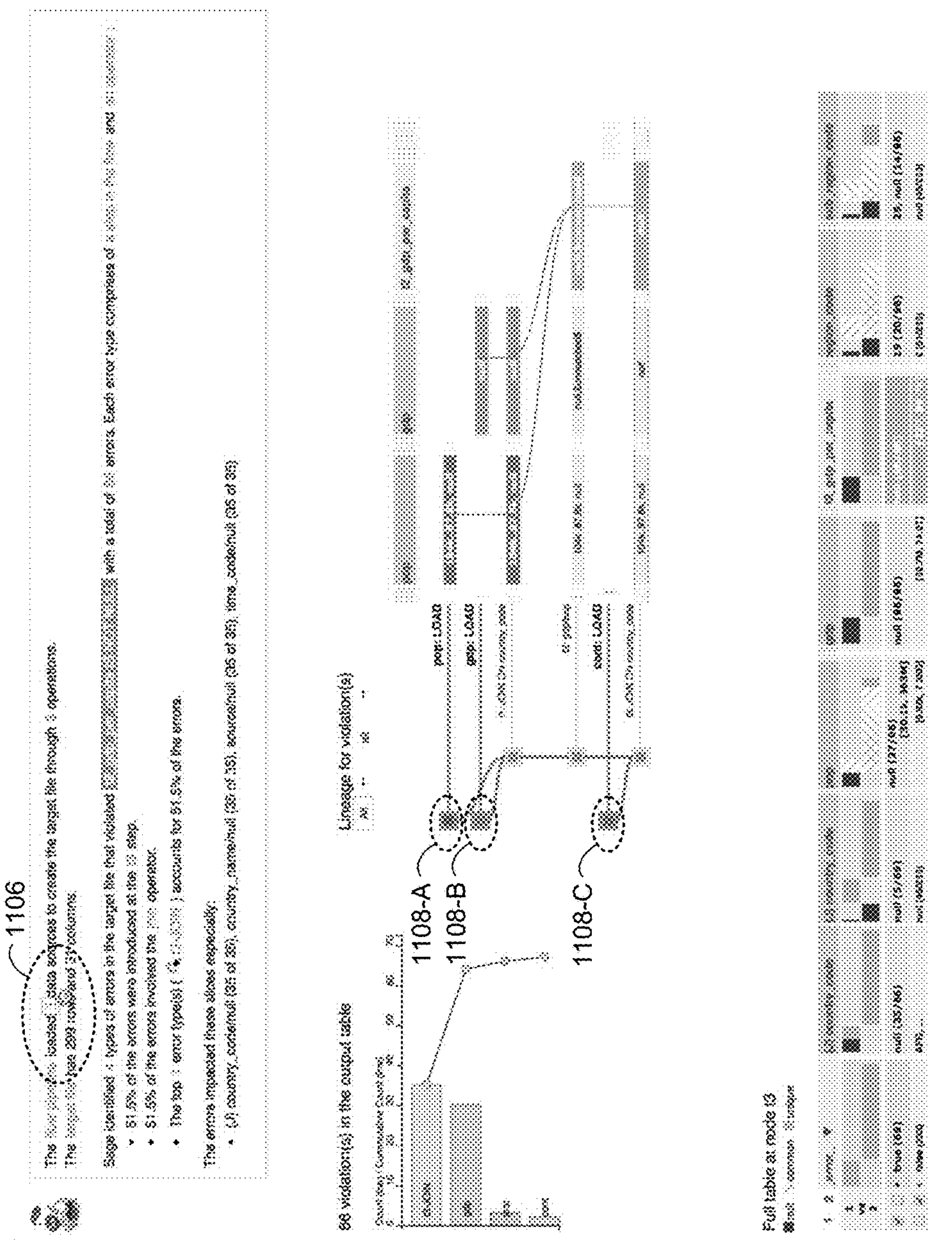

Turning to FIG. 11B, the user selects a "3" affordance 1106, and in response the three data sources 1108-A, 1108-B, and 1108-C displayed in the data flow trace region 1006 are emphasized (e.g., bolded), thereby notifying the user that each data source in the flow is shown in the flow region 1020. This feature is particularly useful for users who are new to data preparation programs. For example, by linking the natural language summary region 1002 with the data flow trace region 1006, a new user can use the natural language synopsis to quickly interpret other regions of the error resolution user interface 1010. Without such a feature, a new user may struggle to locate the three data sources 1108-A-1108-C in the error resolution user interface 1010.

In those circumstances where the data flow trace region 1006 displays a subset of nodes included in the flow (i.e., less than all the nodes in the flow are displayed), the affordance 1106 may instead read "X/Y" data sources to indicate that less than all of the nodes in the flow are shown in the data flow trace region 1006. Alternatively, in some implementations, the natural language summary region 1002 may include an additional line in the synopsis (e.g., a sub-portion in the first portion 1012) describing that less than all of the nodes in the flow are shown in the data flow trace region 1006.

Figure 11C:
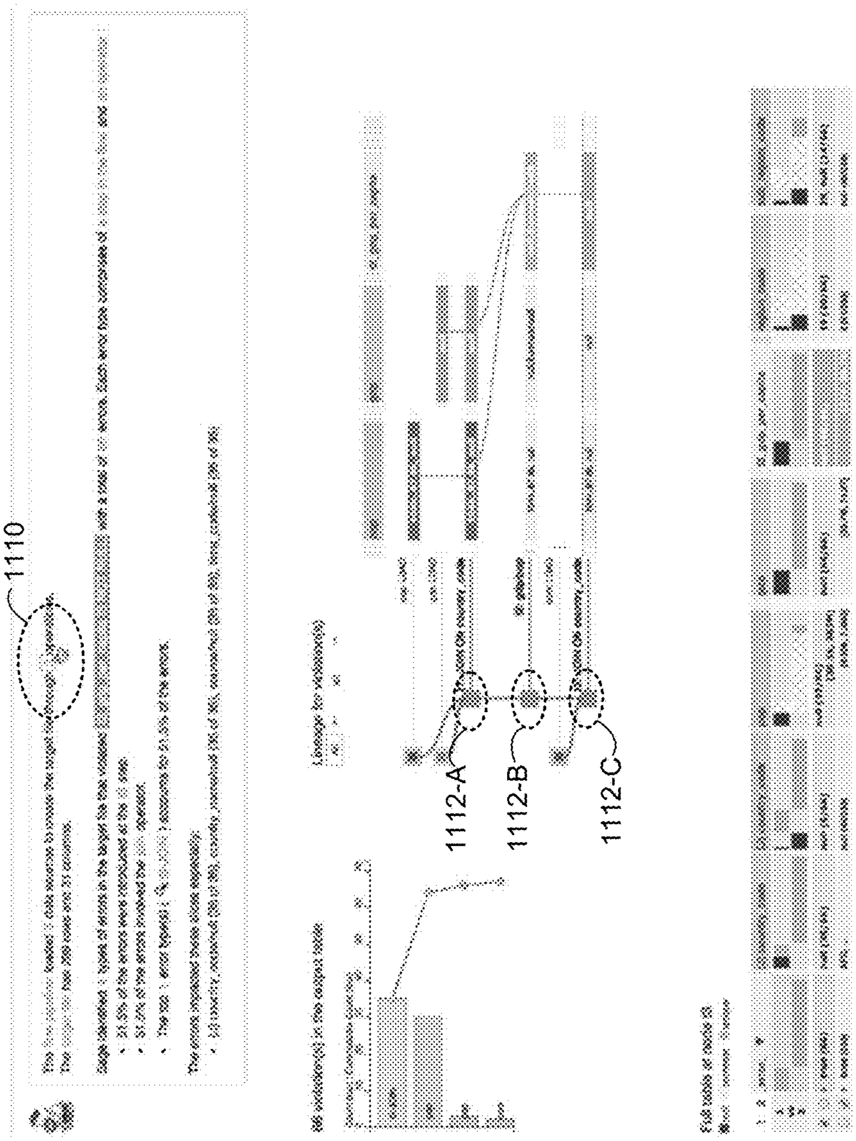

Turning to FIG. 11C, the user selects a "3" affordance 1110. In response, the three operations 1112-A, 1112-B, and 1112-C displayed in the data flow trace region 1006 are emphasized (e.g., bolded), thereby notifying the user that each operation (also referred to herein as an operator) in the flow is shown in the flow region 1020. This feature is useful because it emphasizes how the operations and the data sources fit together. Without this feature, a user would be required to switch back and forth between user interfaces to determine a position of the operations 1112-A, 1112-B, and 1112-C within the flow (e.g., switch to the user interface shown in FIG. 3B to view the flow 323).

In those circumstances where the data flow trace region 1006 displays a subset of nodes included the flow, the affordance 1108 may instead read X/Y operations to indicate that less than all of the nodes in the flow are shown in the data flow trace region 1006. Alternatively, in some implementations, the natural language summary region 1002 may include an additional line in the synopsis (e.g., a sub-portion in the first portion 1012) describing that less than all of the nodes in the flow are shown in the data flow trace region 1006.

Figure 11D:
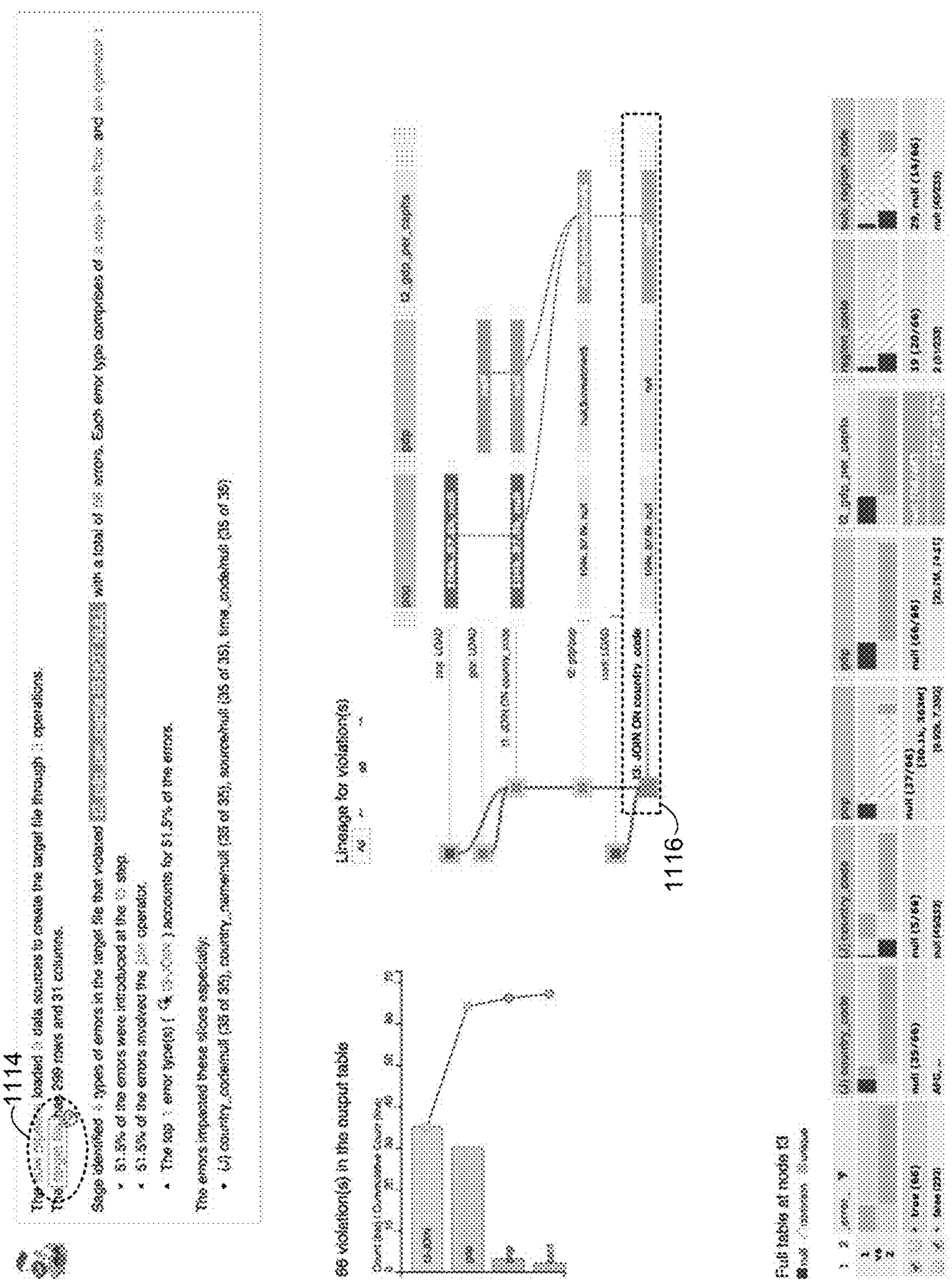

Turning to FIG. 11D, the user selects a "target file" affordance 1114, and in response a final row 1116 in the data flow trace region 1006 is emphasized (e.g., bolded), thereby notifying the user that the target file corresponds to that portion of the data flow trace region 1006. Moreover, in the expanded flow 1022 (FIG. 10B), the final row 1116 indicates an error is present in the target file (e.g., "null" is emphasized). The final row 1116 also provides an insight that the "gdp" data source is at least partially responsible for the error that is present in the target file (e.g., "null" in the gdp column).

Figure 11E:
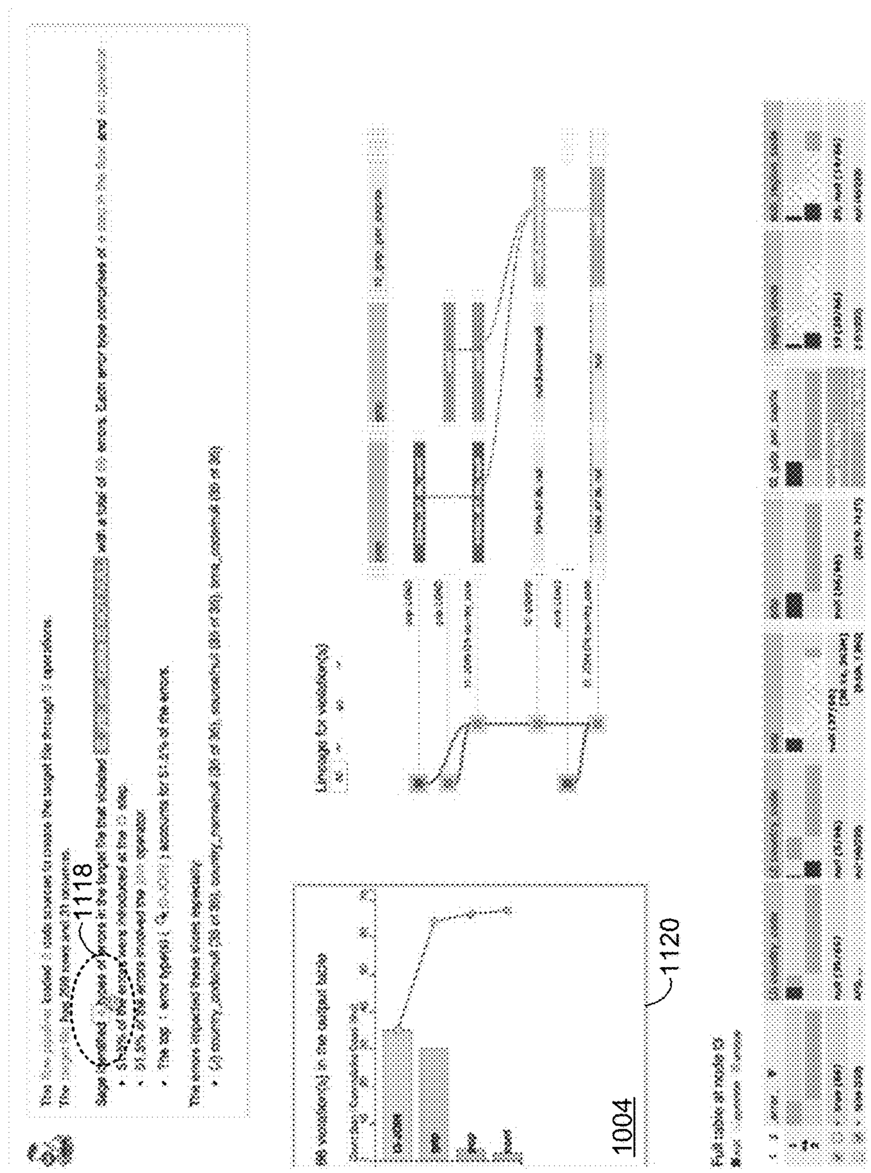

Turning to FIG. 11E, the user selects a "4" affordance 1118, and in response the error profile region 1004 is highlighted (e.g., a border 1120 appears around the error profile region 1004) and text in each column in the chart 1018 is also highlighted. In doing so, the user's attention is drawn to the error profile region 1004. In particular, the user is able to see that four types of errors are present in the target file, and certain types of errors account for a largest percentage of the total errors relative to other error types. For example, the "t3-Join" column includes 34 errors of the total 66 errors.

The validation rule used in the illustrated example is bolded within the natural language summary region 1002, and reads "t2_gdp_per_capita IS NOT NULL." Put simply, the validation rule requires that there are no NULL values in the data field gdp_per_capita in the target file (intermediate data set) at the node t2.

Figure 11F:
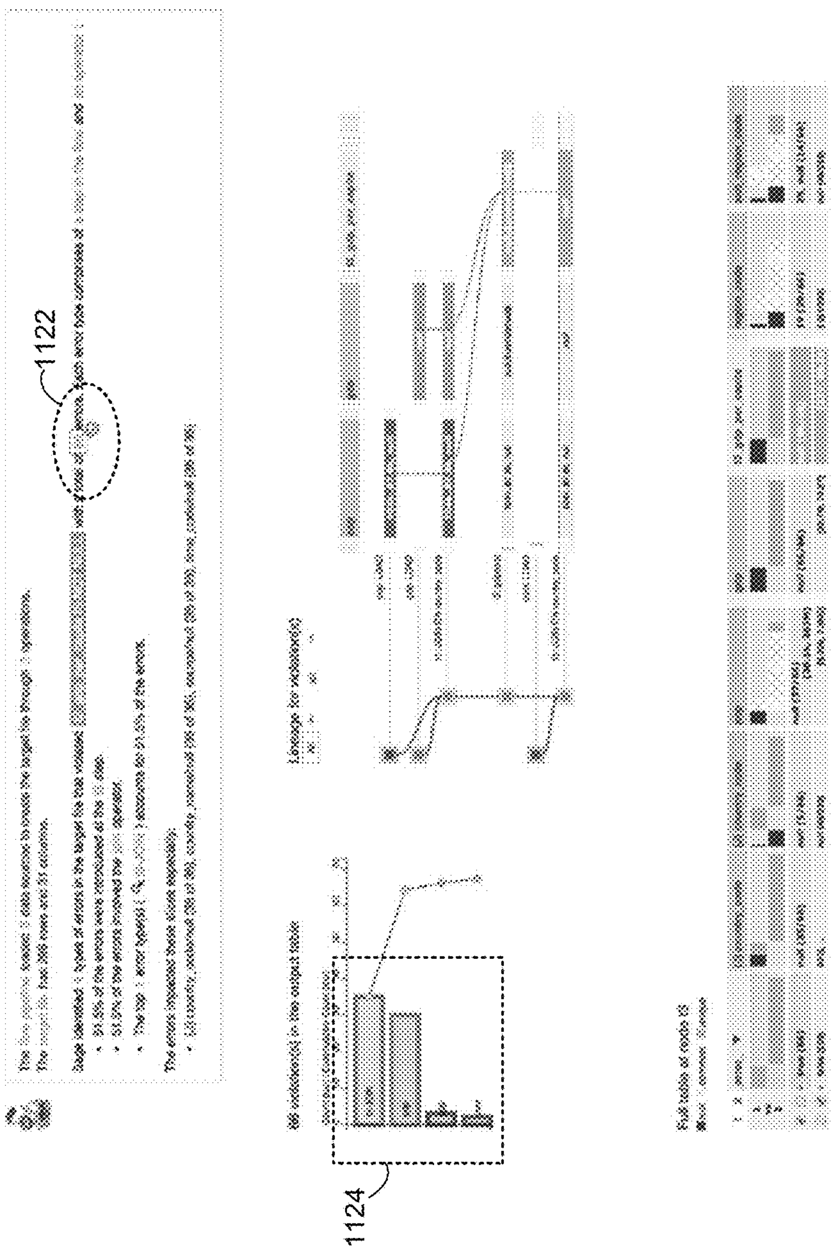

Turning to FIG. 11F, the user selects a "66" affordance 1122, and in response each column displayed in the error profile region 1004 is emphasized. In the example shown, the columns in the Pareto chart are bolded 1124. In doing so, the user is notified that the 66 identified errors in the target file are distributed in a particular manner across several operations and data sources. As noted above, the chart 1018 is not limited to a Pareto chart, and various other chart types can be used, as known by those skilled in the art.

Figure 11G:
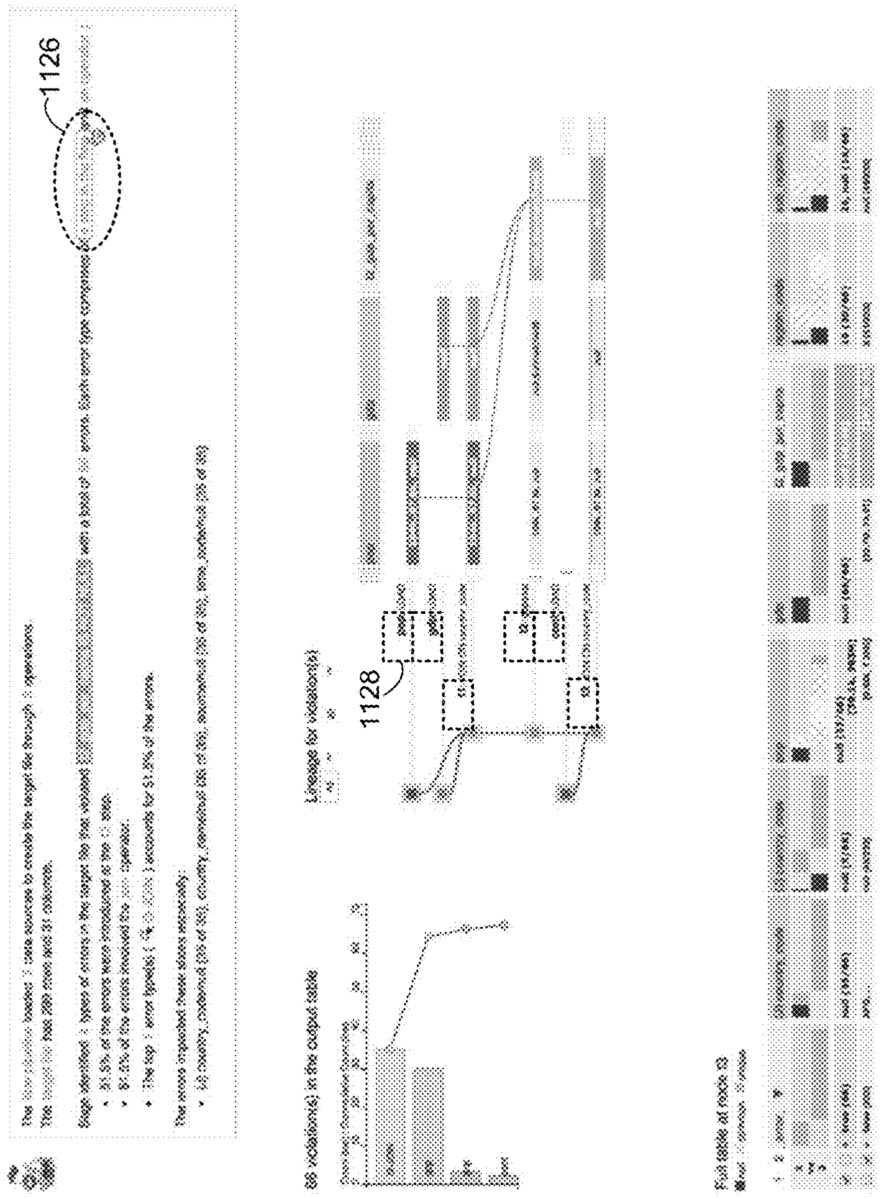

Turning to FIG. 11G, the user selects "a step in the flow" affordance 1126, and in response each step in the flow region 1020 associated with the identified errors in the target file is emphasized 1128 (e.g., bolded). It should be noted that zero steps in the flow region 1020 are emphasized in those circumstances where no errors are identified in the target file. Moreover, depending on a distribution of the errors, in some instances one or more steps in the flow region 1020 are not emphasized. In this way, a user of the data preparation application can quickly appreciate which steps are responsible for the identified errors and which steps are not responsible.

Figure 11H:
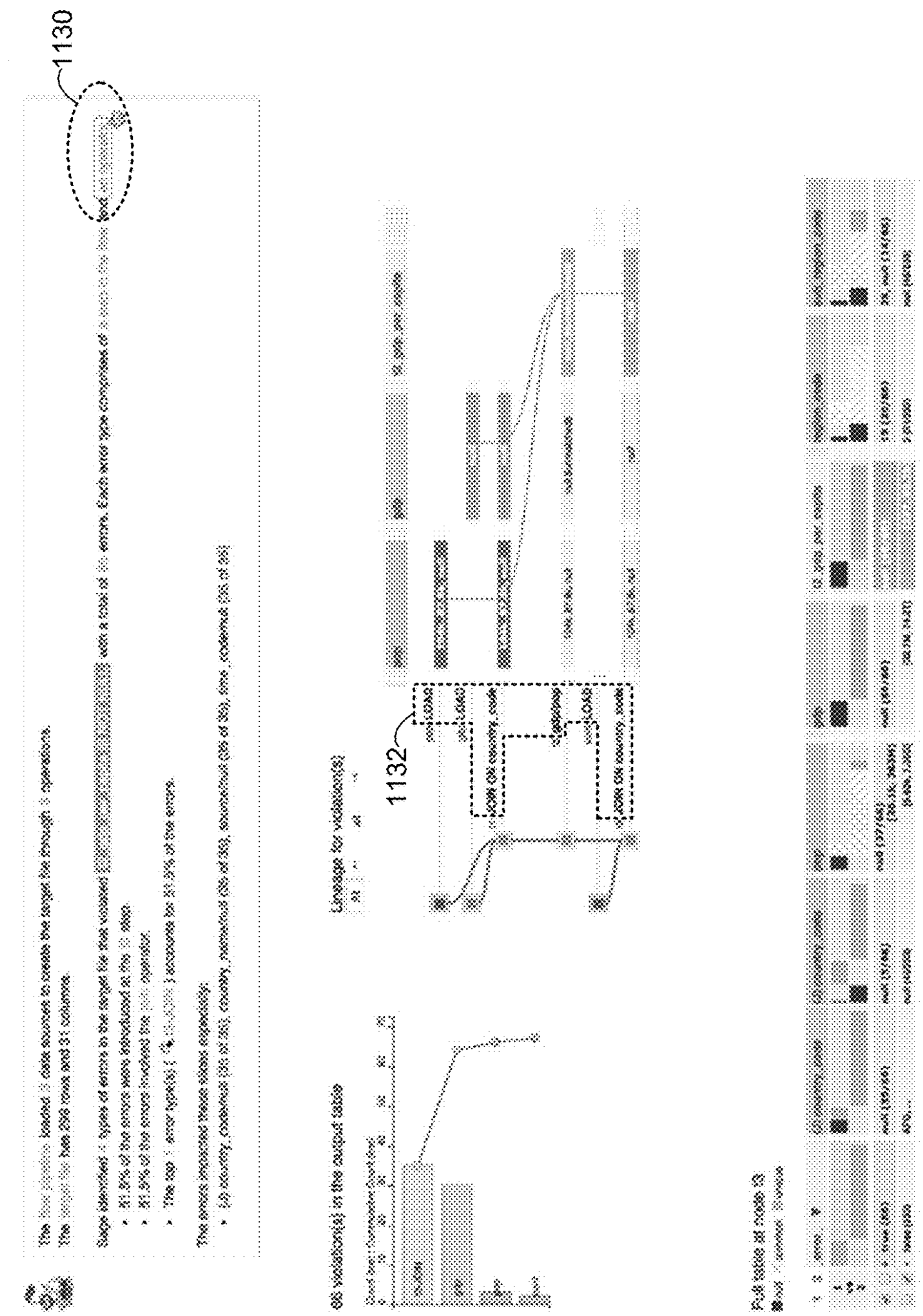

Turning to FIG. 11H, the user selects "an operator" affordance 1130, and in response each operator 1132 associated with the identified errors in the target file is emphasized (e.g., bolded). Again, in some instances zero operations in the flow region 1020 are emphasized in those circumstances where no errors are identified in the target file. Moreover, depending on a distribution of the errors, in some instances one or more operations in the flow region 1020 are not emphasized.

Figure 11I:
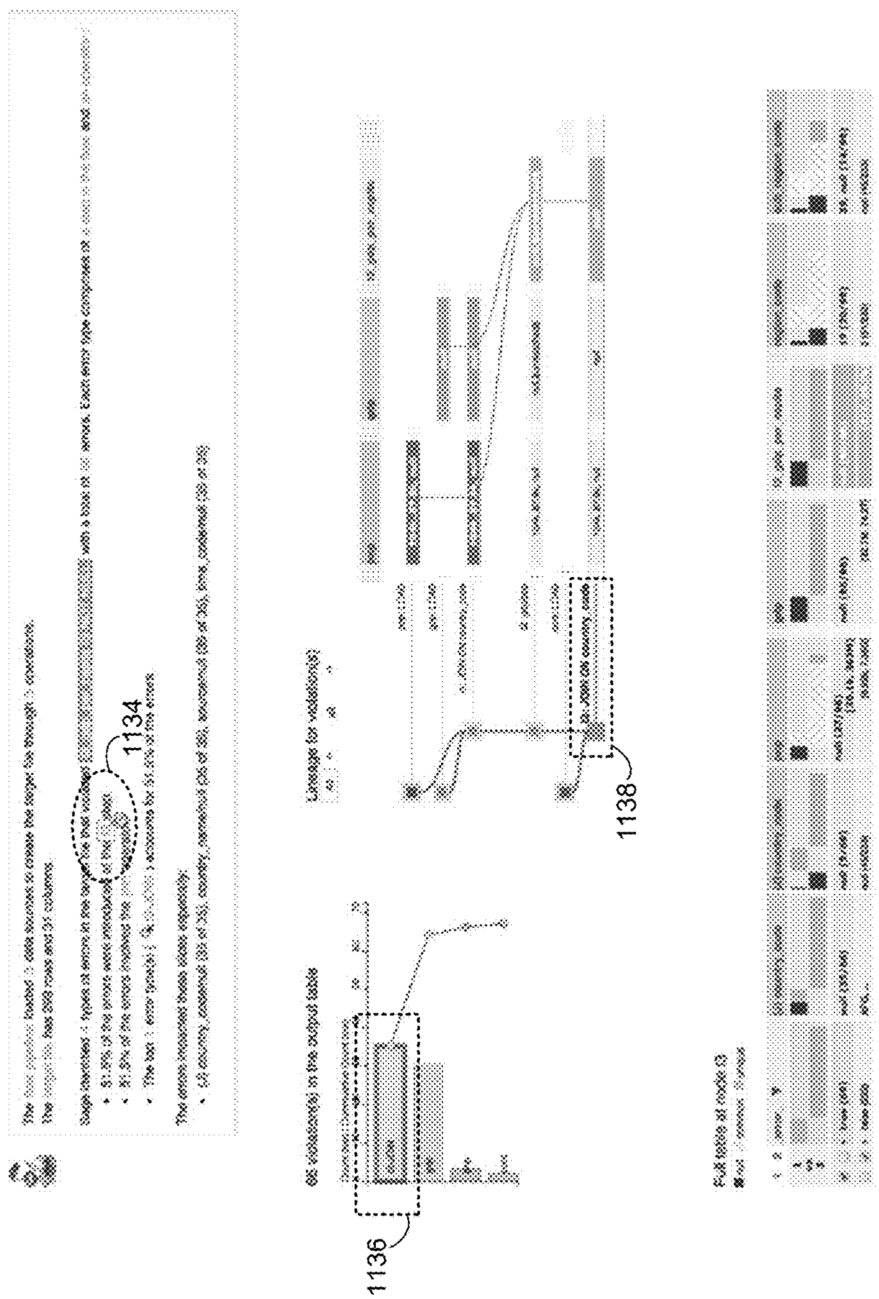

Turning to FIG. 11I, the user selects a "t3" affordance 1134, and in response a corresponding column 1136 in the error profile region 1004 is highlighted (e.g., t3-JOIN column is bolded) and a corresponding step 1138 in the data flow trace region 1006 is also highlighted (e.g., the operation t3-JOIN is bolded). In doing so, the user is shown: (i) a percentage of the identified errors that are associated with the t3-JOIN operation in the error profile region 1004 and (ii) a section for the t3-JOIN operation in the data flow trace region 1006. In some implementations, two or more affordances are shown in the natural language summary region 1002 when multiple steps are responsible for a large percentage of the identified errors. For example, the natural language summary region 1002 may state 30% of the errors were introduced at the t3 step and another 30% of the errors were introduced at the t2 step (or some other percentage and some other step combination). In such a case, the "t3" is an affordance (as shown in FIG. 11I) and another affordance for "t2" is displayed, where the "t2" affordance highlights corresponding portions in the data flow trace region 1006 and the error profile region 1004 that differ from the highlighted portions that correspond to the "t3" affordance. These affordances are created dynamically by the data preparation application to suit the situation.

Figure 11J:
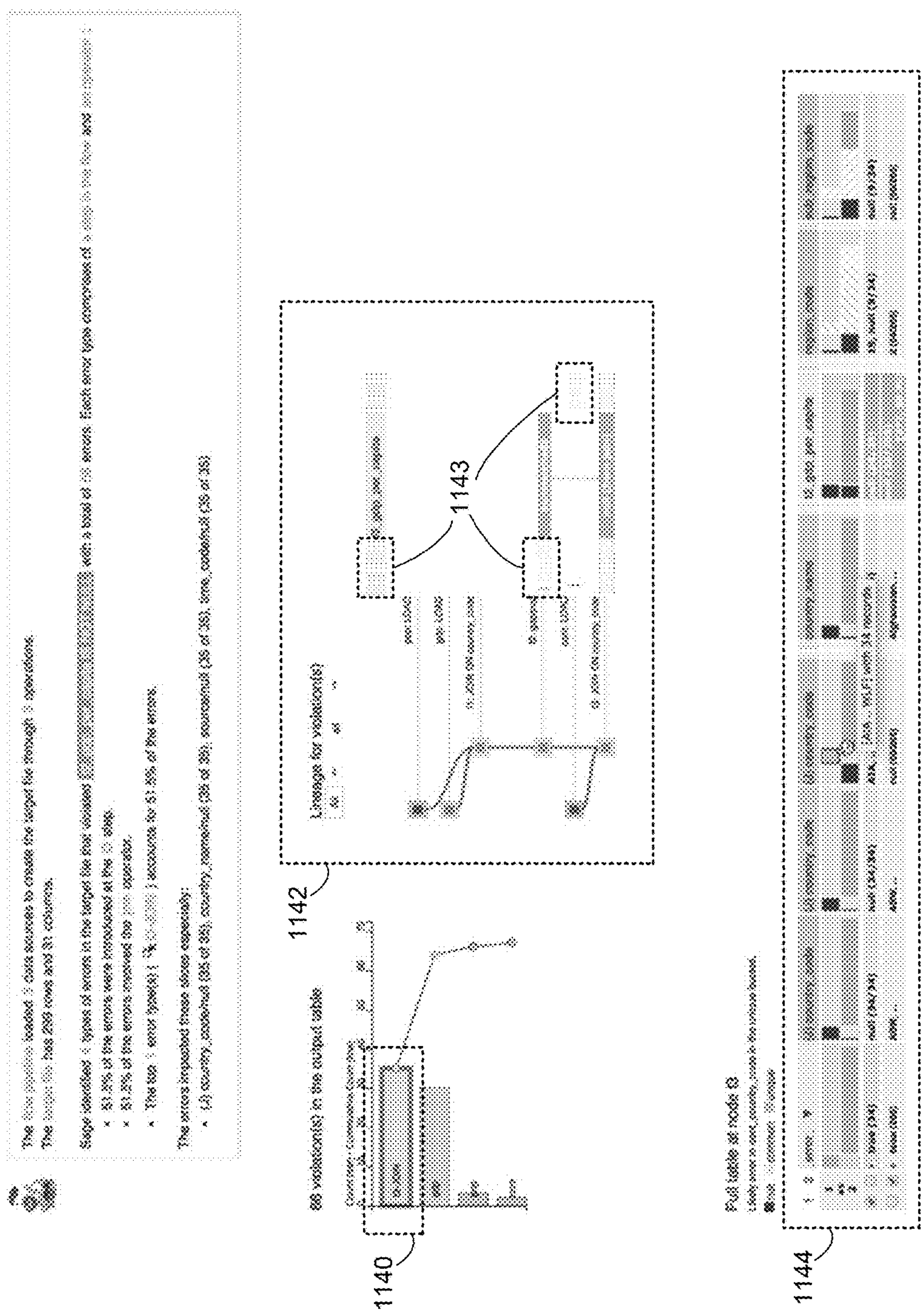

Turning to FIG. 11J, the user selects a segment (e.g., a data mark) 1140 of the chart 1018 (or selects the "join" affordance in the natural language summary region 1002), and in response the data flow trace region 1006 presents a summary 1142 of the errors associated with the segment 1140 of the chart 1018. In the example shown, the data flow trace region 1006 presents a summary 1142 of the t3-JOIN operation. Also shown, the data flow trace region 1006 includes multiple sets of vertical bars 1143 for the column provided in the target file. The vertical bars 1143 represent additional columns, which have been "zipped" (i.e., collapsed) in order to emphasize the column(s) associated with the errors. A user may select any of the bars 1143 to show information for the corresponding data column in the target file. Although not depicted in the black and white rendering, a couple of the vertical bars 1143 are colored. Colors correspond to a particular data source. For example, blue, green, and orange identify the original source as one of a base data source (e.g., the gdp data source). Gray indicates that the original source was from a transformation node (e.g., the result of the gdp/pop join calculation).

In some implementations, the vertical bars 1143 are displayed when a data column (or set of data columns) in the target file is not directly connected to the error shown in the data flow trace region 1006 (e.g., the degree of association with an error falls below a threshold). For example, (J) country_code for the pop data source and (J) country_code for the gdp data source are not directly connected in the data flow trace region 1006 that ends with t2_gdp_per_capita. However, if the data columns are directly connected to t2_gdp_per_capita (e.g., the degree of association with the error exceeds the threshold), the vertical bars 1143 are unzipped (i.e., expanded) into columns, which are displayed in the summary (e.g., as shown in the summary 1154).

The data region 1008 is also updated in response to the user selection of the segment 1140 to display a subset of columns 1144 that correspond to the segment 1140 (e.g., corresponding to the t3-JOIN operation). For example, in the "_error_" column, an updated error population and an updated non-error population are displayed (e.g., "true (34)" displayed below the updated error population and the updated non-error population indicates that the segment 1140 represents 34 errors of the total 66 identified errors). Additionally, a specific column in the subset 1144, cursor positioned at "(J) country_code" (which is most responsible for the 34 errors associated with the segment 1140) is identified. The remaining columns in the data region 1008 also indicate their respective number of null values (e.g., "(J) country_code" for the pop data source (second column from the left) also has "null (34/34)"). Columns that are not from the continent data source are null for this particular error because there is no country_code to join with in the joined table at node t2. This is discussed in further detail below with reference to FIG. 11K.

Figure 11K:
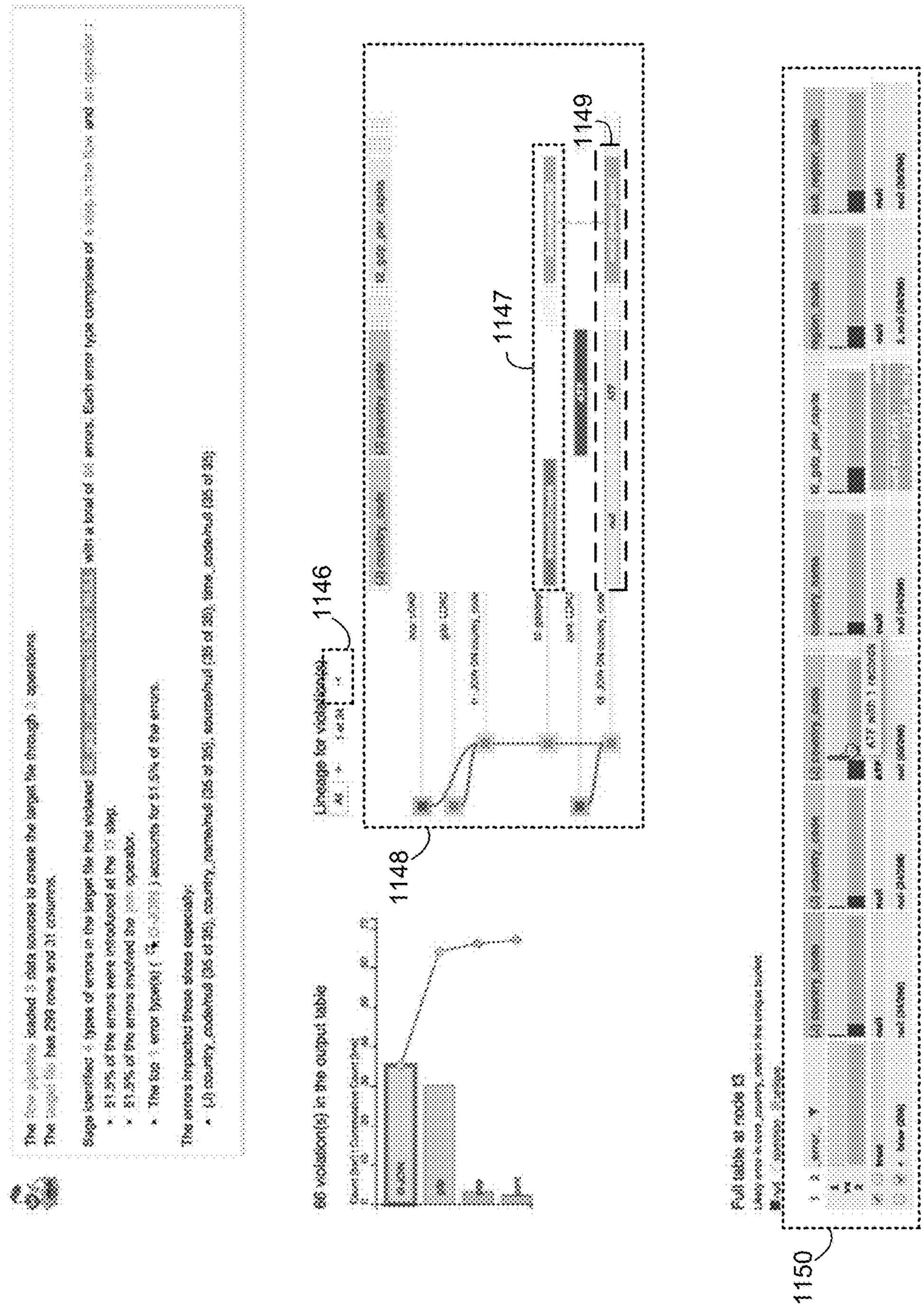

Turning to FIG. 11K, the user selects an arrow 1146 in the data flow trace region 1006, and in response the data flow trace region 1006 presents individual information 1148 (e.g., a different summary) for a first error of the thirty-four errors (1 of 34) associated with the segment 1140 (e.g., the t3-JOIN operation). For example, the individual information 1148 for the first error shows two join operator data columns from the target file: (i) "(J) country_code" for the gdp data source and (ii) "(J) country_code" for the continent data source. The first error is detected at the t3-JOIN operation because the gdp data source does not include a country code of "ATF," whereas the continent data source does include a country code for "ATF." Accordingly, the gdp data source does not include a corresponding gross domestic product value for the country code "AFT" (shown as "$unmatched$"). Because of this, a null value is created in the target file as a result of the t3-JOIN operation. The individual information 1148 for the first error indicates that the first error corresponds to the gdp data source by horizontally aligning an "$unmatched$" in the t2_gdp_per_capita column with the "$unmatched$" in the "(J) country_code" for the gdp data source column (dotted box 1147). Additionally, the final row in the expanded flow 1022 shows a "null" in the "(J) country_code" column (the dashed box 1149).

The individual information 1148 for the first error can also be viewed to indicate that the first error corresponds to the "ATF" in the continent data source. For example, the "ATF" in the continent data source is not horizontally aligned with indicators from the other two columns, suggesting that "ATF" is a unique value found only in the continent data source. The data region 1008 is also updated (1150) in response to the user selection of the arrow 1146, and emphasizes "ATF" indicating that "ATF" in the continent data source is the root cause of the first error. For example, the other columns in the data region 1008 each include a "null," confirming that "ATF" is a unique value found only in the continent data source. Accordingly, a comprehensive summary of the first error at the t3_JOIN is provided, which allows the user to repair the error (e.g., delete the "ATF" entry, input the necessary information, or simply ignore the "ATF" entry during subsequent analysis).

Figure 11L:
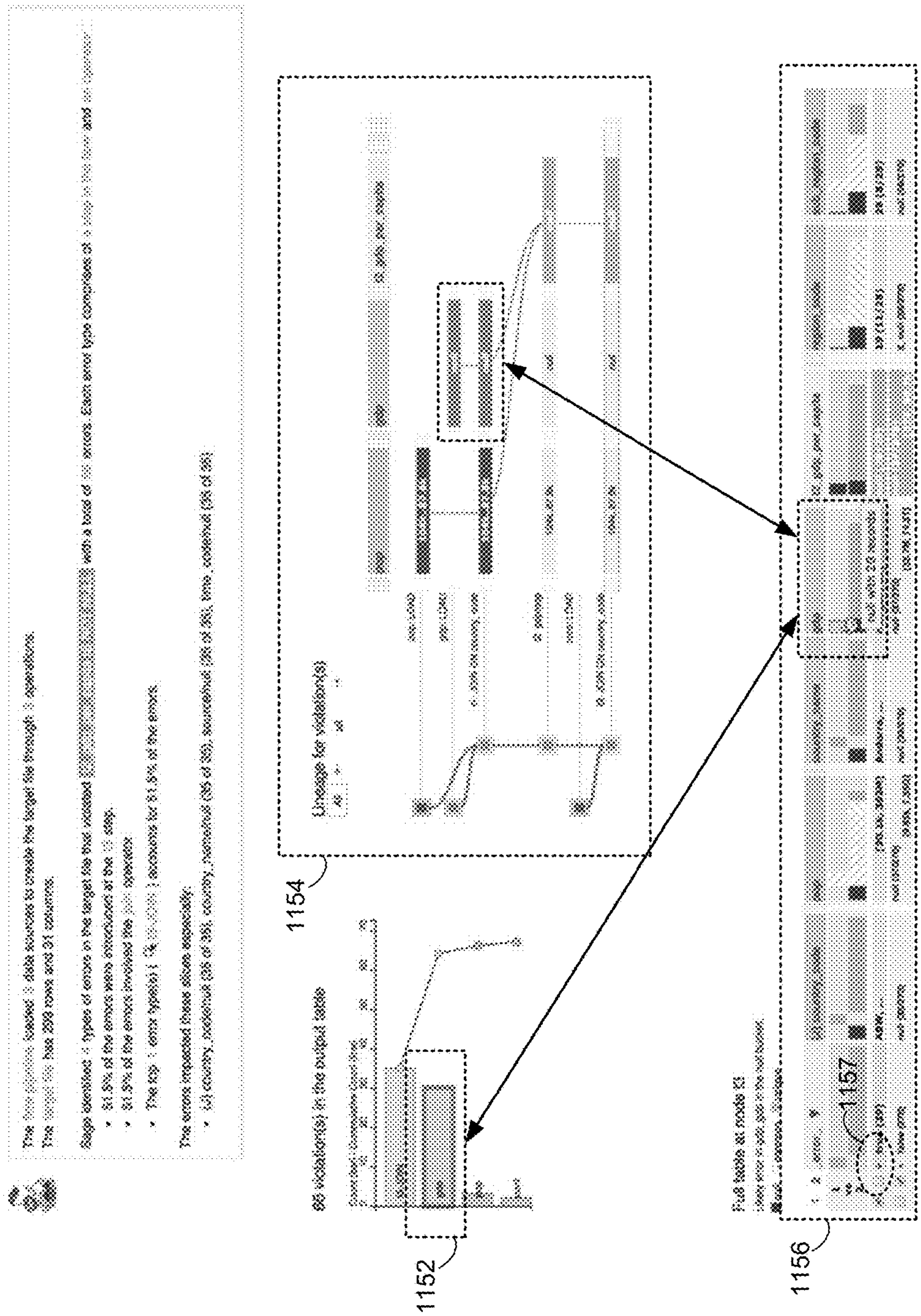

Turning to FIG. 11L, the user selects a segment 1152 of the chart 1018, and in response the data flow trace region 1006 presents a summary 1154 of the errors in the target file associated with the segment 1152 of the chart 1018 (e.g., the expanded flow 1022 presents a summary of the 29 errors associated with the segment 1152). Because the segment 1152 corresponds to the gdp data source, the summary 1154 concerns the errors found in the target file that can be attributed to the gdp data source. The data region 1008 is also updated in response to the user selection 1152 to display a subset of columns 1156 for the errors found in the target file that can be attributed to the gdp data source. A slice of data in the gdp column is highlighted (e.g., bolded and colored to distinguish the slice of data from other slices of data shown in other columns in the subset), indicating that 29 null entries are present in the target file that can be traced to the gdp data source. In some implementations, the user hovers the cursor above the slice of data, and in response information concerning the slice of data is displayed (e.g., "null with 29 records" is displayed).

A user can expand the data region 1008 to show additional information for each of the 29 null entries. To accomplish this, a user selects a plus symbol 1157 in the "true" row. In response to the user selection, the rows with the null values are expanded, which is shown in FIG. 11Q. Now referring to FIG. 11Q, the 29 null entries in the target file attributed to the gdp data source are shown in the dotted box 1180 (e.g., 29 countries did not report a gdp). Because of this, the t2_gdp_per_capita column also includes 29 null values caused by the 29 null entries in the gdp data source. Now, referring back to FIG. 11L, the null value in the t2_gdp_per_capita column in the summary 1154 results from the null values shown in FIG. 11Q. In other words, a lineage of the null in the t2_gdp_per_capita column can be traced to the 29 null entries in the gdp data source, which are shown in the chart 1018 and the data region 1008.

Figure 11M:
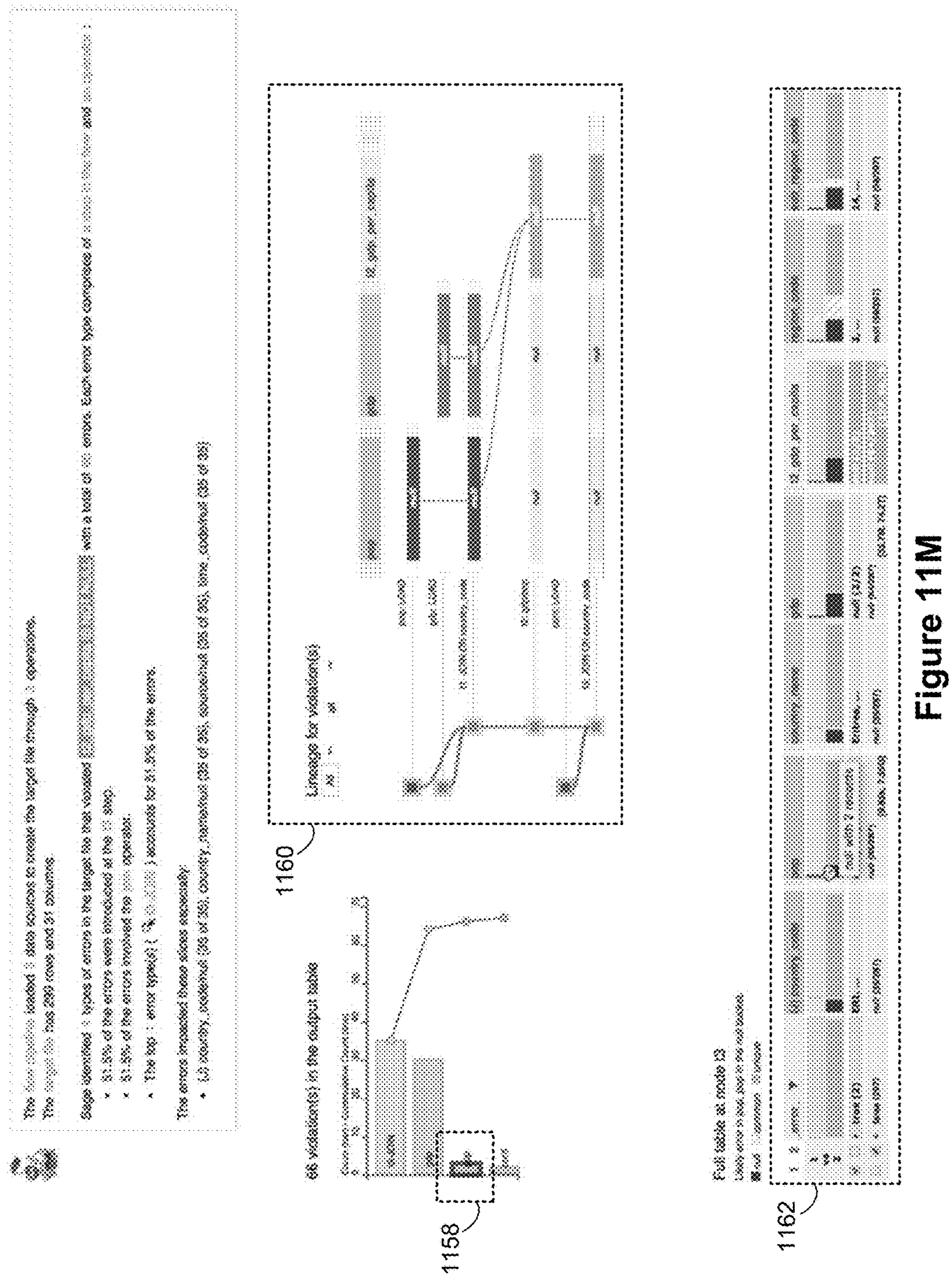
Figure 11N:
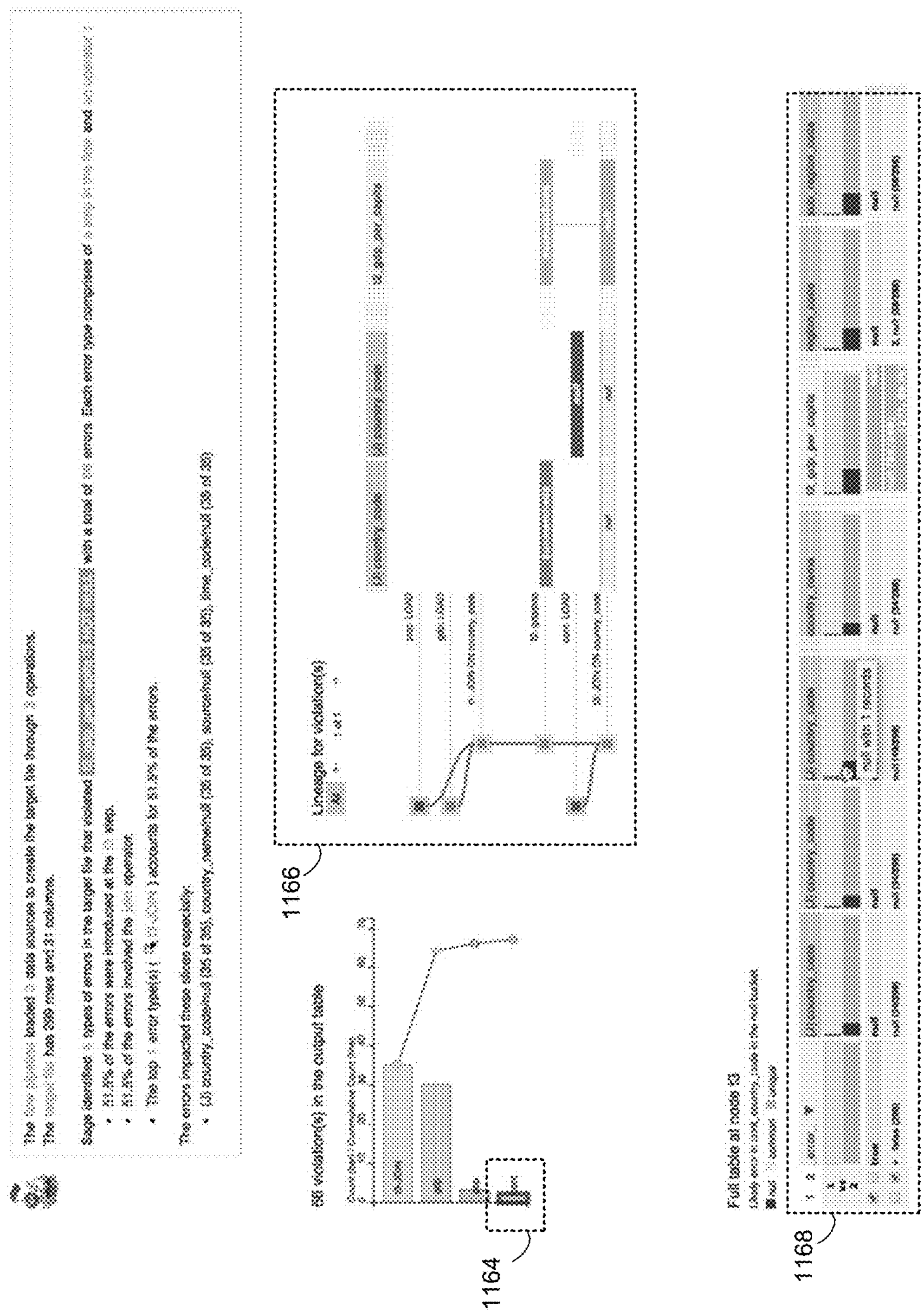
Figure 11O:
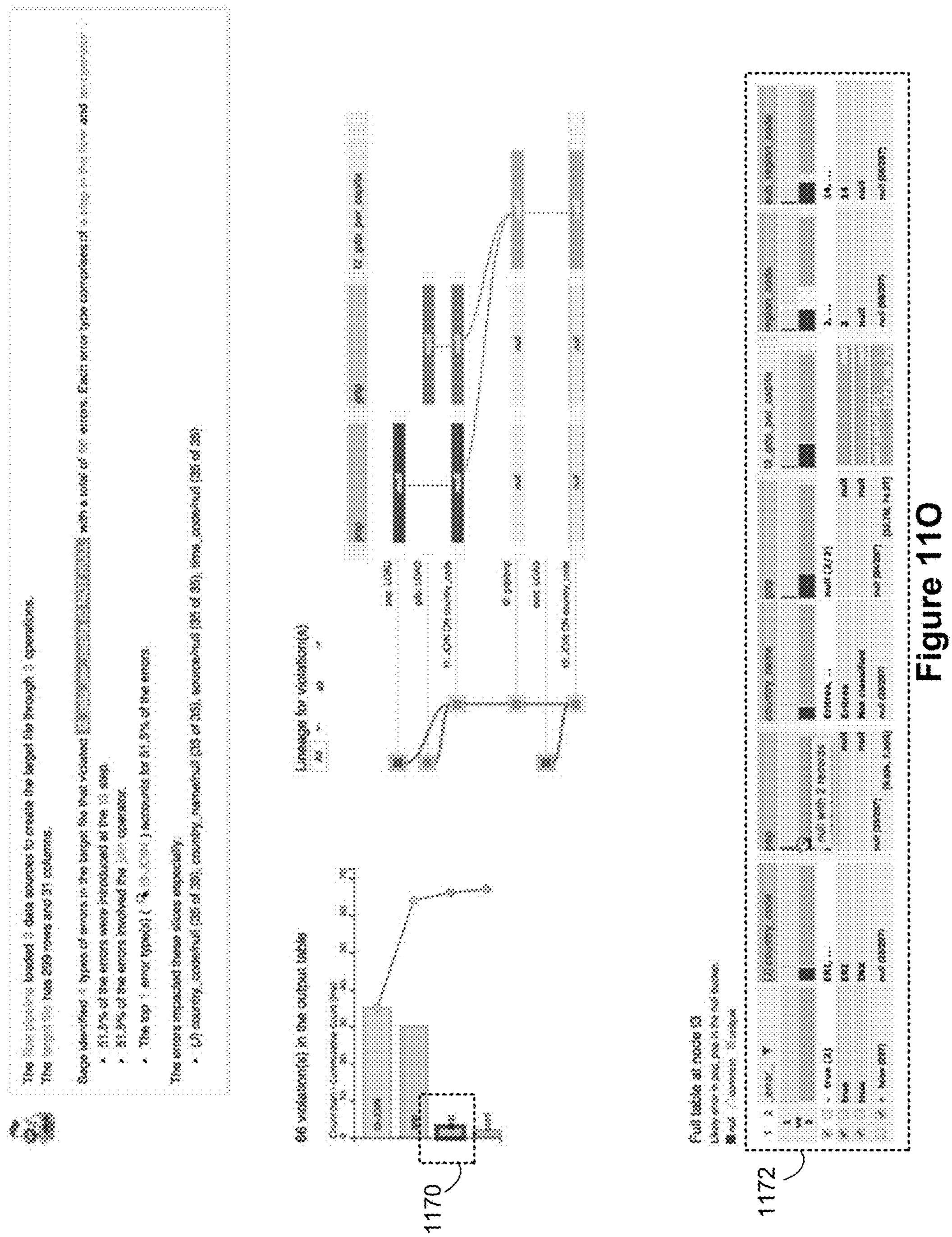

FIGS. 11M and 11N illustrate summaries 1160 and 1166 displayed after user selections of the other segments 1158 and 1164 in the chart 1018. In addition, the data region 1008 display column subsets 1162 and 1168, respectively, when the segment 1158 or the segment 1164 is selected. For the sake of brevity, these summaries and updated data regions will not be discussed in detail. However, the descriptions for FIGS. 11K and 11L apply equally to FIGS. 11M and 11N. Moreover, FIG. 110 illustrates the data region 1008 expanded to show the null entries in the target file attributed to the population (pop) data source (e.g., segment 1158). Expanding the data region 1008 to show errors is discussed in further detail with reference to FIGS. 11L and 11Q, and will not be repeated here.

Figure 11P:
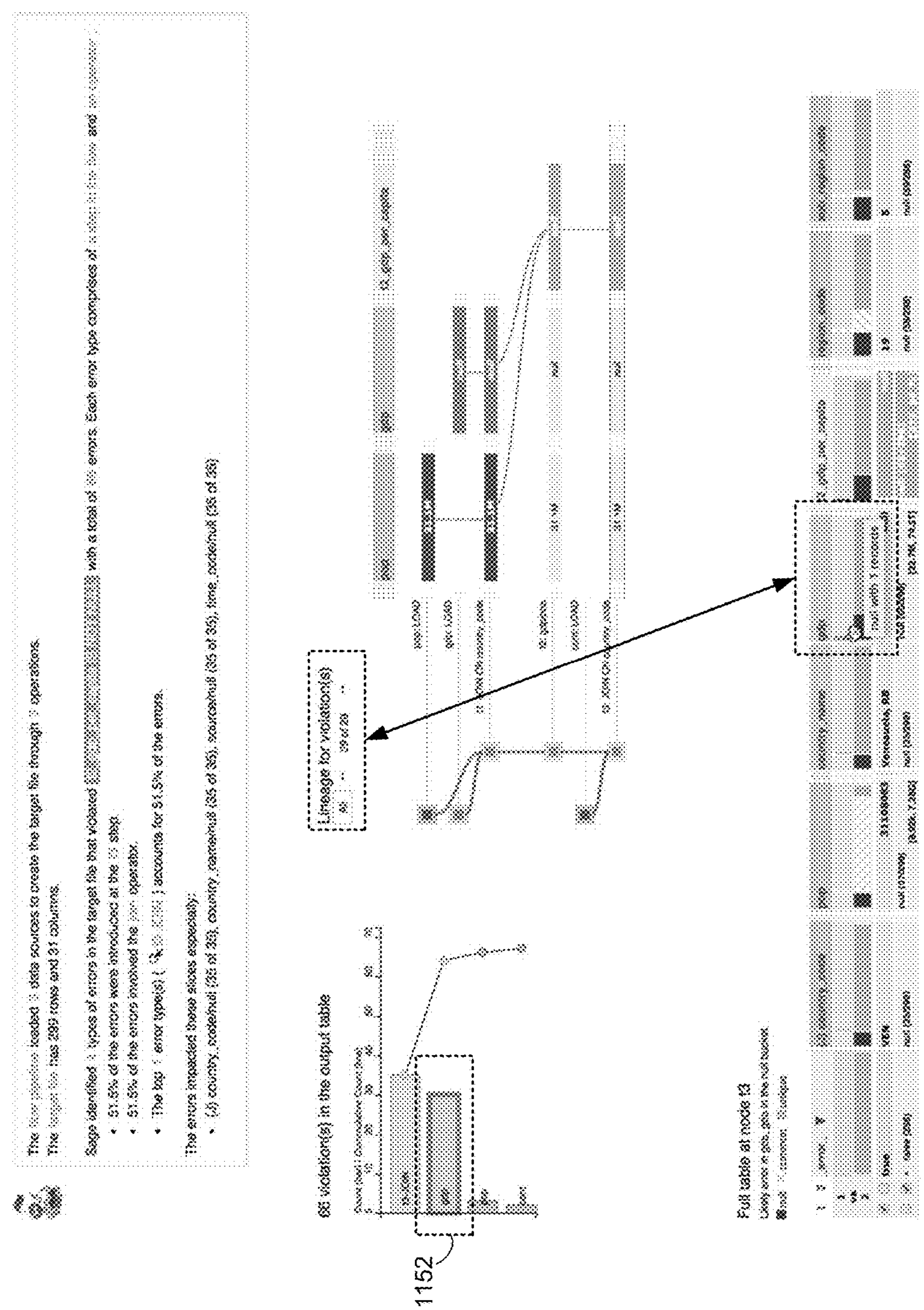
Figure 11Q:
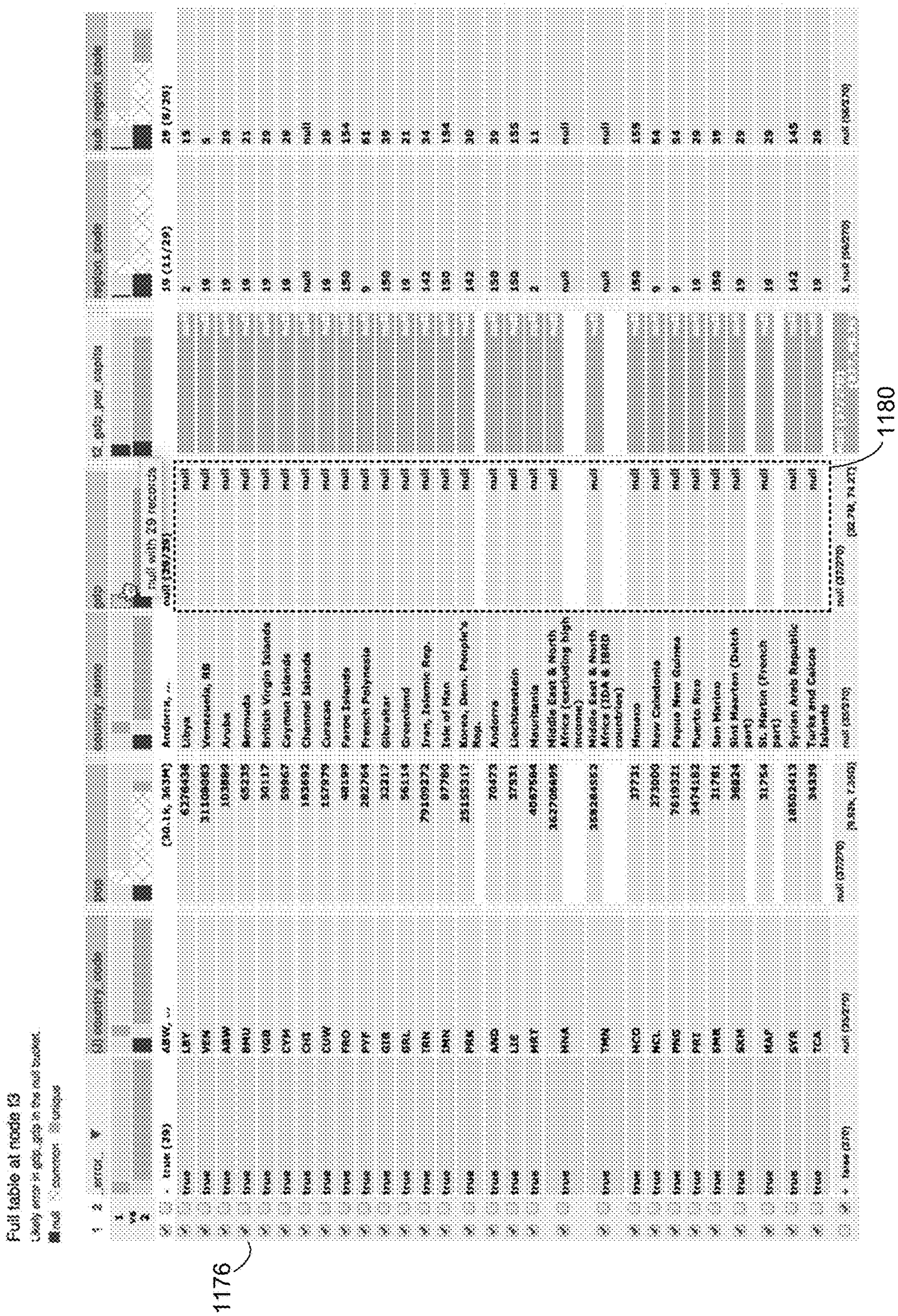

FIG. 11P illustrates individual information (e.g., a different summary) for a twenty-ninth error of the twenty-nine errors (29 of 29) associated with the segment 1152 (e.g., the gdp data source). For a discussion of individual information for a specific error, refer to the discussion for FIG. 11K above.

Figure 11R:
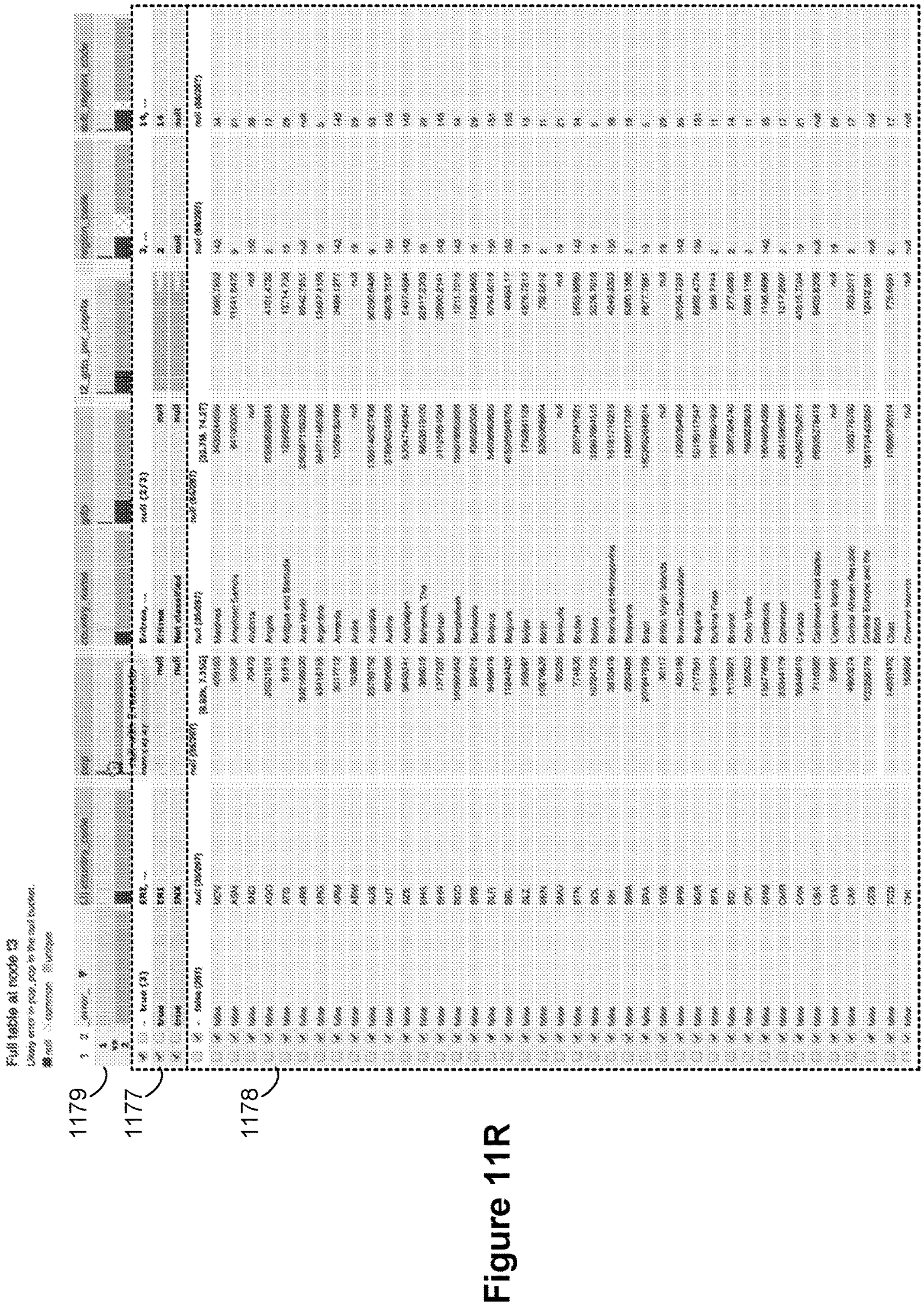

FIG. 11R illustrates the data region 1008 expanded to show the null entries 1177 in the target file attributed to the population (pop) data source and non-null entries 1178 (at least a portion of them) in the pop data source. To expand the non-null entries, a user selects a plus symbol in the "false" row. As shown, the non-null entries 1178 for the population column each includes a value (as opposed to a null value). As shown, the expanded data region 1008 includes checked boxes on a left edge of sections 1177 and 1178. The checked boxes clarify which population the data is associated with (e.g., the error(true) population or the error(false) population). In some implementations, a user uses the checked boxes to select a subset of the rows to define a first population to be compared to a second subset of rows defining a second population. Then, by selecting the "1 vs 2" affordance 1179, the computer 200 performs a dynamical compare of these user defined populations to produce a population comparison summary.

Figure 12:
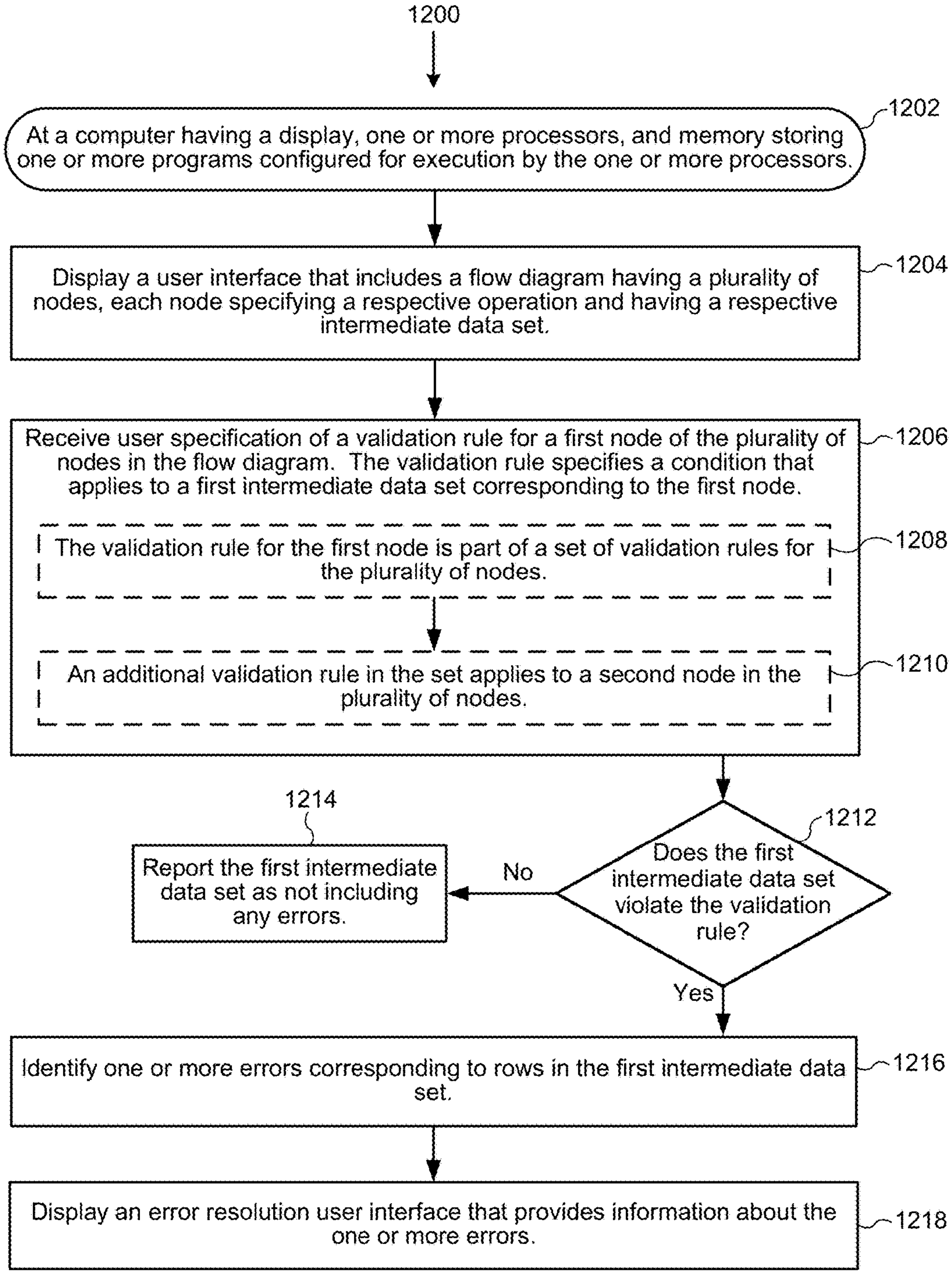
FIG. 12 is a flow diagram illustrating a method of detecting errors during flow execution and displaying the detected errors in accordance with some implementations.

FIG. 12 provides a flow diagram illustrating a method 1200 of detecting errors in a data set and displaying an interface summarizing the detected errors, in accordance with some implementations. The steps of the method 1200 may be performed by a computer (e.g., a computing device 200). In some implementations, the computer includes (1202) a display (e.g., the display 200), one or more processors (e.g., the CPUs 202), and memory (e.g., the memory 214). FIG. 12 corresponds to instructions stored in a computer memory or a computer-readable storage medium (e.g., the memory 214 of the computing device 200). The memory stores one or more programs configured for execution by the one or more processors. For example, the operations of the method 1200 are performed, at least in part, by an error detection module 326 and an error resolution module 328.

The method 1200 includes displaying (1204) a user interface that includes a flow diagram having a plurality of nodes, each node specifying a respective operation and having a respective intermediate data set. For example, the computer 200 displays the user interface shown in FIG. 3B, which includes a flow pane 313 having a visual representation (e.g., node/link flow diagram) 323 of a current flow. The flow diagram 323 includes a plurality of nodes. In some implementations, each node specifies a respective operation to: (i) retrieve data from a respective data source; (ii) transform data, or (iii) create a respective output data set (e.g., a target file).

The method 1200 further includes receiving (1206) user specification of a validation rule for a first node of the plurality of nodes in the flow diagram. The validation rule specifies a condition that applies to a first intermediate data set (also referred to herein as a target file) corresponding to the first node. In some implementations, receiving the user specification includes detecting a user input at the first node in the flow diagram. For example, a user right clicks on the first node, and in response, a menu is displayed. The menu includes an option to specify a rule. Then, the user may left click on the option to create the rule. A window is displayed that includes inputs for creating the rule. The rule can be created in a variety of ways using the user interface. Alternatively, the user may interact with Menu bar 311 to create a rule). Moreover, in some implementations, the rule is not defined using the user interface. Instead, the rule is defined within an error resolution user interface 1010 (e.g., the user may interact with Menu bar 1001 to create a rule.

In some implementations, a validation rule is defined by a user. For example, the user may create the validation rule in the window discussed above. In some instances, a validation rule 325 (or a set of validation rules) can be shared between users of the data preparation application 250. For example, a first user may create a set of validation rules for a flow and may send the set of validation rules to a second user, who can then incorporate the set of validation rules into a flow. Alternatively or in addition, the validation rule is defined by the data preparation application 250. For example, the validation rule may be fundamental to data preparation, and therefore, the validation rule is built into the data preparation application 250. It should be noted that the built-in validation rules may be turned on and off by the user (e.g., the window may include a tab for the built-in validation rules, and the user can access the tab to turn each rule on or off, depending of the circumstances).

In some implementations, the validation rule for the first node is part of a set of validation rules for the plurality of nodes (1208). Moreover, in some implementations, the validation rule is a first validation rule and a second validation rule in the set applies to a second node in the plurality of nodes (1210). In some implementations, a third validation rule in the set applies to each node in the plurality of nodes. This set of three validation rules above is merely one example of validation rules (e.g., a single validation rule may apply to each node in the plurality of nodes, or a subset of the nodes). Validation rules are discussed in further detail above with reference to FIG. 10B.

In some implementations, the method 1200 further includes receiving a user selection of an affordance displayed in the user interface to open an error resolution user interface. In some implementations, the error resolution user interface 1010 is a distinct and separate interface from the data prep user interface 100. In some implementations, the user selection is received in the flow diagram. For example, the window for specifying a rule may include an affordance to open the error resolution user interface. Alternatively, the user may select an affordance in the user interface to open the error resolution user interface (e.g., an "analyze a node for errors" option). In response, the data preparation application may guide the user through the process, especially if this is the user's first time using the error resolution user interface. For example, the user interface may prompt the user to select a node in the flow, and define a validation rule (or an option to use "recommended validation rules," which are the built-in validation rules).

The method 1200 further includes determining (1212) whether the first intermediate data set violates the validation rule. To accomplish this, the computer determines whether one or more rows in the first intermediate data set violate the validation rule. As noted earlier, some rules evaluate two or more data values from an individual row, evaluate aggregate values for multiple rows, or access additional intermediate data sets to evaluate the rules. In some implementations, the validation rule is a statistical rule, e.g., the statistical rule is violated when a cell (e.g., a data value of the cell) in the first intermediate data set deviates from other related cells (e.g., other cells in a particular column) in the first intermediate data set by a predetermined amount (e.g., three-standard deviations, or some lesser or greater number of standard deviations). Alternatively or in addition, in some implementations, the validation rule is a null-based rule. In some implementations, a null-based rule is violated when a cell is blank (e.g., null). Alternatively or in addition, in some implementations, the validation rule is a metadata-based rule. A metadata-based rule is violated when metadata for a cell violates predetermined criteria or user-defined criteria (e.g., a data value of the cell must be recent, the cell must include a specific data type, or the cell must be a certain size). In some implementations, metadata-based rules (and/or null-based rules) apply to each node of the plurality of nodes, whereas a statistical rule applies to a specific node.

These three validation rules are merely examples, and other validation rules can be used, as described above with reference to FIG. 10B.

In some implementations, in accordance with determining that the first intermediate data set does not violate the validation rule (1212—No), the method 1200 reports (1214) the intermediate data set as not including any errors. For example, the computer may display a window to notify the user that the first intermediate data cell does not include any errors (at least in view of the validation rule). After receiving this message, the user may define additional validation rules and may elect to perform another analysis of the node using the additional validation rules. For example, while the first intermediate data set may not include any null values, it may include several outlier values that require repair.

In some implementations, in accordance with determining that the first intermediate data set violates the validation rule (1212—Yes), the method 1200 includes identifying (1216) one or more errors corresponding to rows in the first intermediate data set (i.e., each row that violates the validation rule is classified an error). For example, referring to FIG. 11L, the gdp data source includes 29 nulls entries (i.e., 29 countries do not have a gross domestic product entry in the gdp data source). As a result, the validation rule "t2_gdp_per_capita IS NOT NULL" for the target file is violated 29 times. These violations are illustrated in FIG. 11Q, which shows 29 entries in the t2_gdp_per_capita column with null values as a result of the 29 null entries in the gdp column.

The method 1200 further includes displaying (1218) an error resolution user interface (e.g., the error resolution user interface 1010 in FIG. 10B), which provides information about the one or more errors.

The error resolution user interface includes a natural language summary region 1002 providing a synopsis of the one or more errors. The synopsis includes a number of errors identified, one or more error types, and a number of errors for each of the one or more error types. In some implementations, the synopsis further includes a ranking of the one or more errors, including a top ranked error. The natural language summary region 1002 is discussed in further detail above with reference to FIG. 10B.

The error resolution user interface further includes an error profile region 1004 graphically depicting the one or more errors, including, for each respective error type, a respective visual mark (e.g., a column, a segment, or a dot) that depicts a respective number of errors for the respective error type. In some implementations, the error profile region displays a Pareto chart where each bar corresponds to a distinct error type. In some implementations, each bar is color encoded to further differentiate the bars from each other. In some implementations, a first error type is a quantitative error (e.g., outlier) and a second error type is a qualitative error (e.g., duplicate, misspelling, or string pattern violation). The error profile region 1004 is discussed in further detail above with reference to FIG. 10B.

The error resolution user interface further includes a data flow trace region 1006 providing lineage of the one or more errors according to the flow diagram. The lineage includes: (i) a visual representation of at least a subset of the plurality of nodes (e.g., data sources in flow region 1020; (ii) a visual representation for each respective operation associated with each of the plurality of nodes (e.g., operations in the flow region 1020; and (iii) a graphic depiction of errors, if any, at each represented node (e.g., the expanded flow 1022). In some implementations, the visual representation of the subset of nodes is color encoded to differentiate each node from one another. Furthermore, in some implementations, the color encoding of the subset of nodes matches the coloring encoding in the error profile region 1004. For example, referring to FIG. 11A, the gdp column in the Pareto chart 1018 is color encoded orange, and the gdp node in the data flow trace region 1006 is also color encoded orange. The data flow trace region 1006 is discussed in further detail above with reference to FIG. 10B.

The error resolution user interface further includes a data region 1008 displaying data for a subset of columns 1026 from the first intermediate data set. In some implementations, each column in the subset of columns is color encoded to differentiate each column from one another (although, depending on the circumstances, one or more columns may share the share color if related to the same node). In some implementations, the color encoding of the subset of columns matches the coloring encoding in the error profile region 1004 and the data flow trace region 1006.

As discussed above, the data flow trace region 1006 includes a graphic depiction of errors, if any, at each represented node. In some implementations, the graphic depiction of errors is a subset of columns of the first intermediate data set, where the subset of columns is selected according to its degree of association with the one or more errors relative to other columns in the first intermediate data set. For example, with reference to FIG. 11K, the top row of the expanded flow 1022 includes three columns of the first intermediate data set based on these columns respective degrees of association with the first error (going left to right): (i) gdp data source (J) country_code, (ii) pop data source (J) country_code, and (iii) t2_gdp_per_capita.

Also discussed above, the data region 1008 includes a subset of columns 1026 from the first intermediate data set. The subset of columns 1026 is also selected according to its degree of association with the one or more errors relative to other columns in the target file. However, due to size restrictions in the data flow trace region 1006, the criteria used for selecting the subset of columns shown in the data flow trace region 1006 is more limiting than the criteria used for selecting the subset of columns 1026 in the data region 1008. For example, the criteria used for selecting the subset of columns shown in the data flow trace region 1006 may require that a given column is directly connected to an error (or operation) shown in the data flow trace region 1006. Because of this difference in selection criteria, in some implementations, the subset of columns 1026 shown in the data region 1008 includes the subset of columns shown in the data flow trace region 1006, along with some additional columns from the first intermediate data set.

In some implementations, one or more respective columns in the subset of columns include: (i) an error population region for an error population of the respective column, and (ii) a non-error population region for a non-error population of the respective column. For example, referring to FIG. 10B, the "_error_" column includes error population region 1028 and a non-error population region 1030. The error population region and the non-error population region are displayed in a graph in the data region and the graph illustrates differing values (i.e., unique values) between the error population and the non-error population, common values between the error population and the non-error population, and error values in the error population (e.g., in the example provided, the error values are null values).

In some implementations, a graph in the data region emphasizes a portion (e.g., a slice) of the error population in a respective column in the subset of columns. In some implementations, the emphasized portion indicates that the respective column has a highest concentration of the one or more errors. Alternatively or in addition, the emphasized portion indicates that the respective column has a highest degree of association with the errors in the first intermediate data set. For example, with reference to FIG. 11K, the data region 1008 emphasizes "ATF," which indicates that "ATF" in the continent data source has the highest degree of association with (i.e., it is the cause of) a respective error of the one or more errors. As shown, the other columns in the data region 1008 each include a "null," confirming that "ATF" is a unique value found only in the continent data source. Because of this, "AFT" entry is causing other columns in the first intermediate data set to have null values.

In some implementations, the natural language summary region is linked to the error profile region, the data flow trace region, and the data region (i.e., each region is linked together), and the method 1200 further includes in response to detecting a user input in the natural language summary region, updating display of the error profile region, the data flow trace region, and/or the data region according to the detected user input, including emphasizing portions of the error profile region, the data flow trace region, and/or the data region that correspond to the detected user input. In some implementations, detecting the user input includes detecting a selection on an affordance of the synopsis provided in the natural language summary region. Examples of user inputs in the natural language summary region 1002 are discussed above with reference to FIGS. 11A-11I.

In some implementations, the method 1200 further includes receiving a user input in the data flow trace region, where the user input selects a respective error of the one or more errors. Moreover, in response to receiving the user input, the method 1200 further includes updating the data flow trace region to provide a lineage of the respective error, including an updated graphic depiction for the respective error at each represented node. In addition, the method 1200 further includes, in some implementations, updating the data region to display data for a subset of columns from the first intermediate data set corresponding to the lineage of the respective error. For example, with reference to FIG. 11K, a user selects an arrow 1146, causing information for a first error of thirty-four errors to be displayed in the data flow trace region 1006 and the data region 1008.

In some implementations, the method 1200 further includes, after identifying the one or more errors: (i) determining a proposed solution for at least some of the one or more errors based, at least in part, on data values in the first intermediate data set and (ii) prompting a user to execute the determined proposed solution. For example, the computer may display a window with the one or more errors, and a proposed solution to be applied to the one or more errors. In some implementations, determining the proposed solution includes deleting a row of data (e.g., a tuple of data) that corresponds to a respective error of the one or more errors. In some implementations, determining the proposed solution includes deleting an extraneous character or from a problem cell (e.g., a cell shows 1,100,000, whereas related values are all approximately 100,000, so an extraneous "0" or "1" digit is deleted, and both options can be suggested to the user). In some implementations, the proposed solution includes modifying a format of one or more cells (e.g., changing "89" in one or more cells to "1989" because of a majority of the cells in a respective column are formatted four digit years.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of resolving error conditions in a data flow, comprising:

at a computer having a display, one or more processors, and memory storing one or more programs configured for execution by the one or more processors:

displaying a user interface that includes a flow diagram having a plurality of nodes, each node specifying a respective operation and having a respective intermediate data set;

receiving user specification of a validation rule for a first node of the plurality of nodes in the flow diagram, wherein the validation rule specifies a condition that applies to a first intermediate data set corresponding to the first node;

determining that the first intermediate data set violates the validation rule;

in response to determining that the first intermediate data set violates the validation rule:

identifying one or more errors corresponding to rows in the first intermediate data set;

displaying an error resolution user interface that provides information about the one or more errors, wherein the error resolution user interface includes a plurality of interlinked regions, including:

a natural language summary region providing a synopsis of the one or more errors, the synopsis including a number of errors identified, one or more error types, and a number of errors for each of the one or more error types;

an error profile region graphically depicting the one or more errors, including, for each respective error type, a respective visual mark that depicts a respective number of errors for the respective error type;

a data flow trace region providing lineage of the one or more errors according to the flow diagram, the lineage including: (i) a visual representation of at least a subset of the plurality of nodes, (ii) a visual representation for each respective operation associated with each of the plurality of nodes, and (iii) a graphic depiction of errors, if any, at each represented node; and a data region displaying data for a subset of columns from the first intermediate data set; and determining a proposed solution for at least some of the one or more errors based, at least in part, on data values in the first intermediate data set, wherein the proposed solution includes deleting a row of data from the first intermediate data set corresponding to a respective error of the one or more errors.

2. The method of claim 1, wherein:

in response to detecting a user input in the natural language summary region, the method further comprises updating display of the error profile region, the data flow trace region, and the data region according to the detected user input, including emphasizing portions of the error profile region, the data flow trace region, and the data region that correspond to the detected user input.

3. The method of claim 2, wherein detecting the user input comprises detecting a selection on an affordance of the synopsis provided in the natural language summary region.

4. The method of claim 1, further comprising, after determining the proposed solution:

prompting a user to execute the determined proposed solution.

5. The method of claim 1, further comprising, at the computer:

receiving a user input in the data flow trace region, wherein the user input selects a respective error of the one or more errors; and in response to receiving the user input, updating the data flow trace region to provide a lineage of the respective error, including an updated graphic depiction for the respective error at each represented node.

6. The method of claim 5, further comprising, in response to receiving the user input:

updating the data region to display data for a subset of columns from the first intermediate data set corresponding to the lineage of the respective error.

7. The method of claim 1, wherein each respective column in the subset of columns includes: (i) an error population region for an error population of the respective column, and (ii) a non-error population region for a non-error population of the respective column.

8. The method of claim 7, wherein:

the error population region and the non-error population region are displayed in a graph in the data region, and the graph illustrates differing values between the error population and the non-error population, common values between the error population and the non-error population, and null values in the error population.

9. The method of claim 8, wherein the graph emphasizes a portion of the error population in a respective column in the subset of columns, the emphasized portion indicating that the respective column has a highest concentration of the one or more errors.

10. The method of claim 1, wherein the validation rule for the first node is part of a set of validation rules for the plurality of nodes.

11. The method of claim 10, wherein:

the validation rule is a first validation rule; and a second validation rule in the set applies to a second node in the plurality of nodes.

12. The method of claim 11, wherein a third validation rule in the set applies to each node in the plurality of nodes.

13. The method of claim 1, wherein each node specifies a respective operation to: (i) retrieve data from a respective data source; (ii) transform data, or (iii) create a respective output data set.

14. The method of claim 1, wherein the synopsis further includes a ranking of the one or more errors, including a top ranked error.

15. The method of claim 1, wherein the error profile region displays a Pareto chart in which each bar corresponds to a distinct error type.

16. The method of claim 15, wherein a first error type included in the Pareto chart is a quantitative error and a second error type included in the Pareto chart is a qualitative error.

17. A non-transitory computer readable storage medium storing one or more programs configured for execution by a computer system having one or more processors, memory, and a display, the one or more programs comprising instructions for:

displaying a user interface that includes a flow diagram having a plurality of nodes, each node specifying a respective operation and having a respective intermediate data set;

receiving user specification of a validation rule for a first node of the plurality of nodes in the flow diagram, wherein the validation rule specifies a condition that applies to a first intermediate data set corresponding to the first node;

determining that the first intermediate data set violates the validation rule;

in response to determining that the first intermediate data set violates the validation rule:

identifying one or more errors corresponding to rows in the first intermediate data set;

displaying an error resolution user interface that provides information about the one or more errors, wherein the error resolution user interface includes a plurality of interlinked regions, including:

a natural language summary region providing a synopsis of the one or more errors, the synopsis including a number of errors identified, one or more error types, and a number of errors for each of the one or more error types;

an error profile region graphically depicting the one or more errors, including, for each respective error type, a respective visual mark that depicts a respective number of errors for the respective error type;

a data flow trace region providing lineage of the one or more errors according to the flow diagram, the lineage including: (i) a visual representation of at least a subset of the plurality of nodes, (ii) a visual representation for each respective operation associated with each of the plurality of nodes, and (iii) a graphic depiction of errors, if any, at each represented node; and a data region displaying data for a subset of columns from the first intermediate data set; and determining a proposed solution for at least some of the one or more errors based, at least in part, on data values in the first intermediate data set, wherein the proposed solution includes deleting a row of data from the first intermediate data set corresponding to a respective error of the one or more errors.

18. A computer system for identifying errors in a data set, comprising:

one or more processors;

memory; and one or more programs stored in the memory and configured for execution by the one or more processors, the one or more programs comprising instructions for:

displaying a user interface that includes a flow diagram having a plurality of nodes, each node specifying a respective operation and having a respective intermediate data set;

receiving user specification of a validation rule for a first node of the plurality of nodes in the flow diagram, wherein the validation rule specifies a condition that applies to a first intermediate data set corresponding to the first node;

determining that the first intermediate data set violates the validation rule;

in response to determining that the first intermediate data set violates the validation rule:

identifying one or more errors corresponding to rows in the first intermediate data set;

displaying an error resolution user interface that provides information about the one or more errors, wherein the error resolution user interface includes a plurality of interlinked regions, including:

a natural language summary region providing a synopsis of the one or more errors, the synopsis including a number of errors identified, one or more error types, and a number of errors for each of the one or more error types;

an error profile region graphically depicting the one or more errors, including, for each respective error type, a respective visual mark that depicts a respective number of errors for the respective error type;

a data flow trace region providing lineage of the one or more errors according to the flow diagram, the lineage including: (i) a visual representation of at least a subset of the plurality of nodes, (ii) a visual representation for each respective operation associated with each of the plurality of nodes, and (iii) a graphic depiction of errors, if any, at each represented node; and a data region displaying data for a subset of columns from the first intermediate data set; and determining a proposed solution for at least some of the one or more errors based, at least in part, on data values in the first intermediate data set, wherein the proposed solution includes deleting a row of data from the first intermediate data set corresponding to a respective error of the one or more errors.

19. The computer system of claim 18, wherein:

in response to detecting a user input in the natural language summary region, the one or more programs further comprise instructions for updating display of the error profile region, the data flow trace region, and the data region according to the detected user input, including emphasizing portions of the error profile region, the data flow trace region, and the data region that correspond to the detected user input.

20. The computer system of claim 18, wherein the one or more programs further comprise instructions for:

after determining the proposed solution, prompting a user to execute the determined proposed solution.

* * * * *